US012699761B2

(12) United States Patent
Ishikawa et al.

(10) Patent No.: US 12,699,761 B2
(45) Date of Patent: Aug. 4, 2026

(54) APPLICATIONS ASSISTING CARE FOR A CARE RECEIVER

(71) Applicant: PARAMOUNT BED CO., LTD., Tokyo (JP)

(72) Inventors: Takashi Ishikawa, Tokyo (JP); Yuuki Nakamura, Tokyo (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 146 days.

(21) Appl. No.: 18/381,809

(22) Filed: Oct. 19, 2023

(65) Prior Publication Data

US 2024/0265086 A1 Aug. 8, 2024

(30) Foreign Application Priority Data

Feb. 2, 2023 (JP) ................................. 2023-014574

(51) Int. Cl.
*G06F 21/44* (2013.01)
(52) U.S. Cl.
CPC .................................... *G06F 21/44* (2013.01)
(58) Field of Classification Search
CPC ...................................................... G06F 21/44
USPC .......................................................... 726/17
See application file for complete search history.

(56) References Cited

U.S. PATENT DOCUMENTS

| | | | | | |
|---|---|---|---|---|---|
| 10,832,807 | B2 * | 11/2020 | Ranieri | .................. | G16H 40/67 |
| 11,688,516 | B2 * | 6/2023 | Harr | ...................... | G16H 20/10 340/531 |
| 2013/0065569 | A1 * | 3/2013 | Leipzig | .................. | H04W 4/16 455/420 |
| 2018/0032696 | A1 * | 2/2018 | Rome | .................. | A61B 5/6802 |
| 2018/0113984 | A1 * | 4/2018 | Doshi | .................. | G16H 20/40 |
| 2018/0308588 | A1 * | 10/2018 | Tate | .................... | G06F 21/6245 |
| 2018/0342329 | A1 * | 11/2018 | Rufo | ...................... | G16H 40/67 |
| 2019/0111299 | A1 * | 4/2019 | Radcliffe | ............. | A61H 1/0274 |
| 2019/0175093 | A1 | 6/2019 | Suzuki | | |
| 2020/0051677 | A1 * | 2/2020 | Harrison | ............... | G06F 3/0483 |

(Continued)

FOREIGN PATENT DOCUMENTS

| | | |
|---|---|---|
| JP | 2021-18760 A | 2/2021 |
| JP | 2022-11919 A | 1/2022 |

(Continued)

OTHER PUBLICATIONS

Microsoft Computer Dictionary 31 (5th ed. 2002) (Year: 2002).*

(Continued)

*Primary Examiner* — David P Zarka
(74) *Attorney, Agent, or Firm* — BIRCH, STEWART, KOLASCH & BIRCH, LLP

(57) ABSTRACT

A terminal device including: a memory configured to be capable of storing a first application and a second application to assist care for a care receiver, the first application being different from the second application; and a controller configured to execute the first application or the second application, wherein the controller is configured to: execute the first application, if the first application is activated after authentication processing of the care receiver has been executed, using an authentication result of the care receiver, and execute the second application, if the second application is activated after the first application has finished, in a state where the authentication result of the care receiver is maintained.

15 Claims, 37 Drawing Sheets

(56) References Cited

U.S. PATENT DOCUMENTS

| | | | | | |
|---|---|---|---|---|---|
| 2020/0118680 | A1 * | 4/2020 | Rao | .......................... | G16H 20/10 |
| 2020/0234826 | A1 * | 7/2020 | Said | ........................ | G16H 10/60 |
| 2020/0294637 | A1 * | 9/2020 | Saneii | .................... | G16H 40/67 |
| 2021/0012892 | A1 * | 1/2021 | Nagura | ..................... | G06F 3/14 |
| 2021/0077860 | A1 * | 3/2021 | Posnack | ............. | A63B 24/0075 |
| 2022/0168154 | A1 | 6/2022 | Dean et al. | | |
| 2022/0226167 | A1 | 7/2022 | Paskov et al. | | |
| 2023/0020686 | A1 | 1/2023 | Kamai | | |
| 2023/0065458 | A1 * | 3/2023 | Abadi | .................... | G16H 40/67 |
| 2023/0078667 | A1 * | 3/2023 | Lin | ......................... | G06F 21/34 |
| | | | | | 726/17 |
| 2023/0097769 | A1 * | 3/2023 | Karim | .................... | G06Q 30/06 |
| | | | | | 705/2 |
| 2024/0225558 | A1 * | 7/2024 | Ishikawa | .............. | A61B 5/0077 |

FOREIGN PATENT DOCUMENTS

| | | | |
|---|---|---|---|
| JP | 2022-524080 | A | 4/2022 |
| JP | 2022-537516 | A | 8/2022 |
| WO | WO 2021/192475 | A1 | 9/2021 |

OTHER PUBLICATIONS

Web Page, "https://dfree.biz/", Triple W Japan, 2018, 9 pages.
Yanai et al., "Food Image Recognition Using Deep Convolutional Network With Pre-Training and Fine-Tuning", IEEE, 2015, pp. 1-6.

* cited by examiner

BED POSITION OF MR/MS AAA

USE CASE 1 (AT TIME OF WAKE-UP)

*FIG. 15*

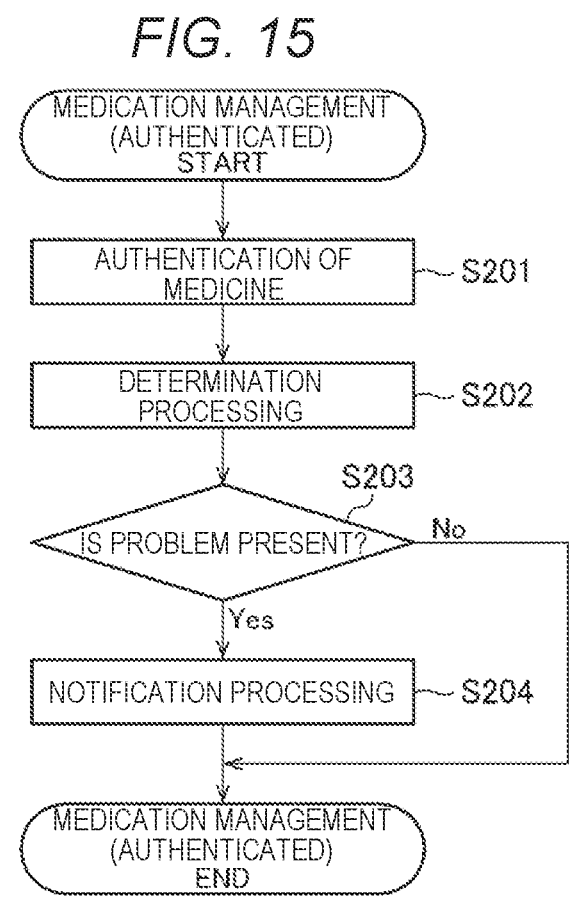

```
    ┌──────────────────────────────┐
    │  MEDICATION MANAGEMENT       │
    │      (AUTHENTICATED)         │
    │         START                │
    └──────────────┬───────────────┘
                   │
                   ▼
    ┌──────────────────────────────┐
    │   AUTHENTICATION OF          │──── S201
    │       MEDICINE               │
    └──────────────┬───────────────┘
                   │
                   ▼
    ┌──────────────────────────────┐
    │   DETERMINATION              │──── S202
    │     PROCESSING               │
    └──────────────┬───────────────┘
                   │                    S203
                   ▼
         ◇─────────────────────◇   No
         ◇  IS PROBLEM PRESENT? ◇──────────┐
         ◇─────────────────────◇           │
                   │ Yes                    │
                   ▼                        │
    ┌──────────────────────────────┐        │
    │  NOTIFICATION PROCESSING     │── S204 │
    └──────────────┬───────────────┘        │
                   │◄───────────────────────┘
                   ▼
    ┌──────────────────────────────┐
    │  MEDICATION MANAGEMENT       │
    │      (AUTHENTICATED)         │
    │          END                 │
    └──────────────────────────────┘
```

USE CASE 2 (DINING ROOM)

USE CASE 2 (DINING ROOM)

USE CASE 3 (AT TIME OF GOING TO BED)

Figure 26:
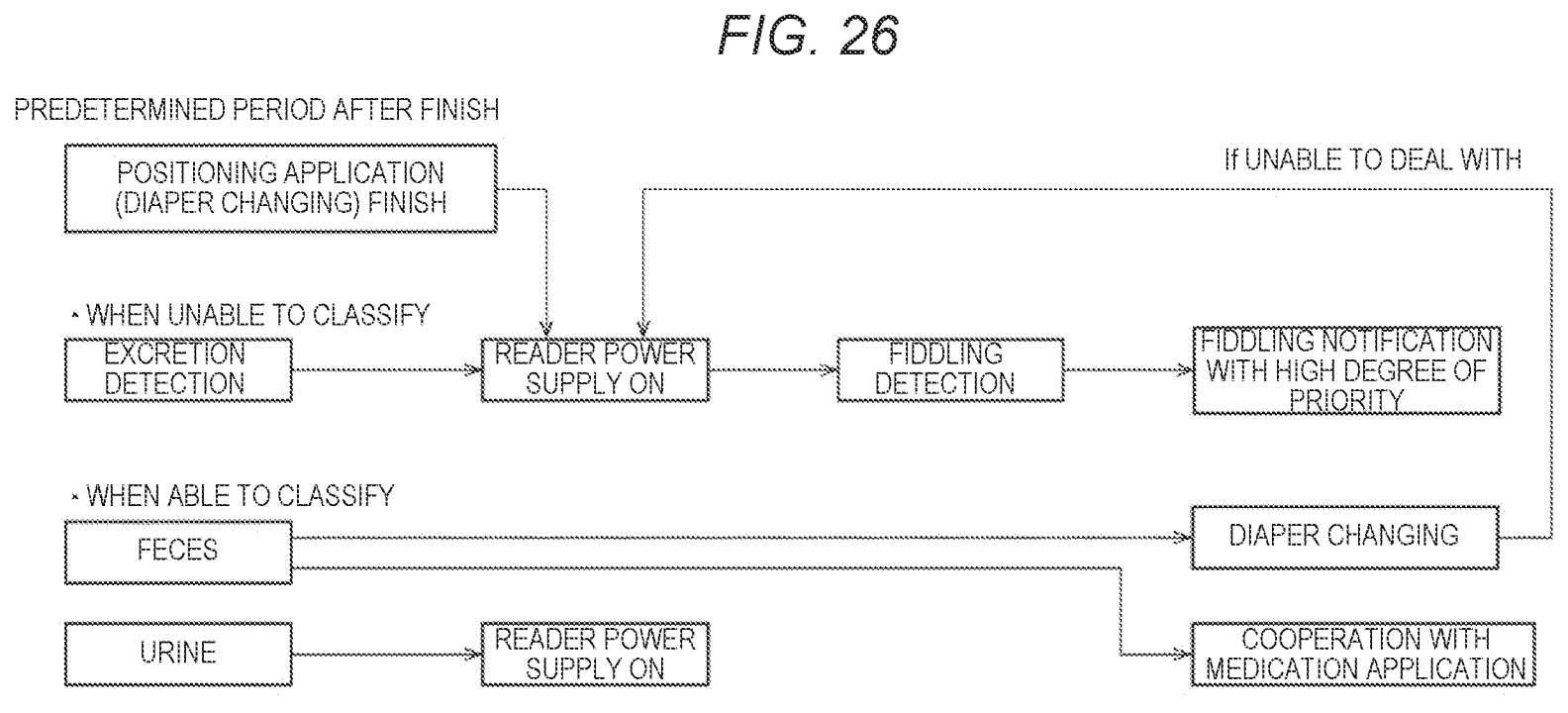

PREDETERMINED PERIOD AFTER FINISH

POSITIONING APPLICATION (DIAPER CHANGING) FINISH

If UNABLE TO DEAL WITH

- WHEN UNABLE TO CLASSIFY

EXCRETION DETECTION

READER POWER SUPPLY ON

FIDDLING DETECTION

FIDDLING NOTIFICATION WITH HIGH DEGREE OF PRIORITY

- WHEN ABLE TO CLASSIFY

FECES

URINE

READER POWER SUPPLY ON

DIAPER CHANGING

COOPERATION WITH MEDICATION APPLICATION

APPLICATIONS ASSISTING CARE FOR A CARE RECEIVER

CROSS-REFERENCE TO RELATED APPLICATIONS

This Non-provisional application claims priority under 35 U. S. C. § 119 (a) on Patent Application No. 2023-014574 filed in Japan on Feb. 2, 2023, the entire contents of which are hereby incorporated by reference.

FIELD

Embodiments relate to a terminal device, a control method, and the like.

BACKGROUND

Systems have been known that are used in scenes where care givers provide care to care receivers. Japan laid-open application publication 2021-18760 discloses a method of disposing a sensor in a living space, and generating provision information related to a state of a resident who lives in the living space based on time change of detection information acquired by the sensor.

BRIEF DESCRIPTION OF THE DRAWINGS

FIG. 15 is a flowchart describing processing of a medication application in the case where the retrieval application is used.

FIG. 21 is a flowchart describing processing of the medication application in a case where omission notification is made.

FIG. 22 is a diagram describing a medication schedule and deadline timing in a care facility or the like.

FIG. 26 is a diagram illustrating an example of cooperation processing of fiddling detection and feces detection.

DETAILED DESCRIPTION

Figure 1:
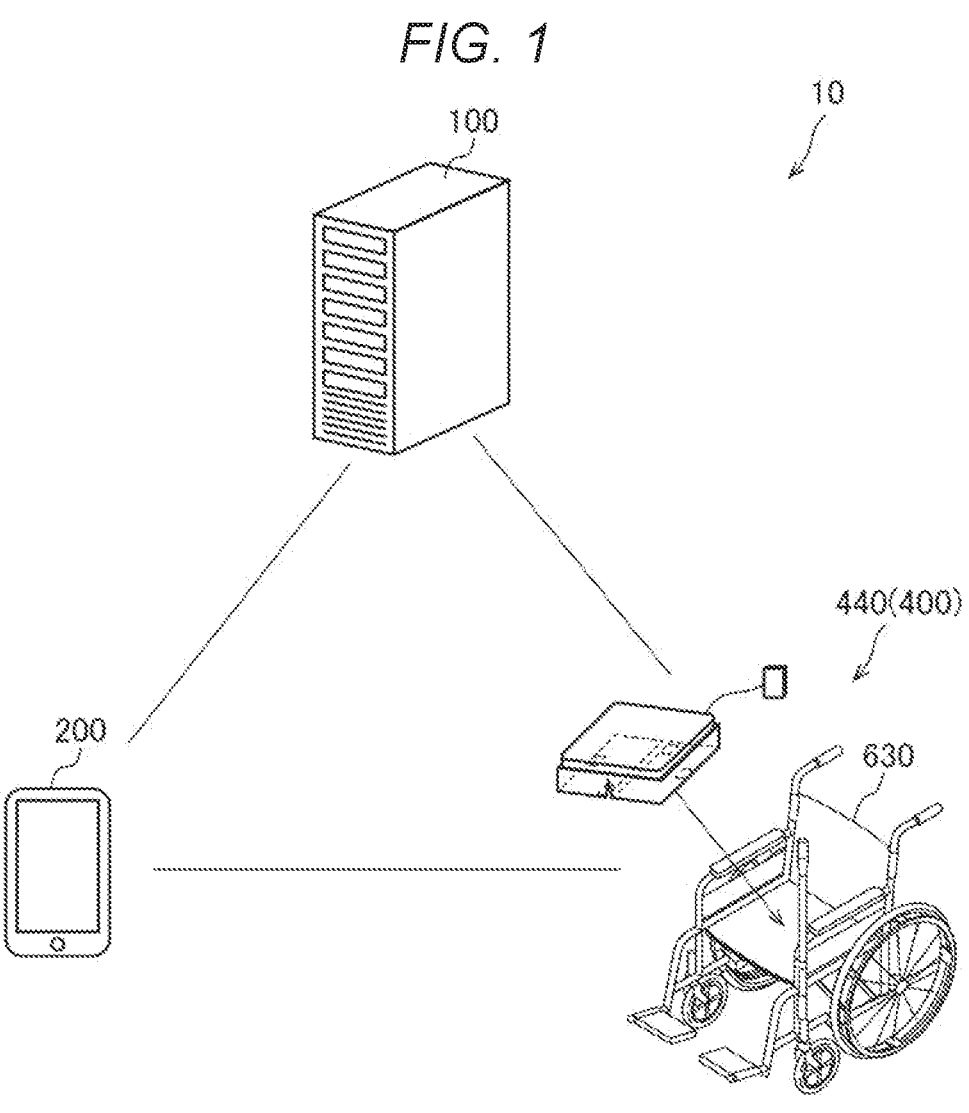
FIG. 1 is a diagram illustrating a configuration example of an information processing system.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, or a combination of hardware and software in execution.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software stored on a non-transitory electronic memory or firmware that confers at least in part the functionality of the electronic components. While various components have been illustrated s separate components, it will be appreciated that multiple components can be implemented as a single component, or a single component can be implemented as multiple components, without departing from example embodiments. Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer-readable (or machine-readable) device or computer-readable (or machine-readable) storage/communications media having a computer program stored thereon. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802. XX wireless technologies and/or legacy telecommunication technologies.

In general, one aspect of the present application is a terminal device including: a memory configured to be capable of storing a first application and a second application to assist care for a care receiver, the first application being different from the second application; and a controller configured to execute the first application or the second application, wherein the controller is configured to: execute the first application, if the first application is activated after authentication processing of the care receiver has been executed, using an authentication result of the care receiver, and execute the second application, if the second application is activated after the first application has finished, in a state where the authentication result of the care receiver is maintained.

Another aspect of the present application is a control method of a terminal device, the terminal device being configured to be capable of storing a first application and a second application to assist care for a care receiver, the first application being different from the second application, the control method including: executing the first application, if the first application is activated after authentication processing of the care receiver has been executed, using an authentication result of the care receiver, and executing the second application, if the second application is activated after the first application has finished, in a state where the authentication result of the care receiver is maintained.

Hereinafter, the present embodiment will be described with reference to the drawings. As for the drawings, the same reference numerals are given to the same or similar elements, and redundant descriptions are omitted. Note that, the present embodiments to be described below do not unduly limit the scope of the claims. Moreover, all the configurations to be described in the present embodiments do not need to be essential features in the disclosure.

1. System Configuration Example

As for work that is performed by a skilled care giver in accordance with his or her "intuitions" and "tacit knowledge", for example, in scenes of care in a care facility, home-visit care, and the like, an information processing system 10 according to the embodiment supports, by digitalizing the "intuition" and the "tacit knowledge", the other care givers so as to perform suitable care independent of the degree of proficiency. For example, the tacit knowledge of the skilled worker is implemented as application software. Hereinafter, application software is simply expressed as application. For example, the information processing system 10 in the embodiment may be a system that implements the improvement in convenience of the application related to care. Note that, the application in the embodiment is not limited to one in which the tacit knowledge is digitalized, but may be software that supports care by a care giver without using the tacit knowledge. Moreover, a care giver herein is a person in charge of performing care to a care receiver, and includes a care manager, a care worker, and a home-care worker, for example. Moreover, there is also a case where a family of a care receiver performs care of the care receiver in at-home care, so that the care giver in the embodiment may include the family of the care receiver. Hereinafter, the information processing system 10, and respective devices that are provided in the information processing system 10 are described in details.

FIG. 1 illustrates a configuration example of the information processing system 10 including an information processor according to the embodiment. The information processing system 10 includes, for example, a server system 100, a terminal device 200, and a sensing device 400. Further, the configuration of the information processing system 10 is not limited to that in FIG. 1, but various modifications such as omitting a part of the configuration, adding another configuration, and the like can be made.

The terminal device 200 in FIG. 1 is device in which an application according to the embodiment operates, and is, for example, a terminal used by a care giver. The terminal device 200 is, for example, a mobile terminal device such as a smartphone or a tablet terminal. Note that, the terminal device 200 may be another device including a personal computer (PC), a head set, a wearable device such as augmented reality (AR) glasses and mixed reality (MR) glasses, and the like.

The sensing device 400 is a device that is disposed in a living environment of a care receiver, and performs measurement operation (sensing operation) related to the care receiver himself or herself, or the environment of the care receiver. For example, an application that operates in the terminal device 200 may have a function of performing cooperation with the sensing device 400. The sensing device 400 is, for example, a seat surface sensor 440, which is described later using FIG. 5. Note that, the sensing device 400 is not limited to the seat surface sensor 440, but various devices can be used including a detection device 430, which is described later using FIG. 6, a swallowing and choking detection device 460, which is described later using FIG. 7, a microphone and an odor sensor for performing feces detection, a camera that is disposed in a room of a care receiver and the like, a communication tag 470, which is described later using FIGS. 9A to 9C and a reader for reading the communication tag 470, and the like. Details of the respective sensing devices 400 are described later.

The server system 100 is electrically connected or communicable to the terminal device 200 and the sensing device 400, via a network, for example. The network herein is, for example, a public communication network such as the Internet. Further, the network is not limited to the public communication network, but may be a local area network (LAN) and the like. The server system 100 may perform communication in accordance with the standard of IEEE802.11, for example. Further, various modifications for the communication method between the respective devices can be made. For example, the sensing device 400 may be directly electrically connected or communicatable to the server system 100, or may be electrically connected or communicatable to the server system 100 via another device such as the terminal device 200.

The server system 100 may be one server, or may include a plurality of servers. The server system 100 may include a database server and an application server, for example. The database server may store information transmitted from the terminal device 200 and the sensing device 400. The application server performs various kinds of processing based on the information. Moreover, in the following description, at least part of the processing to be executed by the terminal device 200 and the sensing device 400 may be executed by the application server. Note that, the plurality of the servers herein may be physical servers or may be virtual servers. Moreover, in a case where a virtual server is used, the virtual server may be provided in one physical server, or may be disposed in a distributed manner to a plurality of physical servers. As in the foregoing, various kinds of modifications for the specific configuration of the server system 100 in the embodiment can be made.

Figure 2:
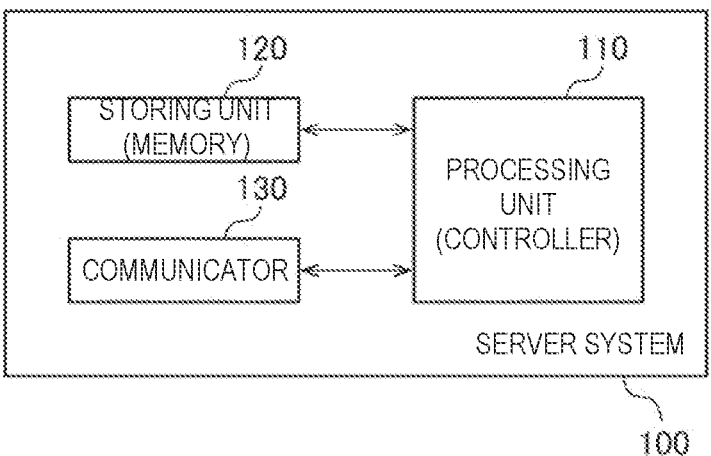
FIG. 2 is a diagram illustrating a configuration example of a server system.

FIG. 2 is a block diagram illustrating a detailed configuration example of the server system 100. The server system 100 includes, for example, a processing unit 110 (a controller), a storing unit 120 (a memory), and a communicator 130. Further, the configuration of the server system 100 is not limited to that in FIG. 2, but modifications such as omitting a part of the configuration, adding another configuration, and the like can be made.

The processing unit 110 in the embodiment is implemented by hardware described below. The hardware can include at least one of a circuit for processing digital signals and a circuit for processing analog signals. For example, the hardware may be implemented by one or a plurality of circuit devices mounted to a circuit substrate and/or one or a plurality of circuit elements. One or a plurality of circuit devices are, for example, an integrated circuit (IC) and a field-programmable gate array (FPGA). One or a plurality of circuit elements are, for example, a resistance and a capacitor.

Moreover, the processing unit 110 may be implemented by processors described below. The server system 100 in the embodiment includes a memory that stores information, and a processor that operates based on the information stored in the memory. The information is, for example, a program and various kinds of data. The memory may be the storing unit 120, or may be another memory. The processor includes hardware. As the processors, various kinds of processors including a central processing unit (CPU), a graphics processing unit (GPU), a digital signal processor (DSP), and the like can be used. The memory may be a semiconductor memory such as a static random access memory (SRAM), a dynamic random access memory (DRAM), and a flash memory, may be a register, may be a magnetic storage device such as a hard disk device (HDD: hard disk drive), and may be an optical storage device such as an optical disc device. For example, the memory stores an instruction readable by a computer, and the processor executes the instruction, thereby implementing a function of the processing unit 110 as processing. The instruction herein may be an instruction in an instruction set constituting the program, or may be an instruction to instruct the hardware circuit of the processor to operate.

The storing unit 120 is a work area of the processing unit 110, and stores various kinds of information. The storing unit 120 can be implemented by various kinds of memories, and the memory may be a semiconductor memory such as SRAM, DRAM, a read only memory (ROM), and a flash memory, may be a register, may be a magnetic storage device, and may be an optical storage device.

The communicator 130 is an interface for performing communication via the network, and includes, in a case where the server system 100 performs wireless communication, for example, an antenna, a radio frequency (RF) circuit, and a base band circuit. Note that, the server system 100 may perform wired communication, and the communicator 130 in that case may include a communication interface such as an Ethernet connector, a control circuit of the communication interface, and the like. The communicator 130 may operate in accordance with the control by the processing unit 110, or may include a processor for communication control different from the processing unit 110. The communicator 130 may perform communication in accordance with a scheme defined in the standard of IEEE802.11 and IEEE802. 3, for example. Note that, various kinds of modifications for a specific communication scheme can be made.

Figure 3:
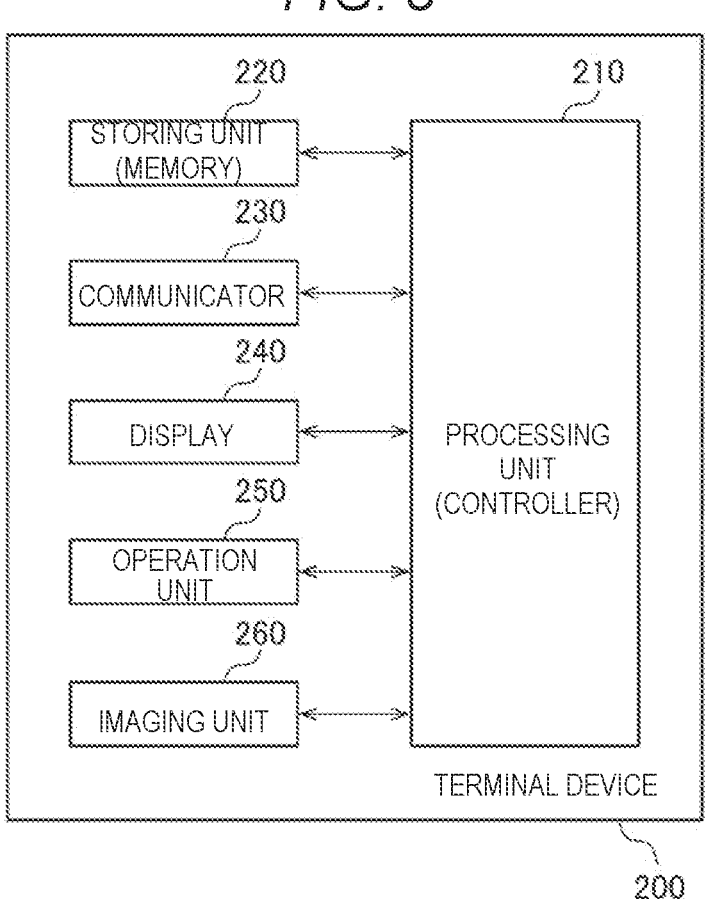
FIG. 3 is a diagram illustrating a configuration example of a terminal device.

FIG. 3 is a block diagram illustrating a detailed configuration example of the terminal device 200. The terminal device 200 may include, for example, a processing unit 210 (a controller), a storing unit 220 (a memory), a communicator 230, a display 240, an operation unit 250, and an imaging unit 260. Further, the configuration of the terminal device 200 is not limited to that in FIG. 3, but modifications such as omitting a part of the configuration, adding another configuration, and the like can be made.

The processing unit 210 is implemented by hardware including at least one of a circuit for processing digital signals and a circuit for processing analog signals. Moreover, the processing unit 210 may be implemented by processors. As the processor, various kinds of processors including CPU, GPU, DSP, and the like can be used. The processor executes an instruction stored in the memory of the terminal device 200, thereby implementing the function of the processing unit 210 as processing.

The storing unit 220 is a work area of the processing unit 210, and is implemented by various kinds of memories including SRAM, DRAM, ROM, and the like. The storing unit 220 stores various kinds of applications according to the embodiment, and the applications herein may be an application using the tacit knowledge, or may be an application not using the tacit knowledge. A specific example of the application is described later.

The communicator 230 is an interface for performing communication via the network, and includes, for example, an antenna, an RF circuit, and a base band circuit. The communicator 230 performs communication with the server system 100 via the network, for example. The communicator

230 may execute wireless communication in conformity with the standard of IEEE802.11, for example, with the server system 100. Moreover, the communicator 230 may perform communication with the sensing device 400 that is used for care for a care receiver. Note that, the communication scheme is not limited to the standard of IEEE802.11, but other schemes such as Bluetooth (registered trademark) and near field communication (NFC) may be used.

The display 240 is an interface that displays various kinds of information, and may be a liquid crystal display, may be an organic EL display, or may be a display using another scheme. The operation unit 250 is an interface that receives a user operation. The operation unit 250 may be a button or the like that is provided in the terminal device 200. Moreover, the display 240 and the operation unit 250 may be integrally configured as a touch panel.

The imaging unit 260 includes an image sensor that outputs image information by imaging a predetermined imaging range. The image information herein may be a still image or may be a moving image. Moreover, the image information may be color or may be monochrome. Moreover, the imaging unit may include a depth sensor that detects a distance to a subject, or may include a sensor (for example, an infrared sensor) or the like that detects heat of the subject.

Moreover, the terminal device 200 may include a configuration, which is not illustrated in FIG. 3. For example, the terminal device 200 may include various kinds of sensors including a motion sensor such as an acceleration sensor and a gyroscope sensor, a pressure sensor, a global positioning system (GPS) sensor, and the like. Moreover, the terminal device 200 may include a light emission unit, a vibration unit, a sound input unit, a sound output unit, and the like. The light emission unit is, for example, a light emitting diode (LED), and makes a notification by light emission. The vibration unit is, for example, a motor, and makes a notification by vibration. The sound input unit is a microphone, for example. The sound output unit is, for example, a speaker, and makes a notification by sound.

As described above, in the method in the embodiment, the tacit knowledge related to care by a skilled care giver is digitalized. As one example of the digitalization, it can be considered that an application that performs processing corresponding to the tacit knowledge is created, and the application is caused to operate in the terminal device 200, for example. Note that, the tacit knowledge is individually optimized for each care receiver in accordance with an attribute of a care receiver, an environment of the care receiver, and the like, in many cases. Note that, the attribute herein includes an age, a gender, a body height, a body weight, an anamnesis, a medication history, and the like of the care receiver. Moreover, although the application in the embodiment may be an application that does not use the tacit knowledge, in this case as well, it can also be considered that different processing in accordance with a care receiver is executed.

For example, in the application according to the embodiment, a different application is created in accordance with a care receiver in terms of an application of the same type, in some cases. The application of the same type herein indicates an application for supporting care having the same content, for example. For example, as is described later using FIG. 18A, a plurality of positioning applications different for each care receiver may be installed in the terminal device 200. Furthermore, a plurality of positioning applications may be created for one care receiver in accordance with a scene, a purpose, and the like of position adjustment. The positioning application is an application that supports the adjustment of a position and a posture of a person and a thing. Details thereof are described later.

Alternatively, the application in the embodiment may be installed as one application capable of corresponding to a plurality of care receivers, and a processing content of the application may be changed in accordance with a target care receiver. The change in the processing content of the application herein may be ON/OFF switching of each function of the application, or may be a change in a parameter (for example, a threshold) that is used in the determination by the application. For example, plural sets of correct data, that is the labeled training data, (parameters) for a care receiver may be registered in one positioning application, and the correct data may be switched in accordance with a care receiver, so that the positioning application may be used for a plurality of care receivers as targets.

In order to use such an individually optimized application (specially, an application in which the tacit knowledge is digitalized), for example, it can be considered that a care giver performs an operation related to the authentication (identification) of a care receiver. For example, in a case where an application is different for each care receiver, a care giver performs an operation to select an application to be activated in accordance with a care receiver to be cared. Alternatively, in a case where an application for a plurality of care receivers is used, a care giver executes an operation to perform authentication processing of a care receiver. For example, an authentication function to authenticate a care receiver is installed to an application, and a care giver executes an operation for using the authentication function.

However, a plurality of use cases to use an application can be considered in care in care facilities and the like. Accordingly, it has been found that work by a care giver for appropriately using an application may be troublesome according to the circumstances. Specifically, a large number of applications are installed in the terminal device 200, so that a case where searching a desired application is not easy can be considered. Therefore, the embodiment proposes a use method of an application capable of corresponding to a variety of the use cases.

For example, the terminal device 200 according to the embodiment may be as follows. The storing unit 220 stores a first application and a second application for performing processing related to care for a care receiver. The processing unit 210 operates in accordance with the first application and the second application. Further, in a case where the first application is activated after authentication processing of a care receiver has been performed, the processing unit 210 causes the first application to operate using an authentication result of the care receiver. In addition, in a case where the second application is activated after the first application has finished, the processing unit 210 causes the second application to operate in a state where the authentication result of the care receiver before the activation of the first application is maintained.

In other words, the processing unit 210 operates in accordance with the first application and the second application, both the first application and the second application include authentication function, the processing unit 210 can automatically pass the authentication processing in the second application if the processing unit 210 executes authentication processing in the first application. Therefore the processing unit 210 can automatically operate the second application for the care receiver corresponding to the authentication result.

In the care in the care facilities and the like, a scene in which a plurality of care is continuously executed for a specific care receiver as a target can be considered. For example, when the care receiver wakes up, which is described later using FIG. 11, a care giver enters a room of the target care receiver, and continuously executes a plurality of care including the position adjustment using a positioning application, the medication management using a medication application, and the like, for the target care receiver. With the method in the embodiment, in such a scene, a plurality of applications can be caused to operate after the authentication processing has been performed in advance, in a state where the result is succeeded. Accordingly, the authentication for a care receiver does not need to be individually performed in each application. For example, in the method in the embodiment, the authentication for a care receiver does not need to be performed every time when the positioning application is activated and when the medication application is activated, so that the operation burden on the care giver can be reduced, and the care can be smoothly executed. Moreover, even in a case where a large number of applications are installed in the terminal device 200, only a part of applications suitable for the target care receiver can be presented (for example, FIGS. 14B and 14E, which are described later), a user burden for searching the application can be reduced.

Note that, in the embodiment, a retrieval application (third application) that executes the authentication processing before the activation of each application, and processing of retrieving an application related to the target care receiver may be used. In this way, for example, even in a scene in which an application is created for each care receiver, and a large number of applications are thus installed in the terminal device 200, an application suitable for the care receiver is easily selected and presented. As a result, the care giver can easily select the application and thus it is possible to improve the convenience for the care giver. An operation and the like of the retrieval application are described later using FIGS. 13 to 14E and other drawings. Hereinafter, processing of performing authentication processing of a care receiver using a retrieval application, and then activating each application in the retrieval application or from the retrieval application is expressed as first activation processing. In a case where the first activation processing has been performed, the authentication result can be applied in each application as described above, so that the authentication for each application becomes unnecessary. Note that, the first activation processing only needs to be activation processing in which a result of the authentication processing is available in a plurality of applications, and may include processing that does not use the retrieval application.

Moreover, the use case of the application in the care facilities and the like is not limited to the above, but a scene in which same care is repeatedly executed for a plurality of care receivers as targets can be considered. For example, in a scene of a dining room, which is described later using FIGS. 16A and 16B, a care giver successively executes the medication management using a medication application for several tens of care receivers as targets. In this case, it can be considered that repeatedly executing the authentication for a care receiver to be managed in the medication application contributes the convenience more than maintaining the authentication result. Therefore, in the embodiment, both of the processing of sharing the authentication result in a plurality of applications, and the processing of performing the authentication for a care receiver every time in one application may be executable. In this way, even in a case where a variety of use cases are assumed, it becomes possible to cause the care giver to easily use an application (specially, an application that uses the tacit knowledge). Hereinafter, processing of activating each application without using the retrieval application is expressed as second activation processing. In a case where the second activation processing has been performed, the authentication processing of a care receiver is executed for each application.

Moreover, part or all of the processing that is performed by the information processing system 10 in the embodiment may be implemented by a program. The processing that is performed by the information processing system 10 is processing that is performed by the processing unit 210 of the terminal device 200 in the narrow sense, but may be processing that is performed by the processing unit 110 of the server system 100. Moreover, the processing that is performed by the information processing system 10 may include processing that is executed by a processor in the sensing device 400.

The program according to the embodiment can be stored in a non-temporary information storage medium (information storage device) that is a medium readable by a computer, for example. The information storage medium can be implemented by, for example, an optical disc, a memory card, an HDD, or a semiconductor memory. The semiconductor memory is an ROM, for example. The processing unit 210 and the like perform the various kinds of the processing in the embodiment based on a program that is stored in the information storage medium. In other words, the information storage medium stores the program for causing a computer to function as the processing unit 210 and the like. The computer is an apparatus that is provided with an input device, a processing unit, a storing unit, and an output unit. Specifically, the program according to the embodiment is a program for causing the computer to execute respective steps, which are described later using FIGS. 13, 15, 17, 19, 21, 23, and other drawings.

Moreover, the method in the embodiment can be applied to a control method including the following respective steps. The control method herein is a control method of the terminal device 200 that is a terminal device to be used by a care giver who executes care for a care receiver, and stores the first application and the second application that perform the processing related to the care for the care receiver. The control method includes a step of causing, in a case where the first application is activated after the authentication processing of a care receiver has been performed, the first application to operate using an authentication result of the care receiver, and a step of causing, in a case where the second application is activated after the first application has finished, the second application to operate in a state where the authentication result of the care receiver is maintained.

2. Application

Next, a detailed example of an application that operates in the terminal device 200 is described. Note that, in the application herein, a determination result determined by a skilled care giver is used in setting of processing parameters and the like, for example. Note that, in a case where the application cooperates with the sensing device 400, a detailed example of the sensing device 400 is described together. Moreover, a example how to cooperate with a plurality of applications and the sensing device 400 is described as well using FIG. 10.

2.1 Detailed Example

<Positioning Application>

A positioning application is an application that performs processing related to a position or a posture of at least one of a person and a thing in the care. The positioning application may be used in posture adjustment of a care receiver or the like in a bed 610, or may be used in posture adjustment of a care receiver or the like in a wheelchair 630. For example, the positioning application may operate in a setting mode in which setting is performed and in a use mode in which actual position adjustment is supported in accordance with the setting. For example, in the setting mode, the positioning application acquires the correct data (the labeled training data) in which a person or a thing is captured at a desired position or a desired posture based on an operation by a skilled caregiver. Further, in an operation mode, the positioning application superimposes and displays the correct data subjected to transmission processing on an captured image in which a person or a thing to be adjusted is captured.

Figure 4A:
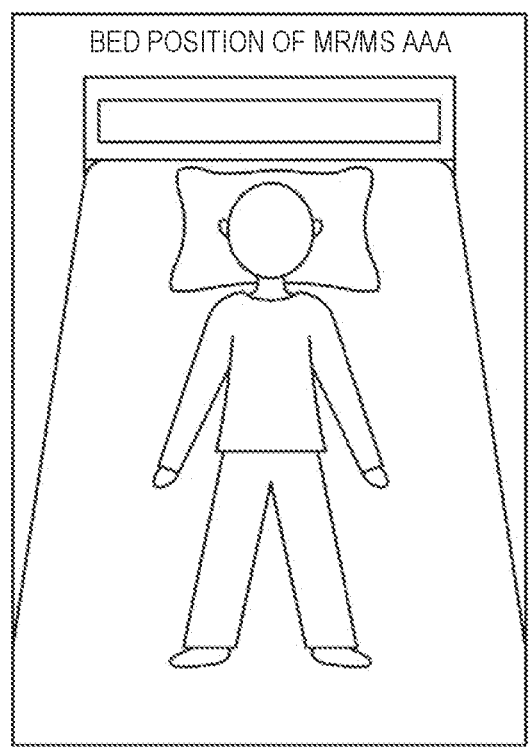
FIG. 4A illustrates an example of labeled training data in a positioning application.
Figure 4B:
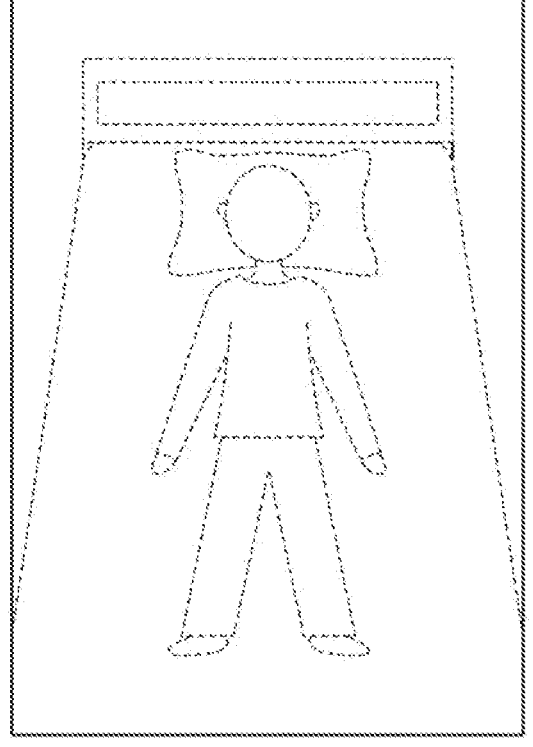
FIG. 4B illustrates an example of labeled training data that is superimposed and displayed in the positioning application.

FIG. 4A illustrates one example of the correct data that is acquired in the setting mode. In the example in FIG. 4A, the image information indicating a desired posture when a care receiver having a name of "AAA" lies down on the bed 610 is acquired as the correct data. FIG. 4B illustrates an image to be superimposed and displayed on the captured image in the use mode, which is an example of the correct data subjected to the transmission processing. For example, the terminal device 200 superimposes and displays the image in FIG. 4B on the captured image in which a care receiver as the target of position adjustment is captured. A care giver performs care of the care receiver such that the care receiver on the captured image becomes closer to the correct data. In this way, the position adjustment by the care giver can be appropriately supported.

Note that, although an example in which the correct data serving as the image information is superimposed and displayed has been described herein, the positioning application may output a determination result (OK or NG) indicating whether a posture or a position of a care receiver or the like is adequate. For example, the positioning application may determine whether the posture or a position of a care receiver is OK or NG based on the degree of similarity between an image captured during the position adjustment and the correct data, and output a determination result. Specifically, the positioning application may determine whether postures of a care receiver and a care giver are adequate, or may determine whether a position or posture of thing such as a cushion or a device is adequate. Note that, the determination result as to whether the posture or a position of a care receiver is OK or NG may be determined based on skeleton information on the care receiver that is included in the correct data and the skeleton information on the care receiver that is included in the image captured during the position adjustment (details thereof are described later).

Moreover, the positioning application may perform processing of displaying a detailed point which the positioning application determines NG as the determination result. For example, the positioning application may perform processing of comparing the captured image with the correct data, and highlighting a location or an area determined as having a large difference. Alternatively, the positioning application may output a detailed instruction indicating how the position of the cushion should be changed or how the posture of the care receiver should be changed. Note that, the location determined as having a large difference may be a joint point of the care giver based on skeleton information on the care receiver that is included in the correct data and skeleton information on the care receiver that is included in the image captured during the position adjustment (details thereof are described later).

Moreover, the positioning application may receive additional information such as a point or a proposal that a skilled care giver considers important in the setting mode, and present the additional information in the use mode. The additional information may include information such as the position and the angle of a predetermined site, and the presence or absence, the size, and the softness of a cushion. Moreover, in a case where the positioning application has determined that a care receiver should use welfare equipment such as a cushion to adjust the posture or the position of the care receiver easily based on a determination result of the care receiver, the positioning application may make recommendation of or propose welfare equipment suitable for the care receiver. Moreover, even if the care receiver has already used a cushion, in a case where the position of the cushion is not appropriately adjusted and the size of the cushion is different from the size of a cushion included in the labeled training data, and other cases, a new cushion or the like may be recommended. If the skilled care givers use the position applications respectively for many care receivers, the server system 100 would store lots of correct data. If the lots of correct data can be classified by attributes of the care receivers, the learned model can be generated by learning the lots of correct data. Therefore the positioning application can recommend the new cushion. The recommendation herein may designate the size, the hardness, and the like of the cushion or the like, or may designate a specific commodity (the model and the like). Moreover, in a case where a specific commodity is designated, the positioning application may output link information on an EC web site or the like that sells the commodity.

A detailed example of the positioning application is described later using FIGS. 29A to 33C.

<Seat Surface Sensor Application>

Figure 5:
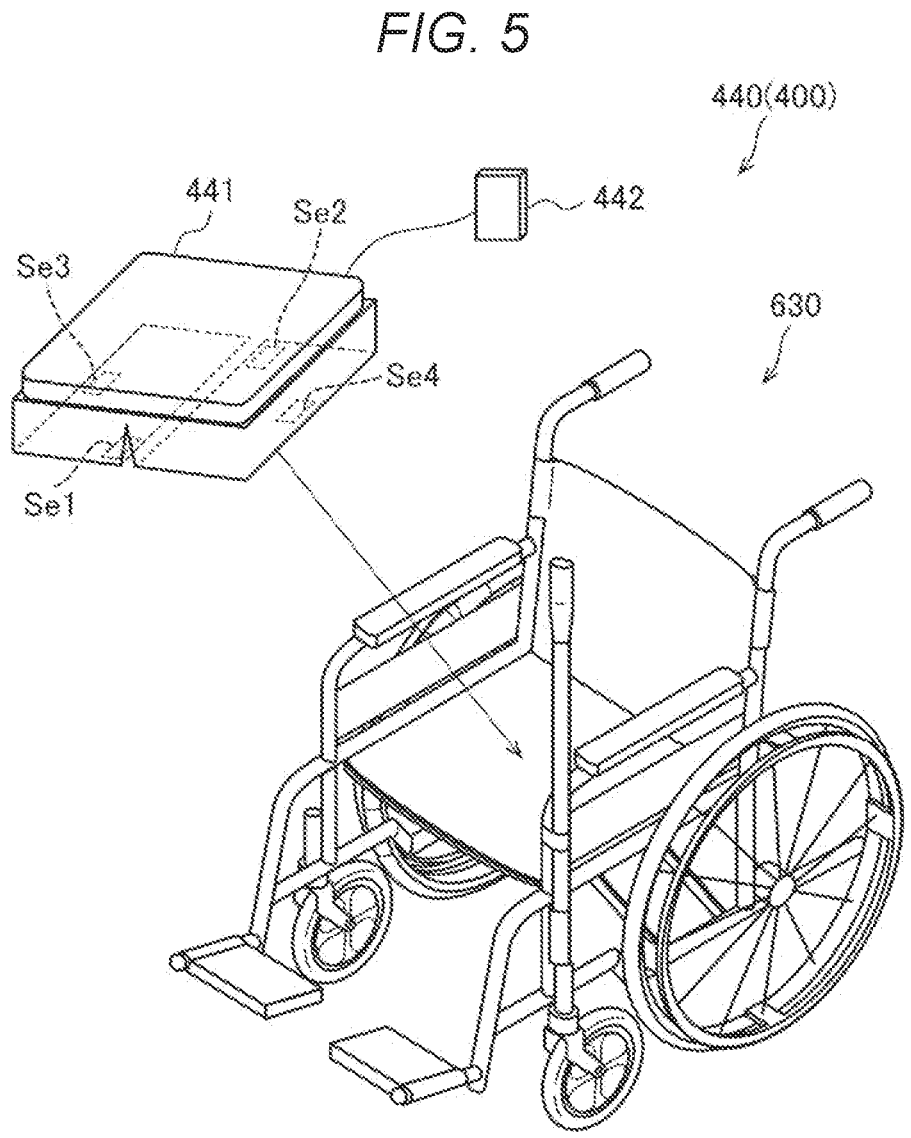
FIG. 5 illustrates an example of a pressure sensor that is disposed in a wheelchair.

A seat surface sensor application is an application having a function to cooperate with the seat surface sensor 440 serving as the sensing device 400. FIG. 5 is a diagram illustrating the seat surface sensor 440 that can be disposed on a seat surface of the wheelchair 630. The seat surface sensor 440 includes a pressure sensor that outputs a pressure value, and outputs the pressure value.

In the example in FIG. 5, four pressure sensors Se1 to Se4 are disposed on a back surface side of a cushion 441 that can be disposed to the seat surface of the wheelchair 630. The pressure sensor Se1 is a sensor that is disposed in front, the pressure sensor Se2 is a sensor that is disposed rearward, the pressure sensor Se3 is a sensor that is disposed rightward, and the pressure sensor Se4 is a sensor that is disposed leftward. Note that, the front, rear, left, and right directions herein indicate directions seen from a care receiver in a state where the care receiver is seated on the wheelchair 630. The pressure sensors Se1 to Se4 are electrically connected to a control box 442. The control box 442 includes a processor that controls the pressure sensors Se1 to Se4, and a memory that serves as a work area of the processor, in an inside thereof. The processor detects a pressure value by causing the pressure sensors Se1 to Se4 to operate.

The seat surface sensor application may determine, for example, based on the pressure value from the seat surface sensor 440, a posture (hereinafter, also described as a seated posture) of the care receiver when being seated on the wheelchair 630 is which one of a plurality of postures including normal, front shift, horizontal shift, and other postures. The front shift indicates a state where the center of gravity of a user is shifted in the front direction compared with the normal state, and the horizontal shift indicates a state where the center of gravity of the user is shifted in either one of left and right directions compared with the normal state. For example, the seat surface sensor application determines as to be the front shift in a case where a value of the pressure sensor Se1 has increased by a predetermined value or more compared with an initial state, and determines as to be the horizontal shift in a case where a value of the pressure sensor Se3 or Se4 has increased by a predetermined value or more compared with the initial state. Moreover, the seat surface sensor application may perform the determination of a falling possibility to determine a possibility whether a care receiver falls down from the seat surface.

As is understood from the description in the foregoing, the seat surface sensor application may determine the position and the posture of a care receiver on the wheelchair 630 by using information from the seat surface sensor 440, or may be included in the aforementioned positioning application. For example, in the setting mode of the positioning application, data from the seat surface sensor 440 may be presented to a user. In this way, the care givers can set the correct data more accurately while seeing the seat surface data, so that the care givers can set data corresponding to more suitable posture and position of the care receiver sitting on the wheelchair 630 as the correct data. Moreover, the terminal device 200 in the embodiment may store a mattress cooperation application that makes a determination related to a posture of a care receiver on the bed 610 in cooperation with a mattress 620 capable of detecting the pressure. The mattress cooperation application also determines the position or the posture of the care receiver on the bed 610, and thus may be included in the aforementioned positioning application. In this case as well, for example, in the setting mode of the positioning application, data from the mattress may be presented to the user. In this way, the care givers can set the correct data more accurately while seeing the data from mattress, so that the care givers can set data corresponding to more suitable posture and position of the care receiver lying on the bed 610 as the correct data.

<Standing-Up Detection Application>

Figure 6:
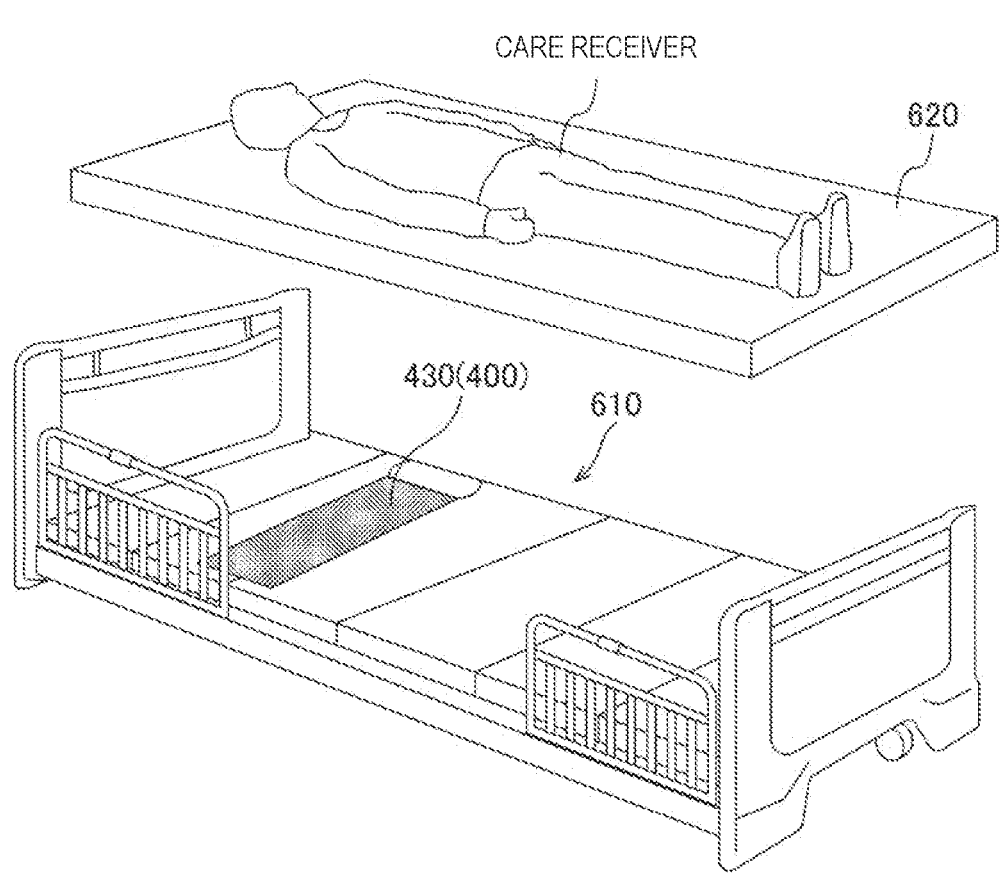
FIG. 6 illustrates an example of a device that is disposed in a bed.

A standing-up detection application is an application that detects standing-up by a care receiver from the bed 610, the wheelchair 630, or the like. FIG. 6 illustrates an example of the sensing device 400 that can use the standing-up detection application, and an example of the detection device 430 that is disposed to sections of the bed 610. The detection device 430 is a sheet-shaped or plate-shaped device that is provided between the sections of the bed 610 and the mattress 620, for example, as illustrated in FIG. 6.

The detection device 430 includes a pressure sensor that outputs a pressure value. The detection device 430 detects, when a user goes to bed, body vibration (body movement, vibration) of the user via the mattress 620. Based on the body vibration detected by the detection device 430, information related to a respiratory rate, a heartbeat rate, an amount of activity, a posture, whether the user is awaken or sleeping, whether the user gets out of the bed or staying in the bed is obtained. Moreover, the detection device 430 may determine non REM sleep and REM sleep, and a sleep depth. For example, the detection device 430 may analyze the periodicity of the body movement, and calculate a respiratory rate and a heartbeat rate from the peak frequency. The analysis of the periodicity is a Fourier transform, for example. The respiratory rate is the frequency of breathing per unit time. The heartbeat rate is the frequency of heartbeats per unit time. The sampling unit time is one minute, for example. Moreover, body vibration is detected per sampling unit time, and the frequency of the detected body vibration may be calculated as an amount of activity. Moreover, the pressure value to be detected decreases when the user gets out of the bed compared with the pressure value when the user stays in the bed, so that a determination of whether the user gets out of the bed or staying in the bed is possible based on the pressure value and a time-series change in the pressure value.

The standing-up detection application may make a determination about motion start of a care receiver based on the information from the detection device 430. For example, in a case where the care receiver has been shifted from a state that the user is staying in the bed to a state that user gets out of the bed, the standing-up detection application determines the motion start. Moreover, from the viewpoint of detecting a sign of the motion start at an earlier stage, the standing-up detection application may determine the motion start in a case where the care receiver has been shifted from a state that the user is sleeping to a state that the user is awaken.

Note that, an example in which the standing-up detection application is in cooperation with the detection device 430 including the pressure sensor has been described herein, but the standing-up detection application is not limited thereto. For example, a camera may be disposed in a room of a care receiver, a living room, a dining room, the bed 610, or the like, and the standing-up detection application may perform the standing-up detection of the care receiver based on an image captured by the camera. For example, the standing-up detection application may determine a posture of a care receiver by performing publicly known skeleton tracking processing, and perform the standing-up detection based on an angle of a specific joint, a distance from a floor surface (seat surface) to a head, and the like.

Moreover, the standing-up detection application may perform processing of preventing the care receiver from standing up. For example, the standing-up detection application may identify a care receiver who intends to stand up by performing processing including face authentication based on an image captured by the camera. In this case, the standing-up detection application outputs a moving image having a high probability of attracting attention of the target care receiver identified by the camera (for example, a moving image of a family of the care receiver, a care giver who makes a good impression on the care receiver, and the like). The moving image herein is displayed, for example, in a case where the standing-up detection application detects that the target care receiver intends to stand up or starts standing up form the bed, on a display that is disposed in the surrounding of the bed. Moreover, in a case where the standing-up detection application detects that the target care receiver intends to stand up or starts standing up in a living room, the moving image may be displayed on a television that is disposed in the living room. For example, the television outputs video based on the normal broadcast waves if the standing-up detection application does not detect that the target care receiver intends to stand up or starts standing up (that is, a non-detection state of the standing-up), and outputs a moving image corresponding to the target care receiver if the standing-up detection application detects that the target care receiver intends to stand up or starts standing up. In a case of a care receiver who is not accustomed to using a tablet terminal and the like, there is a possibility that the care receiver does not gaze a moving image displayed on the tablet terminal, however, using the television makes it possible to cause the care receiver to naturally browse a moving image that attracts his or her attention. Moreover, the detection processing of a care receiver and the output processing of a moving image may be performed in the entrance of the care facilities to prevent the care receiver from going home without any approval. For example, there is a possibility that a care receiver for short stay or the like who intends to go home goes out from the entrance. In that regard, outputting a moving image that attracts attention of a care receiver on the display disposed in the entrance can prevent the care receiver from going out outside the facility. Note that, in the detection processing of a care receiver, for example, in a case where a care receiver is continuously detected only for a predetermined period, the detection of the care receiver may be determined.

<Swallowing and Choking Detection Application>

A swallowing and choking detection application is an application that determines a swallowing state of the care receiver, the presence or absence of choking (whether the care receiver is choking or not), and the like, when the care receiver eats a meal and the like. The swallowing and choking detection application may operate in conjunction with the swallowing and choking detection device 460 serving as the sensing device 400.

Figure 7:
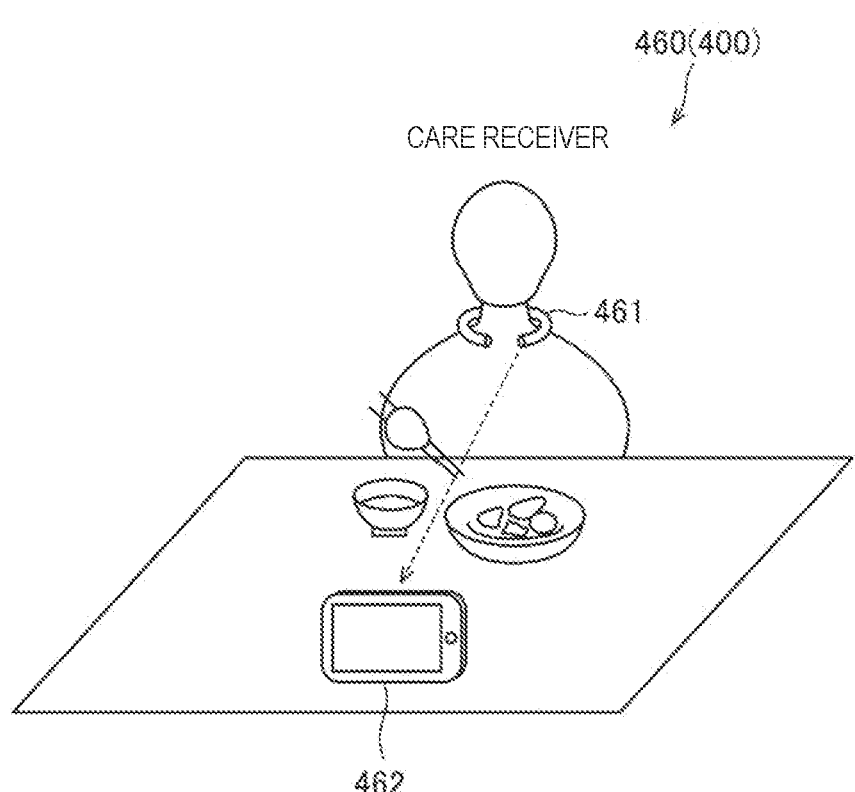
FIG. 7 illustrates an example of a swallowing and choking detection device.

FIG. 7 is a diagram illustrating an example of the swallowing and choking detection device 460 that is used in a meal scene. As illustrated in FIG. 7, the swallowing and choking detection device 460 includes a throat microphone 461 that is attached around a neck of a care receiver, and a terminal device 462 including a camera.

The throat microphone 461 outputs audio data due to swallowing, coughing, and the like by a care receiver. The terminal device 462 outputs an image captured by the camera when the care receiver eats a meal. The terminal device 462 is, for example, a smartphone or a tablet type PC that can be placed on a table where the care receiver has a meal. The throat microphone 461 electrically connected or communicatable to the terminal device 462 by using Bluetooth or the like. Note that, various kinds of modifications for a specific connection form can be made.

The swallowing and choking detection application determines whether the care receiver is choking or swallowing based on the audio data of the throat microphone 461. A device of detecting swallowing by using a microphone attached around a neck is described in U.S. patent application Ser. No. 16/276,768, filed on 15 Feb. 2019, "Swallowing action measurement device and swallowing action support system", for example. This patent application is fully incorporated as the prior art in the specification of the present application by reference. The swallowing and choking detection application can detect the frequency of choking, choking time (occurrence time, continuous time, and the like), and whether the care receiver has been swallowing, based on the audio data.

Moreover, the camera of the terminal device 462 captures images of a care receiver from a front direction, for example, as illustrated in FIG. 7. Therefore, the swallowing and choking detection application may detect a mouth and eyes of a care receiver, and chopsticks, a spoon, and the like to be used by the care receiver, based on the captured image. Note that, various kinds of methods of detecting these parts of the face, and the objects based on the image processing are known, and the publicly known methods are widely applicable in the embodiment.

For example, the swallowing and choking detection application may obtain swallowing time from when a care receiver opens his or her mouth to when he or she swallows, based on a detection result of the swallowing from the audio data, and a determination result whether the care receiver opens his or her mouth. In this way, for example, in a case where the frequency of swallowing is decreased, a specific situation, such as whether no motion itself of taking food into the mouth has been performed or whether the food has been taken into the mouth but no swallowing is made, can be determined. As a result, an aspiration risk and the like in the meal can be determined with high accuracy. Note that the swallowing and choking detection application may obtain swallowing time from when a care receiver closes his or her mouth instead of opening his or her mouth to when he or she swallows, based on a detection result of the swallowing from the audio data, and a determination result whether the care receiver opens his or her mouth.

<Dietary Intake Application>

A dietary intake application is an application that determines the intake of food and the intake of moisture due to a meal of a care receiver. The dietary intake application may determine the intake amount based on an image captured by imaging a meal set on the table, for example. The image herein may be captured by the camera of the terminal device 462 of the swallowing and choking detection device 460, or may be captured by another camera.

Figure 8A:
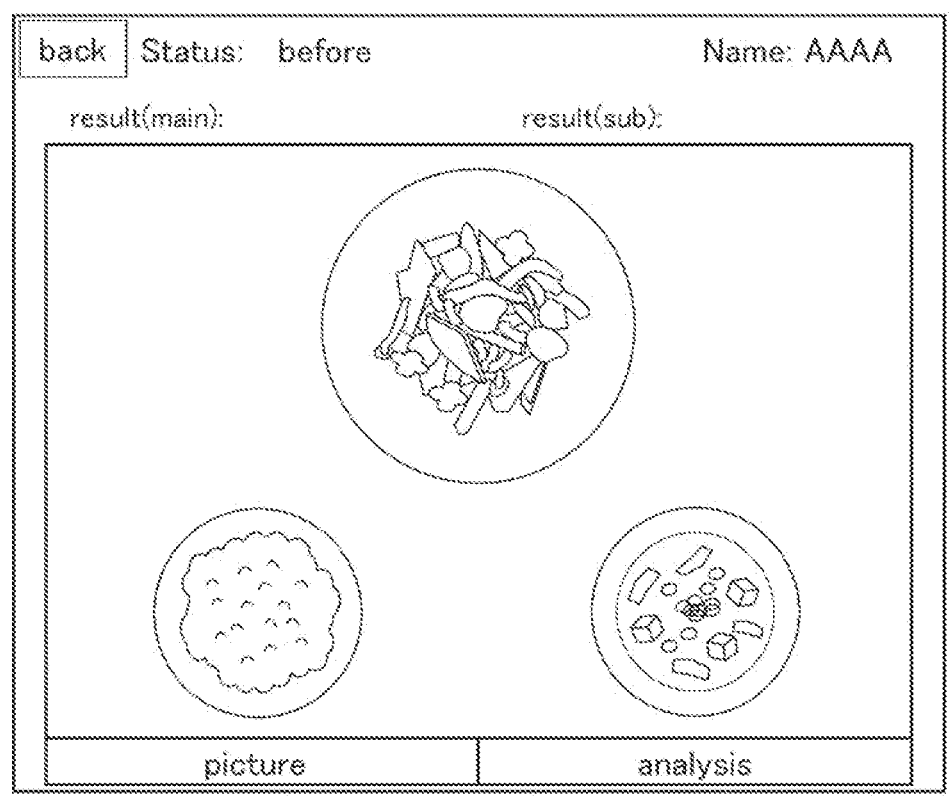
FIG. 8A illustrates a display screen example in a dietary intake application.
Figure 8B:
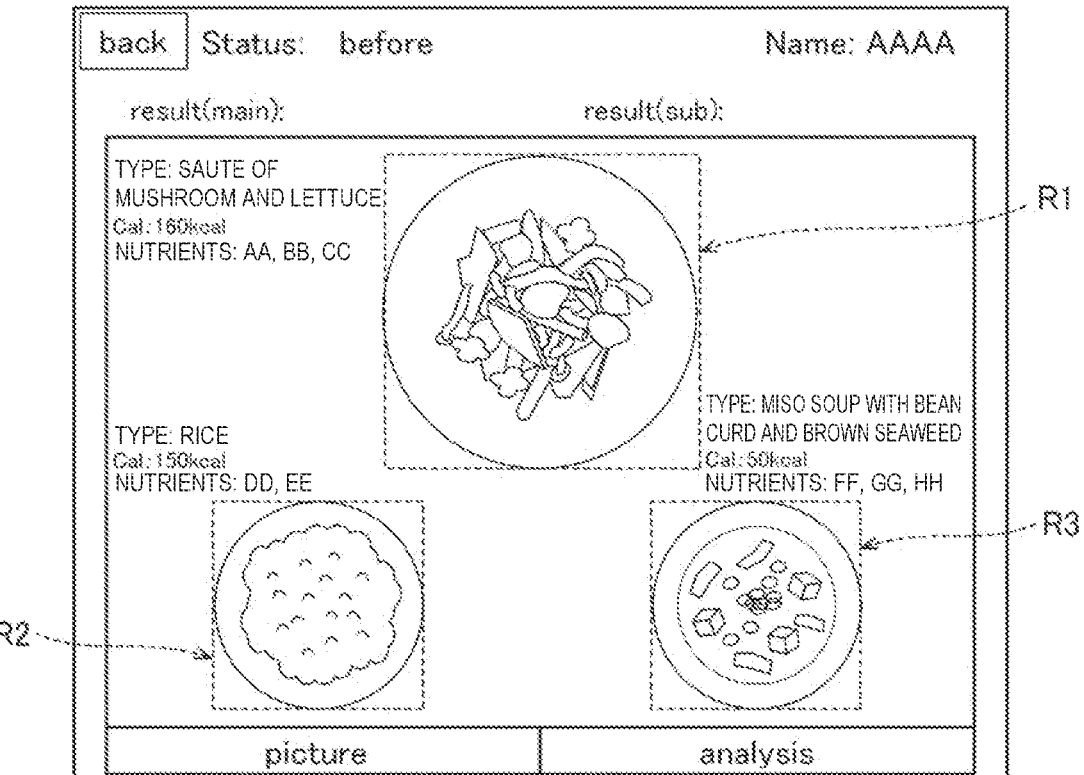
FIG. 8B illustrates a display screen example in the dietary intake application.

FIGS. 8A and 8B are diagrams describing the processing that is executed by the dietary intake application, and illustrate examples of a display screen including a captured image. In the example illustrated in FIG. 8A, meals dished up in three vessels are captured. As illustrated in FIG. 8B, the dietary intake application detects regions corresponding to dishes from a still image. For example, the dietary intake application performs processing of detecting a rectangular region containing the vessel in which food is dished up. Herein, rectangular regions R1 to R3 including three vessels respectively are detected by the detection processing. The publicly known object detection methods can be widely applied to this processing, so that a detailed description is omitted.

The dietary intake application performs processing of obtaining types of the foods based on the rectangular regions R1 to R3 detected by the object detection. For example, in "FOOD IMAGE RECOGNITION USING DEEP CONVOLUTIONAL NETWORK WITH PRE-TRAINING AND FINE-TUNING" by Yanai et al., a method of recognizing food from an image based on deep convolutional neural network (DCNN) is disclosed. The dietary intake application in the embodiment may obtain the type of the food based on a result by the image processing, in a manner as these methods. For example, the dietary intake application inputs images respectively corresponding to the rectangular regions R1 to R3 into DCNN to identify the types of the foods. In the example in FIG. 8B, an example in which an identification result indicating that the three dishes are respectively "RICE", "MISO SOUP WITH BEAN CURD AND BROWN SEAWEED", and "SAUTE OF MUSHROOM AND LETTUCE" is acquired is illustrated. Moreover, based on the identification result of the type of the food, the calorie and the type of a nutrient that are taken from each food are identified.

Moreover, the dietary intake application acquires a captured image which is an image of a state after the care receiver had eaten the meal, and performs the similar processing to identify a decrease amount of the food. The dietary intake application may determine that the decrease amount is an intake amount by the care receiver. Moreover, the dietary intake application may obtain the calorie and the nutrient taken by the care receiver, by combining information on the calorie and the nutrient described above with the intake amount.

<Medication Application>

A medication application is an application for managing the medication by a care receiver. The medication application performs processing of authenticating (identifying) a care receiver who should take a medication, and processing of authenticating information on a packed medicine (for example multiple type of medicine which the care receiver should take is packed in one bag), for example, based on an image captured by the imaging unit 260. In the method in the embodiment, as mentioned above, the identification of a care receiver may be executed by acquiring a result of the authentication processing performed before the medication application is activated, or may be executed as a function of the medication application. The identification of a care receiver may be performed by the face authentication, by optical character recognition/reader (OCR) processing of a label on which a name and the like are written, or by reading of a QR code (registered trademark) including information related to the care receiver, and these may be selected in accordance with the situation. Details thereof are described later. Moreover, information on a medicine may include information indicating a care receiver who is included in a prescription of the medicine, and timing (hereinafter, written as medication timing) when the medicine should be taken. The medication timing is any of the time that the care receiver wakes-up, the time before the care receiver eats breakfast, the time after the care receiver had eaten breakfast, the time before the care receiver eats lunch, the time after the care receiver had eaten lunch, the time before the care receiver eats between-meal snack, the time after the care receiver had eaten between-meal snack, the time before the care receiver eats dinner, the time after the care receiver had eaten dinner, and the time that the care receiver starts sleeping, or the time that the care receiver starts staying in the bed for example.

The medication application may determine, for example, based on an authentication result of a care receiver and an authentication result of a medicine, and the current time, whether the care receiver who takes the medication matches the care receiver who is included in a prescription of the medicine, and whether the current time is coincident with the medication timing. If a determination indicating being unsuitable has been made in at least one of these determinations, the medication application may make a notification of warning the care giver. Details of the medication application are described later using FIGS. 15 and 19, and other drawings.

<Fiddling Detection Application>

A fiddling detection application performs processing for detecting that a care receiver puts his or her hand into the clothing (trousers and underwear), and intends to touch (intends to fiddle with) a skin of the care receiver, an inner side of the clothing, and the like. This fiddling detection application can also be applied to a case of detecting that a care receiver has put his or her hand into the clothing (trousers and underwear) or the care receiver has removed the clothes. As a result, it is possible to detect that a care receiver feels itchiness after the care receiver had urinated, and puts his or her hand into the clothes and fiddles, a care receiver puts his or her hand into the clothes and fiddles after the care receiver had defecated in order to take out feces, or a care receiver removes the clothes or a diaper on the bed and excretes, for example.

Figure 9A:
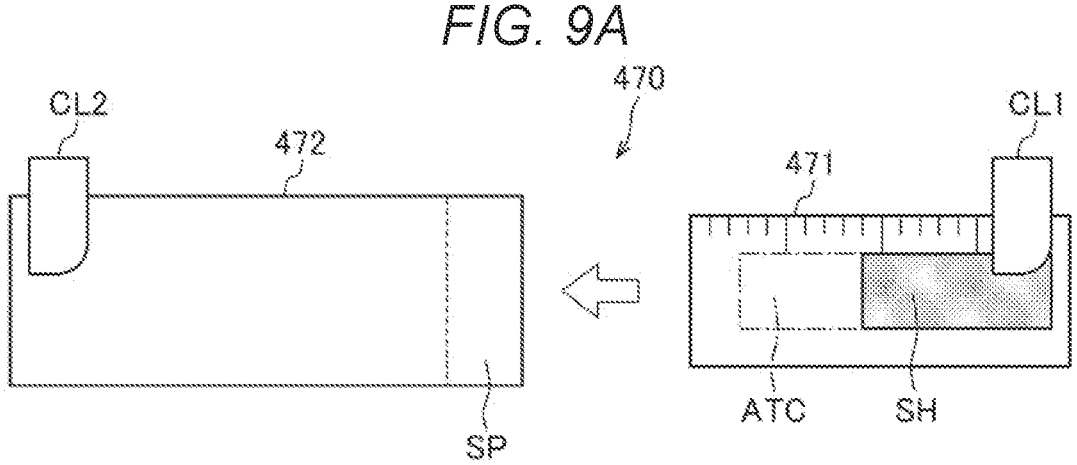
FIG. 9A illustrates a configuration example of a communication tag that detects fiddling.
Figure 9B:
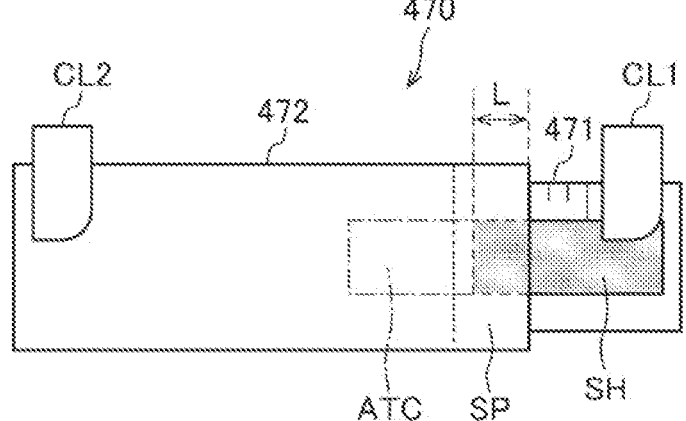
FIG. 9B illustrates a configuration example of the communication tag that detects fiddling.
Figure 9C:
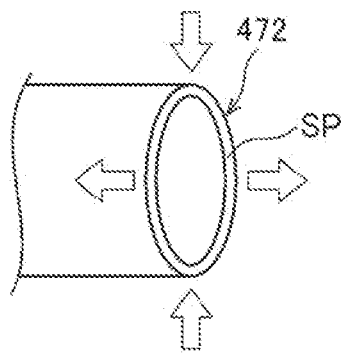
FIG. 9C is a diagram describing motion when a leaf spring of the communication tag is operated.

For example, detection of fiddling may be executed by using the communication tag 470 illustrated in FIGS. 9A to 9C, and a reader that reads signals from the communication tag 470. The communication tag 470 herein is, for example, a radio frequency identification (RFID) tag, and the reader is an RFID reader. For example, the communication tag 470 in the embodiment may be attached to clothing of a care receiver, and may be in a communication impossible state in a case where the communication tag 470 is normally attached to the clothing, and in a communication possible state in a case where the care receiver moves the clothing or the care receiver has put his or her hand into the clothing. The reader transmits a reading result of the communication tag 470 to the server system 100. In a case where a reading result indicating that the communication tag 470 is read by the reader is acquired, the processing unit 110 of the server system 100 determines that the care receiver puts his or her hand into the clothing, and there is a possibility of fiddling.

FIGS. 9A 9B are diagrams illustrating a configuration example of the communication tag 470. For example, the communication tag 470 includes a planar first tag portion 471, and a second tag portion 472 that can contain a part of the first tag portion 471 and is formed in a sac-like shape. A clip portion CL1 can be provided on one end side of the first tag portion 471. Moreover, a circuit ATC including a communication antenna is provided in the first tag portion 471. Note that, a coil or the like, although which is not illustrated in FIG. 9A and the like, for driving the antenna may be provided in the circuit ATC. As illustrated in FIG. 9A, a shielding member SH that shields the communication by the antenna may be provided so as to cover a part of the circuit ATC. For example, a part of the circuit ATC at a side far from the second tag portion 472 in the attached state (FIG. 9B) is covered with the shielding member SH. The shielding member SH is metal, for example, but the detailed configuration is not limited thereto, and another member that shields radio waves may be used.

The second tag portion 472 has a substantially rectangular shape in a plan view, and is a sac-like member having an opening on one side in the longitudinal direction. Alternatively, the second tag portion 472 may be a tubular member having openings on sides in the both directions in the longitudinal direction. A clip portion CL2 is provided at an end portion of the second tag portion 472 on a side opposite to a side where the first tag portion 471 is inserted. Moreover, a shielding member that shields communication radio waves by the antenna of the first tag portion 471 is provided on a part or all of the surface of the second tag portion 472. The shielding member herein is, for example, a cloth through which radio waves are difficult to pass, but a member of metal or the like may be used.

As illustrated in FIG. 9B, for example, the communication tag 470 in a state where a portion of the first tag portion 471 including at least a part of the circuit ATC is inserted into the second tag portion 472 is attached to the clothing of a care receiver (a portion corresponding to a waist of the trousers, for example), by using the clip portions CL1 and CL2. Specifically, the first tag portion 471 is inserted into the second tag portion 472 as illustrated in FIG. 9B, from the side thereof where the circuit ATC is not shielded by the shielding member SH. More specifically, the first tag portion 471 may be attached in a state where the entire portion that is not shielded by the shielding member SH in the circuit ATC is contained in the second tag portion 472, or where at least a part of the shielding member SH is contained in the second tag portion 472. In this case, the first tag portion 471 is only inserted into the second tag portion 472, and no fixing member is provided between the first tag portion 471 and the second tag portion 472.

In a case where a care receiver puts his or her hand into the clothing in such a state, the hand of the care receiver is entered into between the clothing and a body (abdominal region) of the care receiver, which results in a stretched state of the waist circumference of the clothing. The waist circumference stretches to extend a distance between a fixed location of the clip portion CL1 and a fixed location of the clip portion CL2, so that the first tag portion 471 relatively moves in a direction away from the second tag portion 472. Note that, in order to facilitate the relative movement of the first tag portion 471 and the second tag portion 472, at least one of the first tag portion 471 and the second tag portion 472 may be formed of a member having stretching properties.

The first tag portion 471 relatively moves to expose a portion of the first tag portion 471 contained in the second tag portion 472 in a usual state to an outside of the second tag portion 472. Accordingly, in a case where the antenna of the first tag portion 471 is exposed to the outside of the second tag portion 472 to the extent that allows the communication, the communication tag 470 is shifted to a state readable by a reader. Specifically, a portion of the circuit ATC in the first tag portion 471 that is not covered with the shielding member SH is exposed to the outside of the second tag portion 472 to shift the antenna in the circuit ATC to a communication possible state. Meanwhile, in the usual state in which the care receiver does not put his or her hand into the clothing and in a case where the stretch state of the clothing is small, the antenna of the first tag portion 471 is shielded by the second tag portion 472 to the extent that hinders communication (because the portion of the circuit ATC that is not covered with the shielding member SH is shielded by the second tag portion 472), so that the communication tag 470 is maintained in a state unreadable by the reader.

In other words, by using the communication tags illustrated in FIGS. 9A and 9B, whether the care receiver puts his or her hand into the clothing can be determined, so that it is possible to appropriately determine whether a possibility that the care receiver is fiddling.

For example, the fiddling detection application may be an application that associates the communication tag 470 with a care receiver. For example, the fiddling detection application acquires information for identifying a care receiver, and performs processing of transmitting the information whether the care receiver is fiddling in association with information (for example, an ID, and the like) for identifying the communication tag 470, to the server system 100. In this way, the processing unit 110 of the server system 100 can appropriately associate the reading result whether the care receiver is fiddling by the reader with information on a related care receiver.

Alternatively, the fiddling detection application may acquire a reading result whether the care receiver is fiddling from the reader. In this case, the fiddling detection application performs processing of associating the communication tag 470 with a care receiver, and determines a possibility whether the care receiver is fiddling based on whether the communication tag 470 associated with the target care receiver has been read.

Note that, for the improvement in convenience, as illustrated in FIGS. 9A and 9B, the first tag portion 471 of the communication tag 470 may include a scale for indicating a length of the circuit ATC that is exposed from the second tag portion 472 (a length of the circuit ATC that is inserted into the second tag portion 472). The scale may be used to indicate a length of the shielding member SH that is exposed from the second tag portion 472. The risk of fiddling is different in accordance with the attribute of the care receiver. For example, a care receiver who shows an improper behavior caused by dementia has a higher risk of fiddling (for example, feces fiddling in which a care receiver fiddles around feces) than a care receiver who does not show the improper behavior. The detection sensitivity of fiddling is preferably set higher to a care receiver having a high risk compared with a care receiver having a low risk. In that regard, the extent of the length of the circuit ATC or of the shielding member SH that is exposed from the second tag portion 472 in the first tag portion 471 is clearly indicated with the scale, so that the care giver can appropriately set the attached state when the care giver attaches the communication tag 470 to the clothing of the care receiver. For example, the communication tag 470 is attached to a care receiver having a high risk such that the antenna in the circuit ATC has a shorter margin length for a communication possible state (so as to have a longer length of the first tag portion 471 projected from the second tag portion 472), compared with a care receiver having a low risk. The margin herein is the length of a portion, of the shielding member SH, contained in the second tag portion 472, and corresponds to a length L in FIG. 9B. In a case where the margin is relatively short, the antenna is shifted in a communication possible state even when the care receiver puts his or her hand into the clothing slightly, so that fiddling can be detected sensitively. On the other hand, for a care receiver having a low risk, the length of the margin before the antenna is exposed is set to be longer (to have a shorter portion, of the first tag portion 471, that is exposed from the second tag portion 472), so that the unnecessary notification can be prevented.

Moreover, as illustrated in FIGS. 9A and 9B, a leaf spring SP may be provided in an opening portion of the second tag portion 472. The leaf spring SP herein may be a spring that generates, in a case where a force is applied from a given direction, a force in a direction that intersects (direction orthogonal to, in the narrow sense) the direction. For example, as illustrated in FIG. 9C, in a case where a force is applied from a vertical direction (up-and-down direction in the attached state) of the second tag portion 472, the leaf spring SP generates a force in a direction (front-and-rear direction in the attached state) that intersects the vertical direction, in other words, a force in a direction that causes the sac-like or tubular second tag portion 472 to open. Note that, instead of the leaf spring SP, a hard member (for example, plastic) that deforms, when a force in a predetermined direction is applied thereto, in a direction to cause the second tag portion 472 to open, may be used.

As described above, in a case where the communication tag 470 is shifted to a readable state because a care receiver puts his or her hand into the clothing, the readable state continues until the first tag portion 471 is again inserted into the second tag portion 472. Accordingly, for example, there is a possibility that the notification of warning fiddling is continuously transmitted, so that after the care by the care giver is conducted or the care giver rush near the care receiver, it is desired that the first tag portion 471 is immediately reinserted into the second tag portion 472. In that regard, the leaf spring SP is used to easily open the second tag portion 472, which allows the care giver to easily insert the first tag portion 471.

<Feces Detection Device Application>

A feces detection device application is an application that cooperates with the sensing device 400 that performs feces detection. The sensing device 400 herein may be, for example, a microphone that is disposed in a toilet. A device that identifies whether the care receiver had defecated, urinated, or farted based on audio data indicating a defecation sound, a urination sound, or a flatulence sound, is described, for example, in the application JP2020/048939 (WO 2021/192475) "WASTE IDENTIFICATION METHOD, WASTE IDENTIFICATION DEVICE, AND WASTE IDENTIFICATION PROGRAM", which is internationally filed on 25 Dec. 2020. This patent application is fully incorporated in the specification of the present application by reference.

For example, the microphone disposed in the toilet may transmit the audio data to the server system 100. The processing unit 110 of the server system 100 identifies whether the care receiver had defecated, urinated, or farted based on the audio data. The feces detection device application may acquire, for example, based on position data, information for identifying a toilet to be used by a target care receiver, or information for identifying a microphone provided in the toilet. Further, the feces detection device application transmits information that associates the care receiver identified by the authentication processing with the toilet or the microphone, to the server system 100. In this way, the processing unit 110 of the server system 100 can appropriately determine the audio data from the microphone corresponds which care receiver.

Moreover, the sensing device 400 that performs feces detection may be, for example, an imaging device (camera) that is disposed in a toilet. A device that image-analyses an image in which urine and feces are captured to determine a state of the urine and the feces is described, for example, in Japanese Patent Application No. 2020-113343 "BIOLOGICAL INFORMATION PROVIDING DEVICE, BIOLOGICAL INFORMATION PROVIDING METHOD, AND BIOLOGICAL INFORMATION PROVIDING PROGRAM", which is filed on 30 Jun. 2020. This patent application is fully incorporated in the specification of the present application by reference. For example, the sensing device 400 in the embodiment may include both of a microphone and a camera. Specifically, by using the audio data from the microphone and image data captured from the camera together, a determination whether the care receiver had defecated or urinated is made. The method of using the audio data and the image data together may be switched in accordance with a situation, for example, in a case where the brightness of the captured image is suddenly changed, the sensing device 400 determined that the reliability of the captured image is low, and the sensing device 400 will determine whether the care receiver had defecated or urinated based on the audio data, and the like.

Alternatively, the feces detection device application may acquire the audio data from the microphone. In this case, the feces detection device application performs processing of associating the audio data with a care receiver, and executes determination processing related to whether the care receiver had defecated, urinated, or farted, based on identification processing using the audio data as an input.

Moreover, the sensing device 400 that performs feces detection is not limited thereto, but may be a device that is provided in the bed 610 or the like. For example, devices that detect whether the care receiver had defecated, urinated, or farted, by using an odor sensor, an electrostatic capacitance sensor that detects a liquid, and the like, are known, and these sensing devices 400 may be used as feces detection devices in the embodiment.

<End-of-Life Care Application>

An end-of-life care application is an application that determines timing when the end-of-life care is started, for example. The end-of-life care indicates care for a patient having a high possibility of dying in the near future. The end-of-life care is different from the normal care in that easing a physical pain and a mental pain, supporting a life with dignity for a target care receiver, and the like are regarded as important.

For example, the end-of-life care application may determine start timing of the end-of-life care, based on information related to the heartbeat rate and the respiratory rate, the meal amount the care receiver could intake (the meal amount of the main dish, the meal amount of the side dish, moisture, and the like), change in body weight or BMI change, change in activities of daily living (ADL), and the like.

2.2 Relation Example Among Applications

Figure 10:
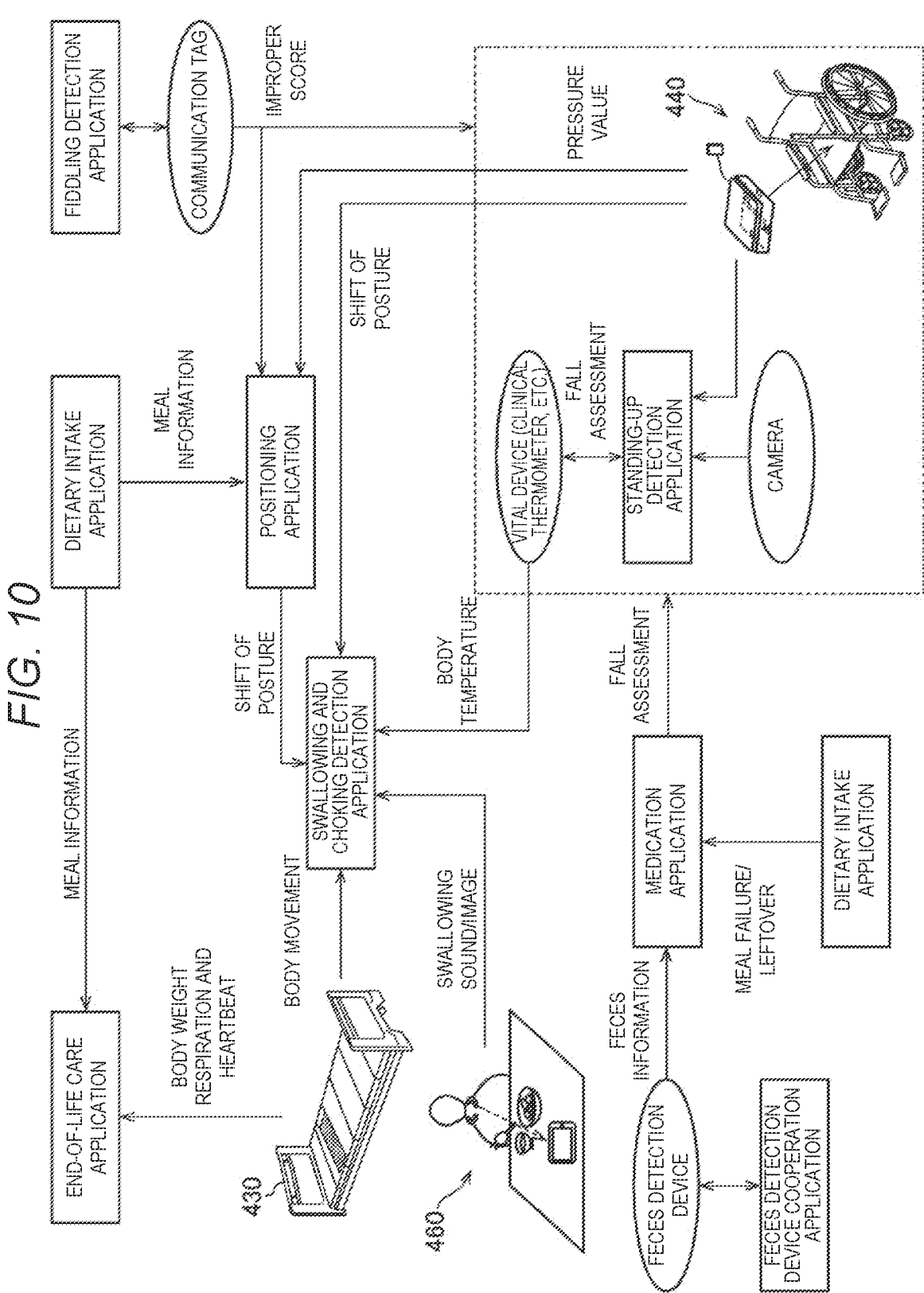
FIG. 10 illustrates a relation example of applications and sensing devices according to a present embodiment.

FIG. 10 is a diagram illustrating a relation example of the aforementioned plurality of applications. For example, the dietary intake application outputs information related to the detected meal which the care receiver could intake to the end-of-life care application and the positioning application. The meal information is used as an input to the end-of-life care application. Moreover, the positioning application can execute processing related to the position adjustment during a meal by using the meal information. Moreover, the transition of a situation of a care receiver (for example, transition of a health state or the like) can be determined from the meal information, so that whether the care receiver is set to use the positioning application may be determined based on the meal information because the care receiver may be developing pressure sores if the meal amount the care receiver could intake is pretty low.

Moreover, based on the output from the communication tag 470, information including the detection frequency of fiddling, a detection place, a time period of detecting fiddling, and the like can be obtained. Note that, as readers that read the communication tag 470, a first reader that is disposed in a place (for example, room) where the target care receiver will stay long, and a second reader that is disposed in the other places which is different from a location of the first reader may be used. The first reader is used for detection processing in the normal life of the target care receiver, and the second reader is used for detection processing in a place that the target care receiver misidentifies as a toilet, for example. In this manner, appropriately disposing the readers allows the processing in accordance with the detection place. Details of the first reader and the second reader are described later. For example, a processing unit of the server system 100 may obtain, based on the information, a probability (improper score) of an improper behavior of dementia based on the situation of fiddling. For example, in a case where the frequency of fiddling on the bed has increased, the processing unit of the server system 100 determines a high possibility of the improper behavior, and the improper score becomes high. A care receiver who shows the improper behavior has a high risk of falling down from the bed 610 or the wheelchair 630, or a high risk of falling when the care receiver stands-up, and the like. In particular, in a case where the detection place of fiddling is shifted from the bed to the place other than the toilet (for example the number of detecting by the second reader is increased), since the target care receiver also moves to the place misidentified as the toilet the risk of falling is increased. Accordingly, the improper score may be output to the positioning application and the standing-up detection application that relate to falling down, falling from anything, and the like. Moreover, in a case where the improper score is high, the care receiver becomes sensitive to positions of the things in the room, and there is a possibility that an improper behavior occurs. Therefore, the correct data on the arrangement of the things in his or her room such as chairs may be acquired in the positioning application based on the improper score, and information that supports care for maintaining the arrangement of the things based on the correct data may be output. For example, in a case where the improper score is high, the processing unit of the server system 100 may recommend to acquire the correct data on the arrangement of the things using the positioning application to a care giver.

Moreover, the positioning application may be cooperated with the seat surface sensor 440 and the mattress 620 capable of detecting the pressure, which is as mentioned above. For example, the aforementioned seat surface sensor application is included in the positioning application. The positioning application may output the detected posture shift to the swallowing and choking detection application. The swallowing and choking detection application can determine the aspiration risk and the like with high accuracy by determining the posture shift. Moreover, in a case where the aspiration or the choking with the high degree of seriousness is generated by the target care receiver, the swallowing and choking detection application may perform processing of determining a cause based on the information indicating a posture shift, and presenting a determination result to the care giver.

The positioning application may perform operation control of the bed 610 or the mattress 620. The positioning application when activated may identify a care receiver from the correct data registered in the positioning application, and inform a care giver who operates the positioning application by voice, for example, whether the operation control of the bed 610 or the mattress 620 of the identified care receiver is accepted. When receiving a voice of the acceptance from the care giver, the positioning application performs an instruction of operation control to the bed 610 or the mattress 620. The setting of the operation control to the bed 610 or the mattress 620 when the positioning application is used may be stored on the bed 610 or the mattress 620, or may be stored in the positioning application. As a result, actual operating a remote controller of the bed 610 or the mattress 620 by the care giver is unnecessary when the care giver uses the positioning application, thereby improving the convenience for the care giver.

Moreover, the position application when activated may identify a care receiver from the correct data registered in the positioning application, and activate a wearable sensor attached to the identified care receiver. The wearable sensor is a device to which a vital device and an acceleration sensor are mounted, for example. The wearable sensor may acquire a direction of a posture of a care receiver, and may provide an instruction of position change to the care giver when the care receiver is in a posture of left lateral position or in a posture of right lateral position during a predetermined period or longer, for example. In this manner, the positioning application can provide the instruction of position change in a case where the positioning application determined that a care receiver is continuously in the same posture based on the wearable sensor, and thus can be used for preventing bedsore of the care receiver.

Further, the positioning application can determine the position of a care receiver only at certain timing, but cannot continuously monitor the care receiver. Moreover, the wearable sensor is caused to continuously operate, thereby allowing continuous monitoring of a care receiver. However, in a case where the wearable sensor is caused to continuously operate, the wearable sensor is forced to operate even at the timing when the monitoring is unnecessary, which results in a demerit that the frequency of changing the battery is increased. In that regard, the wearable sensor is caused to operate using the positioning application as a trigger, whereby the wearable sensor can be caused to operate only at the necessary timing and can be caused to operate in the power saving. In addition, individually making the setting (timing setting of operation/non-operation in the narrow sense) of the wearable sensor is unnecessary, thereby improving the convenience. Furthermore the wearable sensor can be caused not to operate or to stop operating if the care receiver wake up from the bed based on the acceleration sensor in the wearable sensor.

Note that, the example in which the operation control of the bed 610, the mattress 620, and the wearable sensor is performed using the positioning application as a point of contact has been described in the foregoing, but the embodiment is not limited thereto. For example, the application (for example, each application such as the aforementioned seat surface sensor application) other than the positioning application may perform the operation control of the bed 610 and the like. In other words, applications other than the positioning application that are used in the embodiment can operate the bed 610 and the like using the application as a point of contact, allowing the improvement in convenience. Moreover, the device as a target to which the application performs the operation control is not limited to the bed 610, the mattress 620, and the wearable sensor, but may include various kinds of devices (curtains 650, a beverage dispenser 660, and the like), which are described later using FIG. 12, for example.

Moreover, in the embodiment, on the bed 610, body weight measurement, measurement of respiration and heartbeat, and determination whether the care receiver gets out of the bed may be executed possibly. These measurement or determination may be executed by using the aforementioned detection device 430, or a device different from the detection device 430 may be used. A measurement result of the body weight, and information on the respiration and the heartbeat are used as an input to the end-of-life care application. Moreover, information on the body movement on the bed 610 may be output to the swallowing and choking detection application. For example, the swallowing and choking detection application can determine an aspiration risk and the like with high accuracy when the care receiver take a meal on the bed 610 by taking the body movement into consideration. Moreover, whether a care receiver falls into sleep during taking a meal is determined based on the body movement, and the swallowing and choking detection application can also execute processing based on the determination result. For example, in a case where it has been determined that the care receiver falls into sleep, the swallowing and choking detection application may urge a care giver to execute calling-out. Moreover, although the illustration is omitted in FIG. 10, the detection device 430 may calculate an improper score based on information on the respiration, the heartbeat, the sleep, the body movement, and the like. The improper score is output to the standing-up detection application, for example.

Moreover, the feces detection device may output information related to feces to the medication application. The feces detection device application is used in association between the feces detection device and the care receiver, for example, as described above. The medication application may determine whether the care receiver should take a cathartic based on information related to the feces.

Figure 27:
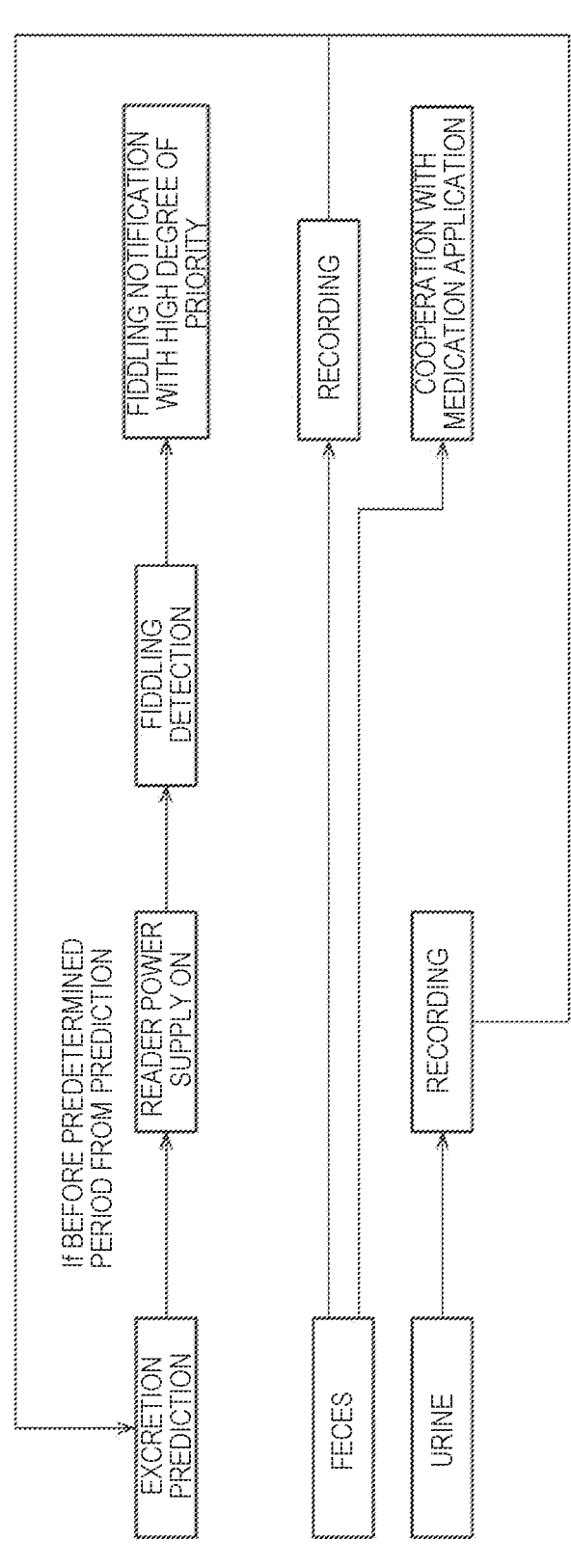
FIG. 27 is a diagram illustrating an example of cooperation processing of fiddling detection and feces detection.
Figure 28:
FIG. 28 illustrates an example of a notification screen related to a cathartic in the medication application.

The cooperation between the feces detection device and the medication application is described later using FIG. 28. Moreover, the control related to fiddling detection may be performed based on the output from the feces detection device, although which is omitted in FIG. 10. For example, a power supply ON or OFF of a reader that reads the communication tag 470 may be controlled based on the output from the feces detection device. Details of the cooperation including feces detection and fiddling is described later using FIGS. 26 and 27.

Moreover, the dietary intake application outputs meal information, specially information related to meal failure and leftover food, to the medication application. The medication application may make a proposal for change of a medicine and the like, based on the meal information. Moreover, the dietary intake application may acquire, for example, by using the camera of the terminal device 462 of the swallowing and choking detection device 460, a captured image of a care receiver in the medication, and determine forgetting to take a medicine and medicine dropping based on the captured image. For example, the dietary intake application may determine whether a medicine remains on a tray on which a dish is placed. In a case where the medicine remains on the tray, the dietary intake application determines that the medicine is not appropriately taken, similar to the case of the medicine dropping. The dietary intake application outputs a determination result to the medication application. In a case where forgetting to take or medicine dropping has been detected, the medication application may notify the care giver of the fact.

Moreover, the standing-up detection application may perform a falling assessment that is an assessment related to the level of a falling risk in the standing-up, or an assessment related to a risk factor, and the like. For example, the medication application may output information related to the medication to the standing-up detection application, as input data on the fall assessment. Moreover, a clinical thermometer that detects a body temperature of a care receiver may be used in the embodiment, and information related to the body temperature may be output to the standing-up detection application, as input data on the fall assessment. Moreover, information related to the body temperature may be output to the swallowing and choking detection application. For example, the swallowing and choking detection application uses the body temperature to make a determination in which a physical condition of the care receiver is considered. For example, the body temperature rises when aspiration occurs, and the swallowing and choking detection application thus makes a determination by taking the body temperature into consideration, so that the accuracy of the aspiration detection can be improved. Moreover, when internal bleeding or the like occurs due to a falling, the body temperature of a care receiver rises. Accordingly, the body temperature is used in the falling assessment, so that an influence (for example, degree of an injury) to the care receiver due to a falling can be appropriately determined. Note that, although the clinical thermometer that detects the body temperature has been exemplified herein, for example, the sensing device 400 that is attached to a skin of a care receiver and determines the degree of perspiration of the care receiver may be used. Information related to the perspiration also can be used in the swallowing and choking detection application, the falling assessment, and the like.

2.3 Terminal Device in which Application Operates

Each application described in the foregoing may operate in the terminal device 200 that is carried by a care giver, for example. For example, one terminal device 200 may be supplied to one care giver, and each care giver may carry the terminal device 200 when performing care service. Alternatively, a relatively few terminal devices 200 (for example, one terminal device 200 in one floor) may be supplied, and a plurality of care givers may share the terminal device 200.

Further, in the terminal device 200, as described above, when an application is activated, either of first activation processing (processing in which an authentication result of a care receiver is used by a plurality of applications) and second activation processing (processing in which authentication processing of a care receiver is executed for each application) is selectable. In other words, the terminal device 200 can function as a terminal device according to the method in the embodiment.

Note that, in the embodiment, a part or all of the aforementioned applications may operate in another device. For example, in the terminal device 462 of the swallowing and choking detection device 460, the applications may operate. The swallowing and choking detection device 460 is used at the time when care receiver take a meal as described above, and the terminal device 462 is a device that is disposed in the dining room, for example. The terminal device 462 does not need to be carried by a care giver, and thus may be implemented by a larger-sized tablet terminal and the like than a smartphone and the like, for example.

For example, the swallowing and choking detection application operates in the terminal device 462, so that an image captured in the terminal device 462 can be processed in the terminal device 462 to accelerate the processing. Moreover, the medication application operates in the terminal device 462, so that the medication management after the care receiver had taken a meal can be smoothly executed by using same terminal device. In particular, by together using the swallowing determination in which the swallowing and choking detection application is used, whether a medicine is swallowed can also be determined in the medication application. The medication management using swallowing is described later in a modification example. Moreover, the terminal device 462 is assumed to be at a position where a set dish can be captured by the camera, so that the dietary intake application may operate in the terminal device 462. Moreover, in the terminal device 462, the standing-up detection application for detecting standing-up during the care receiver takes a meal or after the care receiver had taken a meal may operate.

For example, the following applications may be installed in each device, and may be used differently in accordance with the situation. For example, a care giver uses the terminal device 462 in the care around the dining room, and uses the terminal device 200 in the care in the other places. However, the example of using the applications differently is not limited thereto. Moreover, the description below is one example of a correspondence relationship between devices and applications, and a part of the applications may be omitted or another application may be added in each device.

Terminal Device 200 (for Example, Smartphone)
  Positioning Application
  Swallowing and Choking Detection Application
  Dietary Intake Application
  Medication Application
  Seat surface sensor application
  Retrieval Application
Terminal Device 462 (for Example, Tablet Terminal)
  Swallowing and Choking Detection Application
  Dietary Intake Application
  Standing-Up Detection Application
  Medication Application
  End-of-Life Care Application Further, when an application is activated in the terminal device 462, the first activation processing cannot be selected, but only the second activation processing may be selectable. For example, each application installed in the terminal device 462 is activated from the home screen, and the authentication processing of a care receiver is executed in the application.

Alternatively, when an application is activated, either of the first activation processing and the second activation processing may be selectable by the terminal device 462. For example, in a case where the swallowing and choking detection application has been executed during the care receiver takes a meal, the terminal device 462 may use an authentication result used in the swallowing and choking detection application in the medication application that performs the medication management after the care receiver had taken a meal. In this way, the operation burden upon a care giver who continuously performs care for a specific care receiver can be reduced.

As is understood from the description above, the terminal device 462 may function or does not need to function as a terminal device according to the embodiment.

3. Details of Processing

Next, an example of a use case of the application is described based on a flow of detailed care in the care facility or the like. Note that, the description below is one example of the use case, a part of applications to be used in respective scenes may be omitted, or another application may be added.
3.1 Use Case 1 (when the Care Receiver Wakes-Up)

Figure 11:
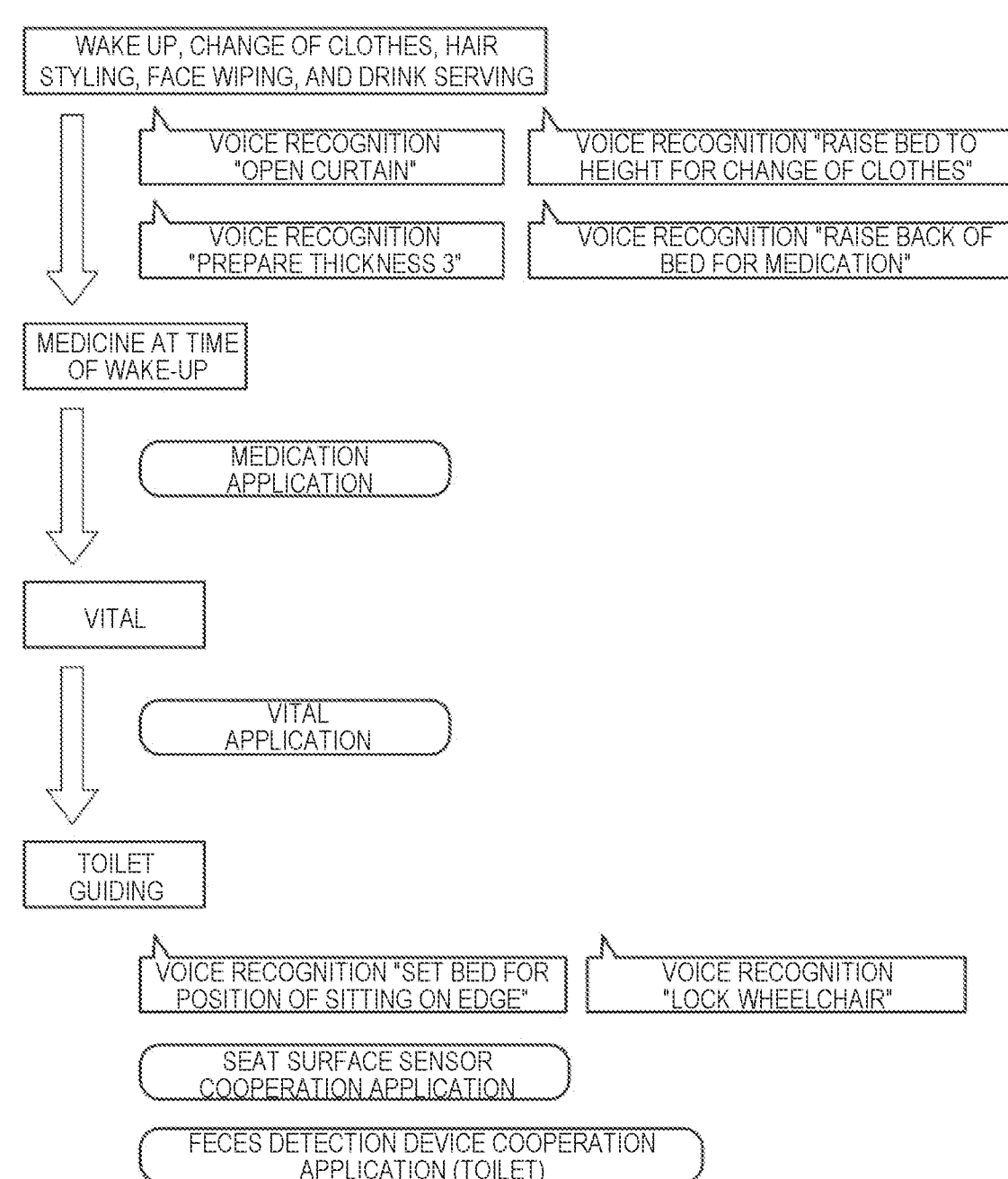
FIG. 11 is a diagram describing a use case of applications and the like when a care receiver wakes up.

FIG. 11 illustrates a flow of care that is executed when a care receiver wakes up, and a use example of applications and the like. The care at the time when the care receiver wakes-up is assumed to be performed in a room of the care receiver. For example, in a private room, a care receiver other than the target care receiver is not present in the room, so that the care herein is executed with respect to only the target care receiver.

As illustrated in FIG. 11, in an example of the care at the time when the care receiver wakes-up, care for waking-up, care for changing the clothes of the care receiver, care for hair styling, care for face wiping, and care for drink serving are performed, medication management at the time when the care receiver wakes-up, measurement of vital information, and guiding to a toilet are successively performed. Hereinafter, a specific flow is described.

A care giver firstly performs the care for waking-up, the care for changing the clothes, the care for hair styling, the care for face wiping, and the care for drink serving for a care receiver. For example, the care giver executes work of opening a curtain in the room, work of adjusting the height and the angle of a back section of the bed 610 so as to be a state suitable for the care for changing the clothes of the care receiver and the like, and work of preparing a thickened beverage in accordance with the swallowing ability of the care receiver. The care giver may directly perform these work, but the embodiment is not limited thereto.

Figure 12:
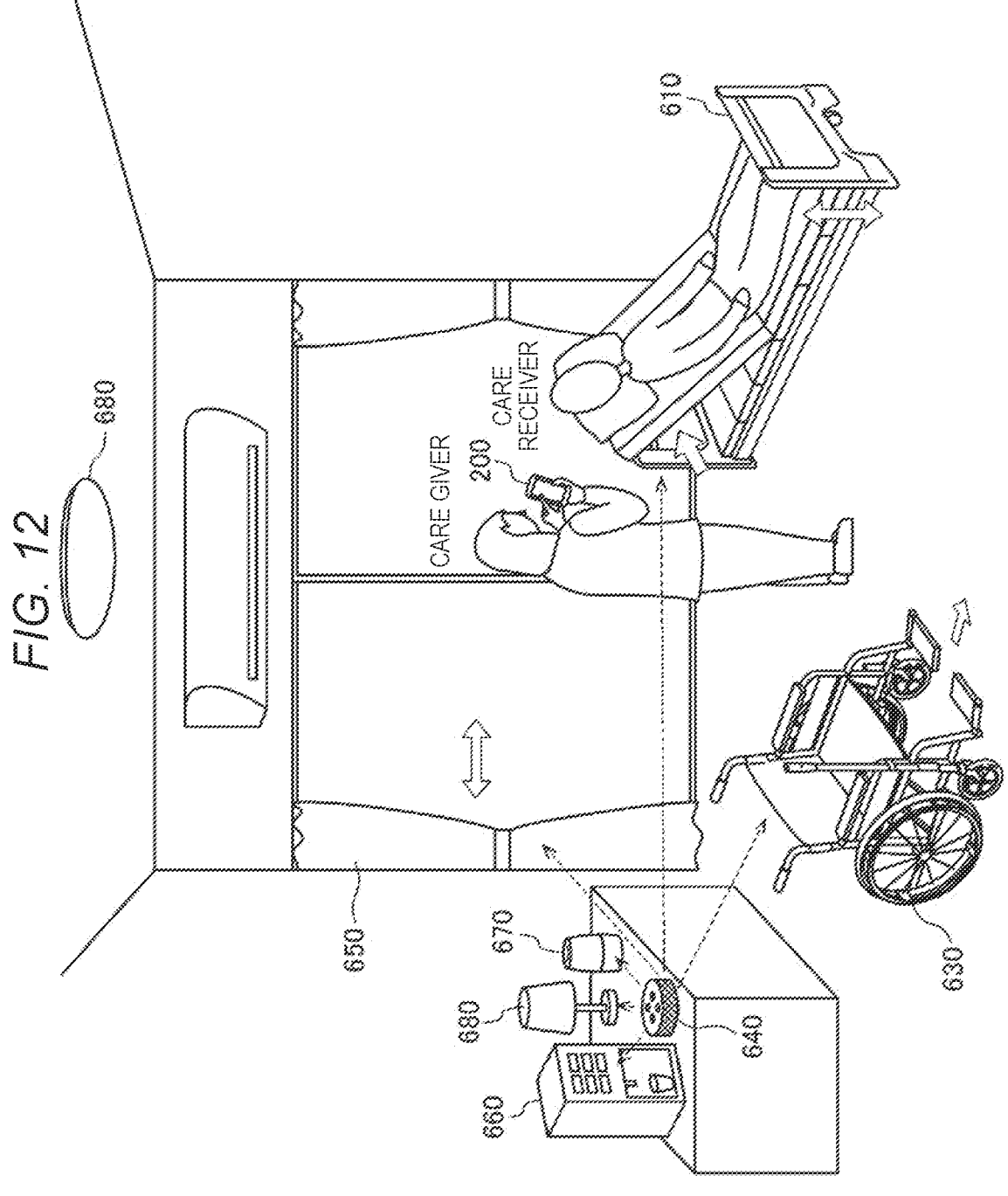
FIG. 12 illustrates an example of devices that are disposed in a room of a care receiver.

FIG. 12 is a diagram illustrating an example of a room of a care receiver. As illustrated in FIG. 12, the bed 610 that is used by the care receiver, the wheelchair 630 that is used for the movement by the care receiver, the curtains 650, the beverage dispenser 660 that serves a thickened beverage, and the like are disposed in the room. Moreover, a communication device 640 that performs voice recognition of a user (care giver), and controls each device based on a voice recognition result may be disposed in the room. Moreover, an aroma diffuser 670 and a lighting 680 may be disposed in the room. Moreover, any devices to be disposed in the room are not limited to those in the example in FIG. 12, but a part thereof may be disposed in a common space, or another device may be disposed in the room. For example, the wheelchair 630 may be stored in a storage place outside the room in a time period when the wheelchair 630 is not used by the care receiver. Moreover, the beverage dispenser 660 may be disposed in the common space such as the dining room and the resting room.

The operations of the bed 610 and the like disposed in the room may be performed by voice recognition in which the communication device 640 is used, for example. For example, each of the bed 610, the wheelchair 630, the curtains 650 (a driving mechanism that opens and closes the curtains 650), the beverage dispenser 660, the aroma diffuser 670, and the lighting 680 is electrically connected or communicatable to a network, and similar to an example of a so-called smart home, can operate based on operation signals from an external device. Moreover, in the communication device 640, a microphone that receives a voice is provided, and a smart home application that transmits a control signal to a device based on the voice recognition and the voice recognition result are installed. For example, the communication device 640 is used as mentioned above in the processing that does not use the tacit knowledge, and the application installed to the terminal device 200 may be used in the processing that uses the tacit knowledge.

For example, a care giver issues a voice including a command "OPEN CURTAINS" to the communication device 640. Note that, recognition processing of a specific word may be executed before the command, although which is omitted herein. The communication device 640 performs the voice recognition processing in accordance with the smart home application, thereby recognizing that the voice is an operation instruction to the curtains 650. The terminal device 200 transmits a control signal to the curtains 650 via the network, and the operation of opening the curtains 650 is executed in accordance with the control signal. Note that, although an example in which the communication device 640 is used has been indicated herein, the smart home application may be installed in the terminal device 200, and the voice recognition may be performed using a microphone of the terminal device 200.

Similarly, the care giver adjusts the height and the angle of each section of the bed 610 by a voice "RAISE BED TO HEIGHT FOR CARE for CHANGING CLOTHES" or the like. Moreover, the care giver instructs the beverage dispenser 660 to prepare a predetermined thickened beverage by a voice "PREPARE THICKNESS 3" or the like (for example, "3" indicates the degree of the thickness). In this manner, executing an instruction to the device by the voice recognition can reduce a burden to the care giver. For example, the care giver can concentrate on the care for changing clothes of the care receiver, and the work of causing the care receiver to drink the beverage.

Moreover, the care giver may perform control of the aroma diffuser 670 and the lighting 680 by using a voice. For example, the communication device 640 may control switching ON or OFF of the aroma diffuser 670 or switching ON or OFF of the lighting 680 in a case where a corresponding keyword has been recognized. Note that, in a case where these devices have a plurality of operation modes (for example, delicate adjustments of the quantity of air and the lighting are possible, and other cases), the communication device 640 may perform control of determining a specific operation mode based on a voice of a user. Note that, as the lighting 680, although both of a compact lighting to be disposed on a shelf and a ceiling light have been exemplified in FIG. 12, one of which may be omitted. Moreover, as the lighting 680, a lighting having another form may be used.

Referring back to FIG. 11, the description is continued. In a case where the care for changing the clothes and the like have been completed, medication management is performed next. The care giver firstly adjusts an angle of the section of the bed 610 to an angle suitable for the medication by a voice "RAISE BACK OF BED FOR MEDICATION" or the like, as preparation.

The care giver next uses the medication application in order to perform the medication management for the care receiver during raising the back section of the bed 610 for example. Note that, as is understood from the example in FIG. 11, in the use case at the time when the care receiver wakes-up, it is found that after the medication management using the medication application, various kinds of care that uses applications are executed to the same care receiver as a target. For example, after the medication management, the care giver successively executes vital recording using the vital application, transfer and movement care of the wheelchair 630 using the seat surface sensor application, feces detection using the feces detection device application, and the like.

Figure 13:
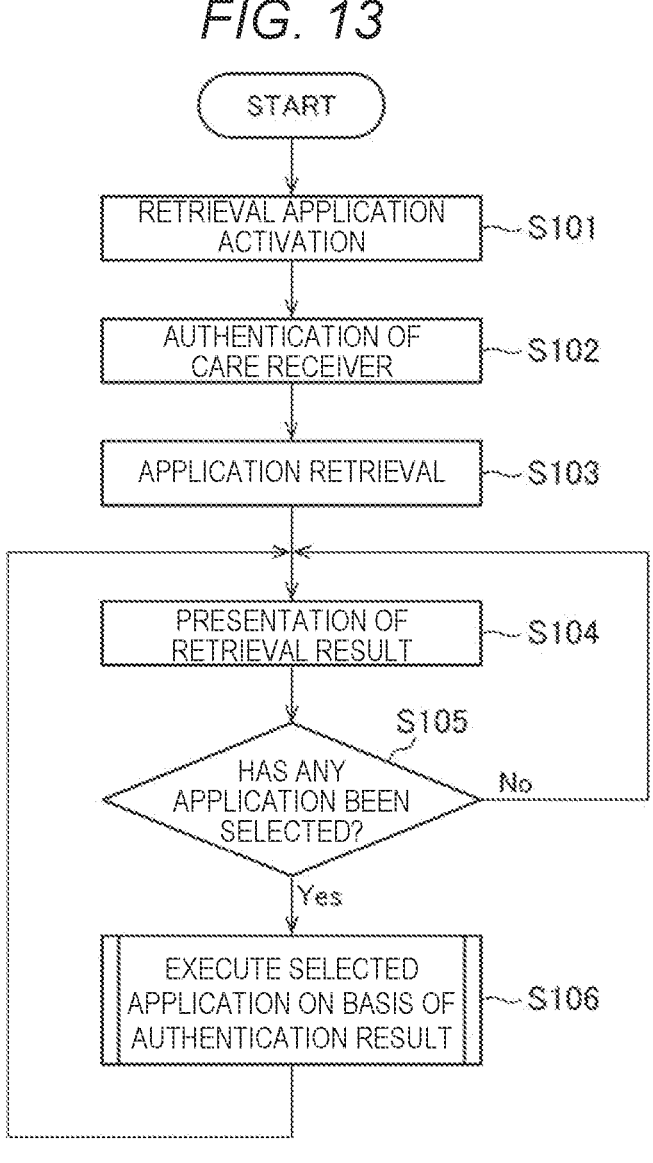
FIG. 13 is a flowchart describing processing in a case where a retrieval application is used.

Accordingly, in the use case illustrated in FIG. 11, the processing of performing the authentication processing in advance, and sharing a result thereof among a plurality of applications is preferable. FIG. 13 is a flowchart in which the processing of the terminal device 200 in the use case is described.

Firstly, at Step S101, the processing unit 210 activates a retrieval application based on an operation by a care giver. The retrieval application is an application that retrieves and presents an application suitable for a care receiver. For example, in a case where an icon of the retrieval application is included in a home screen or an application list screen that is displayed on the display 240 of the terminal device 200, and a selection operation of the icon is performed, the retrieval application is activated.

At Step S102, the processing unit 210 operates in accordance with the retrieval application to perform the authentication processing of a care receiver. The authentication processing of a care receiver may be executed based on the image processing, for example. For example, as is described hereinafter, the image processing herein may be face authentication processing of a care receiver, may be OCR processing, or may be reading processing of a QR code. For example, which one of the image processing is to be performed may be switchable based on the operation by the care giver.

Figure 14A:
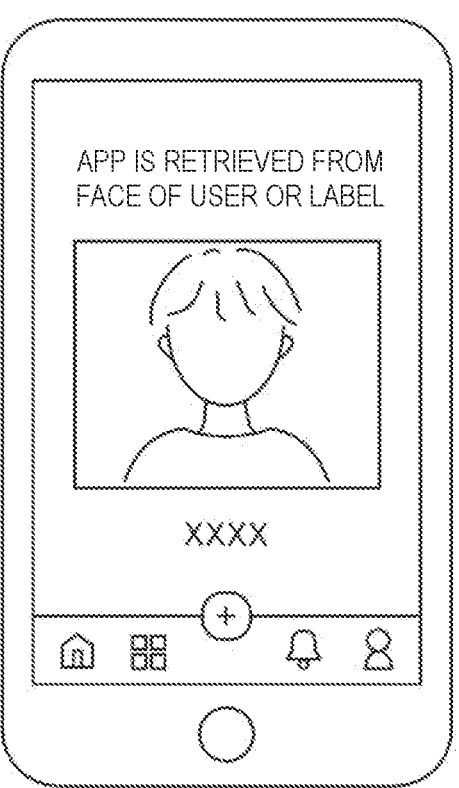
FIG. 14A illustrates a display screen example in the case where the retrieval application is used.

FIG. 14A illustrates a screen example to be displayed on the display 240 of the terminal device 200, and is a diagram in which processing at Step S102 is described. As illustrated in FIG. 14A, in the authentication processing of a care receiver, the face authentication using a face of the care receiver may be performed. For example, the care captures images a face of the care receiver using the imaging unit 260 of the terminal device 200. The processing unit 210 specifies the care receiver based on a comparison processing between the captured image and template data stored in the storing unit 220. Note that, machine learning may be used in the face authentication. As illustrated in FIG. 14A, the display 240 may display a name of the care receiver that is an authentication result. In FIG. 14A, based on the face authentication, it is recognized that the care receiver has the name "XXXX".

Note that, the authentication processing may be performed by imaging a label on which the name of the care receiver is printed. The processing unit 210 specifies the care receiver based on OCR processing of characters written on the label. Alternatively, a code such as a QR code (registered trademark) including information related to the care receiver may be printed on the label. The processing unit 210 specifies the care receiver based on the recognition processing of a code.

After the completion of the authentication processing, at Step S103, the processing unit 210 operates in accordance with the retrieval application to perform the retrieval processing of an application related to the authenticated care receiver. For example, the storing unit 220 may store information in which an application installed to the terminal device 200 is associated with a care receiver who can use each of the applications. Note that, the application herein may be dedicated for one care receiver, but is not limited thereto, and may be commonly used by a plurality of care receivers. In other words, one application may be associated with a plurality of care receivers. The processing unit 210 determines an application related to the care receiver based on the information and the authentication result at Step S102. Note that, various kinds of modifications of the retrieval processing can be made, and details thereof are described later.

Figure 14B:
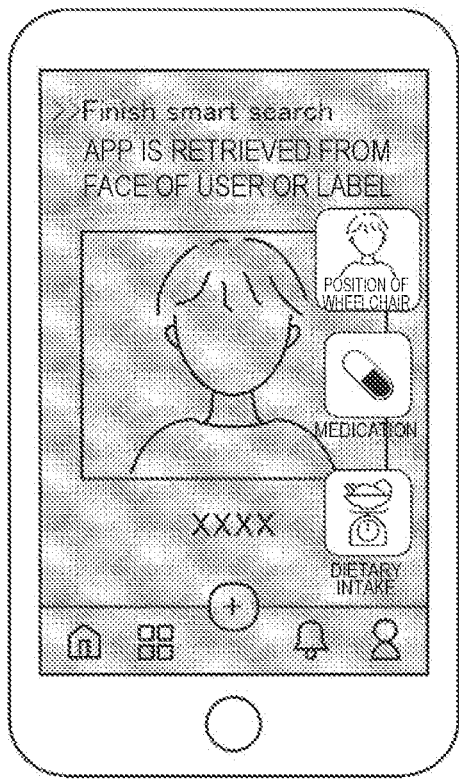
FIG. 14B illustrates a display screen example in the case where the retrieval application is used.

At Step S104, the processing unit 210 operates in accordance with the retrieval application to perform presentation processing of an application related to the authenticated care receiver. FIG. 14B illustrates a screen example to be displayed on the display 240 of the terminal device 200, and is a diagram in which the processing at Step S104 is described. For example, the display 240 may arrange and display one or a plurality of icons indicating an application related to the authenticated care receiver. Note that, although the example in which three icons are superimposed and displayed on the screen illustrated in FIG. 14A is illustrated in FIG. 14B, the embodiment is not limited, and after the screen in FIG. 14A is erased, a retrieval result may be displayed on a different screen.

As in the foregoing, the storing unit 220 of the terminal device 200 may further store the retrieval application, in addition to the application according to the care such as the positioning application. The processing unit 210 operates in accordance with the retrieval application to execute the authentication processing of a care receiver (Step S102), the processing of retrieving the application related to the authenticated care receiver from the storing unit 220 (Step S103), and the processing of presenting a retrieval result (Step S104). Specifically, the retrieval application retrieves an application related to the authenticated care receiver from a plurality of applications including the first application and the second application. In this way, before a plurality of applications are used, the authentication processing can be finished in advance. In addition, an application to be automatically presented based on the authentication result is retrieved or specific function of the application to be automatically presented based on the authentication result is retrieved (part corresponding to the authenticated care receiver is automatically presented if one application stores information of a plurality of care receivers, for example), so that even in a case where a large number of applications are installed to the terminal device 200, for example, burden of the care giver according to the application selection can be reduced.

At Step S105, the processing unit 210 operates in accordance with the retrieval application to determine whether any application as the retrieval result has been selected. If none of the applications is selected (Step S105: No), the processing at Step S105 is executed again. In other words, the processing unit 210 waits until any application is selected.

In the screen in FIG. 14B, if any application has been selected (Step S105: Yes), the processing unit 210 executes the selected application at Step S106. In the example in FIG. 11, because the medication management is firstly performed, the medication application is selected.

FIG. 15 illustrates an example of the processing at Step S106, and is a flowchart in which processing of the medication application is described. At Step S201, the medication application executes recognition processing of a medicine. Specifically, the medication application identifies a care receiver prescribed with a medicine and medication timing, based on a captured image of a medicine label.

At Step S202, the medication application performs determination processing. For example, the medication application determines whether the care receiver authenticated at Step S102 matches the care receiver prescribed with the medicine acquired at Step S201. Moreover, the medication application determines whether the current time is coincident with the medication timing acquired at Step S201.

At Step S203, the medication application determines whether a problem has occurred in the determination. For example, the medication application determines that there is a problem in at least one of cases where the care receiver authenticated at Step S102 does not match the care receiver prescribed with the medicine acquired at Step S201, and where the current time is not coincident with the medication timing acquired at Step S201. If it has been determined that a there is a problem (Step S203: Yes), the medication application executes processing of notifying the care giver of the fact at Step S204. If it has been determined that there is no problem (Step S204: No), for example, the medication application completes the processing of the medication application.

Figure 14C:
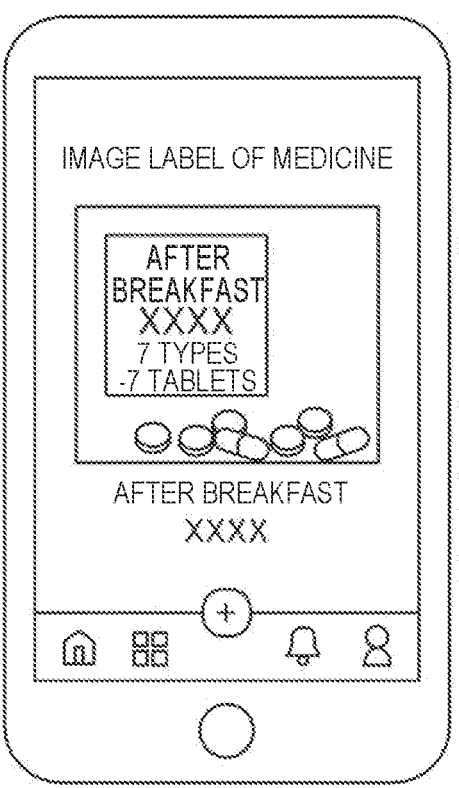
FIG. 14C illustrates a display screen example in the case where the retrieval application is used.
Figure 14D:
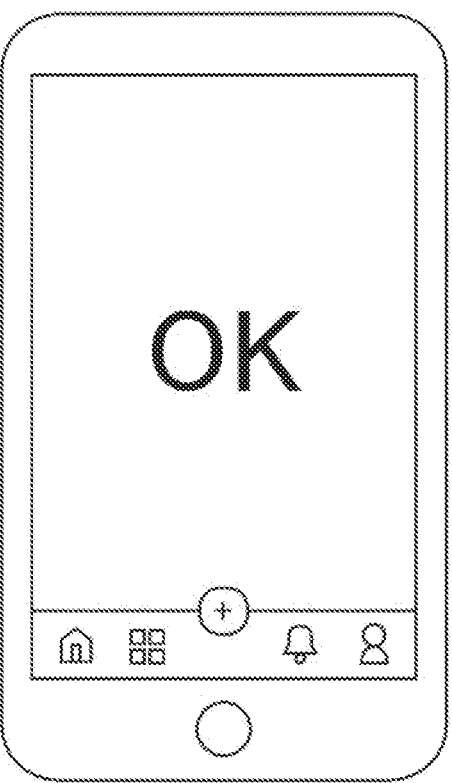
FIG. 14D illustrates a display screen example in the case where the retrieval application is used.

FIG. 14C illustrates a screen example to be displayed on the display 240 of the terminal device 200, and is a diagram in which the processing at Step S201 (Step S106 if the medication application has been selected) is described. In the example in FIG. 14C, the OCR processing is performed based on the captured image of the medicine label to detect "XXXX" that is a character string indicating a name of the care receiver, and "AFTER BREAKFAST" that is a character string indicating the medication timing. If there is no problem in the detected content (Step S204: No), as illustrated in FIG. 14D, information indicating there is no problem is displayed, and the processing related to the medication application is completed. Note that, the transition from the screen illustrated in FIG. 14C to the screen illustrated in FIG. 14D may be performed by an operation of the care giver, or may be automatically executed. For example, if the medication application determines there is no problem in the determination processing, the operation by the care giver is omitted to cause the screen to automatically transition, so that the operation burden of the care giver can be reduced.

Figure 14E:
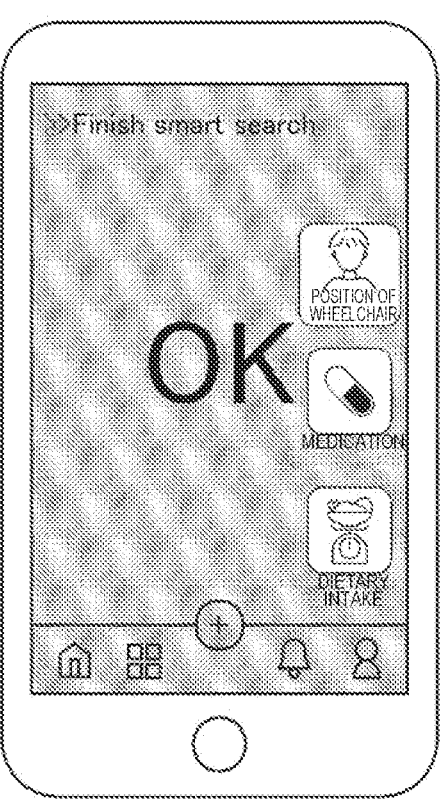
FIG. 14E illustrates a display screen example in the case where the retrieval application is used.

FIG. 14E illustrates a screen example to be displayed on the display 240 of the terminal device 200, and is a screen example to be displayed in the processing at Step S104, which is executed after the processing at Step S106. For example, the display 240 may superimpose and display a retrieval result of an application related to the authenticated care receiver on a screen when the processing at Step S106 is completed (FIG. 14D). In this way, when the given application finishes one application, another application can be immediately selected by the care giver. Further, when one application has been completed, after a screen related to the application is erased, the transition to the screen on which the retrieval result is displayed may be executed, and a detailed screen is not limited to the example in FIG. 14E. Note that, the transition (after completing the determination of the medication application) from the screen illustrated in FIG. 14D to the screen illustrated in FIG. 14E may be executed by an operation of the care giver, or may be automatically executed. For example, if the medication application determines there is no problem in the determination processing, the operation by the care giver is omitted to cause the screen to automatically transition, so that the operation burden of the care giver can be reduced.

Note that, in a case where the care giver has performed an operation of finishing the retrieval application, the processing illustrated in FIG. 15 is completed by the interrupt processing. For example, as illustrated in FIG. 14B and FIG. 14E, in the display screen (Step S104) of the retrieval result, an object for completing the retrieval application may be displayed. FIG. 14B and FIG. 14E illustrate the example in which a character string "Finish smart search" is displayed.

In a case where the operation of completing the retrieval application is not performed, the processing from Steps S104 to S106 is repeated. In the example of the use case illustrated in FIG. 11, after the medication management using the medication application, the vital recording using the vital application is performed. Therefore, in the screen corresponding to the screen in FIG. 14E, the care giver executes the operation of selecting the vital application (which is not illustrated in FIG. 14E). Accordingly, at Step S106, processing in accordance with the vital application is executed.

The vital application herein is, for example, an application that acquires information from a vital recording device using NFC. For example, the care giver uses a clinical thermometer corresponding to NFC, measures a body temperature of the care receiver using the clinical thermometer, and then brings the clinical thermometer near to an NFC reading unit of the terminal device 200. The vital application stores information on the body temperature of the care receiver, the measurement time, and the like, based on a reading result. Note that, the vital recording device is not limited to the clinical thermometer, but may include a sphygmomanometer, a measuring instrument of an oxygen saturation in blood, and the like.

In this case, as illustrated at Step S102 in FIG. 13, the authentication processing of a care receiver has already been completed. Accordingly, the vital application does not need to perform again the authentication processing of a care receiver when associating vital information with the care receiver. Specifically, the vital application acquires an authentication result at Step S102, and performs processing of associating a care receiver that is authenticated based on the authentication result with the vital information acquired via NFC.

The same sequence applies to the following care. In the example of the use case illustrated in FIG. 11, after the vital recording, care of causing the care receiver to get out of the bed, and guiding the care receiver to a toilet is performed by the care giver. Therefore, the care giver firstly adjusts the bed 610 to the height and the angle of the section suitable for an edge sitting position by the voice recognition, and locks the wheelchair 630 to prevent falling in transferring from the bed 610 to the wheelchair 630. Note that, in a case where the wheelchair 630 is capable of performing automatic driving by itself, an operation of bringing the wheelchair 630 near the bed 610 based on the voice recognition may be performed by the voice recognition of the care giver.

Further, the care giver performs an operation of selecting a seat surface sensor application on a retrieval result display screen of an application related to the authenticated care receiver. The processing unit 210 executes processing in accordance with the seat surface sensor application, at Step S106 in FIG. 13. For example, as described above, the seat surface sensor application acquires a pressure value from the seat surface sensor 440, determines a front shift and a horizontal shift based on the pressure values acquired by the seat surface sensor 440, and determines a possibility of a falling and falling down from the wheelchair 630 or the bed 610 based on the pressure values. This can prevent a falling or falling down in transferring between the bed 610 and the wheelchair 630 and in moving between the room and a toilet. In this case, the seat surface sensor application uses the authentication result of the care receiver at Step S102, and thus can execute a determination suitable for the authenticated care receiver, for example, a determination by taking ADL of the care receiver, an improper score of the care receiver, characteristics of a posture of the care receiver, and the like into consideration.

Note that, the seat surface sensor application performs processing of transmitting information related to the authenticated care receiver to the seat surface sensor 440, meanwhile, a determination whether the posture or the position of the care receiver is a front shift, a horizontal shift, or whether there is a possibility of a falling by the care receiver, and the like may be executed in the control box 442 of the seat surface sensor 440. For example, the seat surface sensor application may determine whether the target seat surface sensor 440 is a device that corresponds to the seat surface sensor application, by acquiring a device type from the seat surface sensor 440. Moreover, the seat surface sensor application transmits information for identifying a care receiver, and information for identifying tacit knowledge (algorithm) corresponding to the identified care receiver, to the seat surface sensor 440. The seat surface sensor 440 executes processing suitable for the identified care receiver and in accordance with the tacit knowledge, and transmit a processing result in association with the care receiver, to the server system 100. Moreover, a notification unit such as a light emission unit is provided in the control box 442, and a notification using the notification unit may be performed when an abnormality is detected. In this manner as well, in accordance with the identified care receiver, a determination whether the posture or the position of the care receiver is a front shift, a horizontal shift, or whether there is a possibility of a falling by the care receiver can be appropriately made.

Note that, because it is assumed that the seat surface sensor 440 would be shared among a plurality of care receivers, there is a possibility that an algorithm suitable for a target care receiver is not yet installed. For example, the seat surface sensor 440 determines whether tacit knowledge (algorithm) notified from the terminal device 200 is already installed, and may transmit an acquisition request of an algorithm to the server system 100 if the notified tacit knowledge is not yet installed in the seat surface sensor 440. In this case, the seat surface sensor 440 may also transmit information for identifying a care receiver acquired from the terminal device 200, together. The server system 100 registers the seat surface sensor 440 from which the sensed data is transmitted in association with the care receiver to be identified by the information from the seat surface sensor 440. In this way, the server system 100 can appropriately update, when the seat surface sensor 440 is in use by the care receiver, a correspondence relationship between the care receiver and the seat surface sensor 440.

In addition, the care giver performs an operation of selecting a feces detection device application on a retrieval result display screen of an application related to the authenticated care receiver. The processing unit 210 executes processing in accordance with the feces detection device application at Step S106 in FIG. 13. For example, as described above, the feces detection device application performs processing of recognizing a place of toilet, and executes processing of request to associate the recognized place (the toilet) with the care receiver to the server system 100. In this case, the authentication result of the care receiver at Step S102 can be used, so that the authentication processing of the care receiver does not need to be executed again. For example, the processing unit 110 of the server system 100 can determine, based on the information from the feces detection device application, which the audio data on a toilet corresponds to data on which care receiver. Therefore, the processing unit 110 can appropriately manage the information related to excretion by the care receiver.

As described in the foregoing, the storing unit 220 may store a fifth application related to the care using the sensing device 400. The fifth application may be the seat surface sensor application, may be the vital application, or may be the feces detection device application.

Further, the processing unit 210 may operate in accordance with the fifth application, thereby performing processing of associating the care receiver authenticated by the authentication processing with the sensing result that is an output from the sensing device 400. For example, as has been described in the vital application, the fifth application performs processing of acquiring a sensing result from the sensing device 400, and associating the sensing result with the information on the care receiver that is an authentication result. Alternatively, as is in the seat surface sensor application, the fifth application may perform some sort of determination processing based on the sensing result, and transmit the determination result in association with the care receiver, to the server system 100.

Alternatively, in accordance with the fifth application, the processing unit 210 may perform processing of request to generate an association between the sensing result and the care receiver, by transmitting the authentication processing result to the server system 100. In this case, the fifth application is the feces detection device application, for example. In this way, although the care receiver is not directly associated with the sensing result by the sensing device 400 in the application, information necessary for the association between the care receiver and the sensing result can be appropriately provided in the server system 100 while preventing the operation burden on the care giver.

3.2 Use Case 2 (when the Care Receiver is in Dining Room)

Figure 16A:
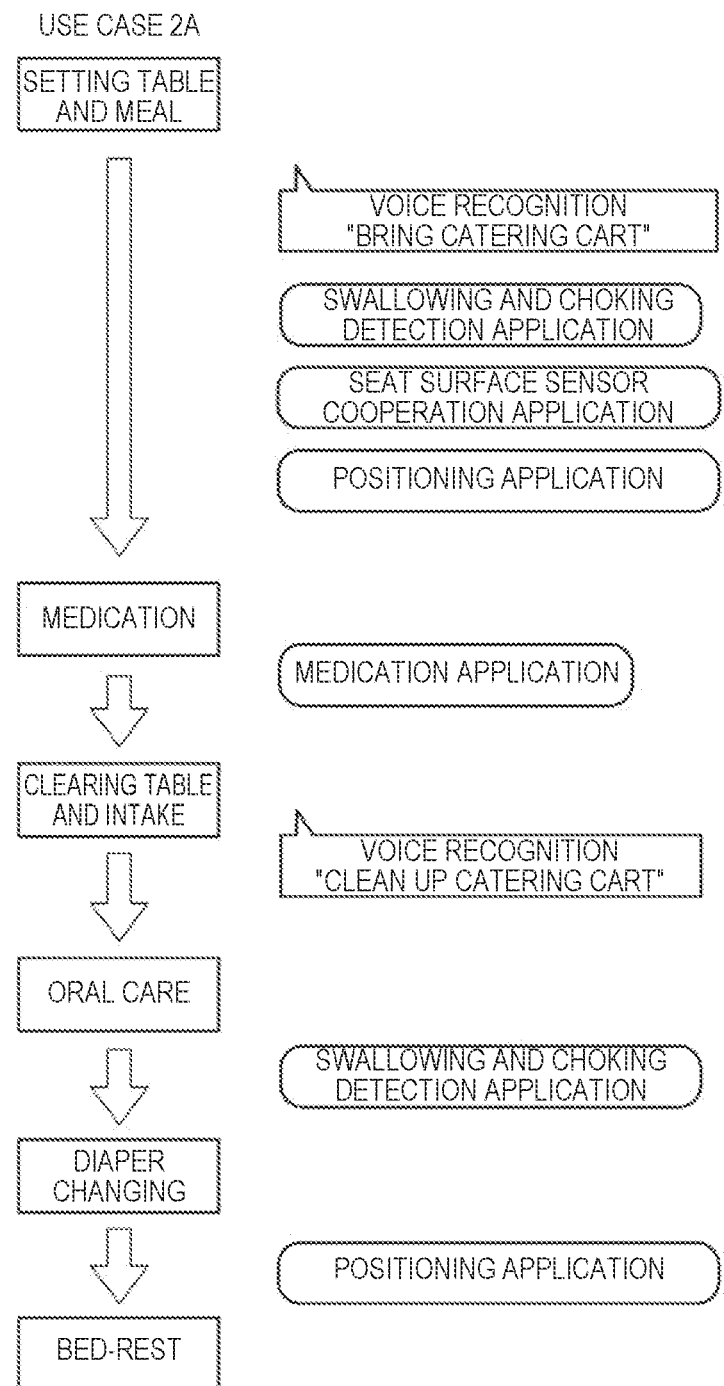
FIG. 16A is a diagram describing a use case of applications and the like in a dining room.
Figure 16B:
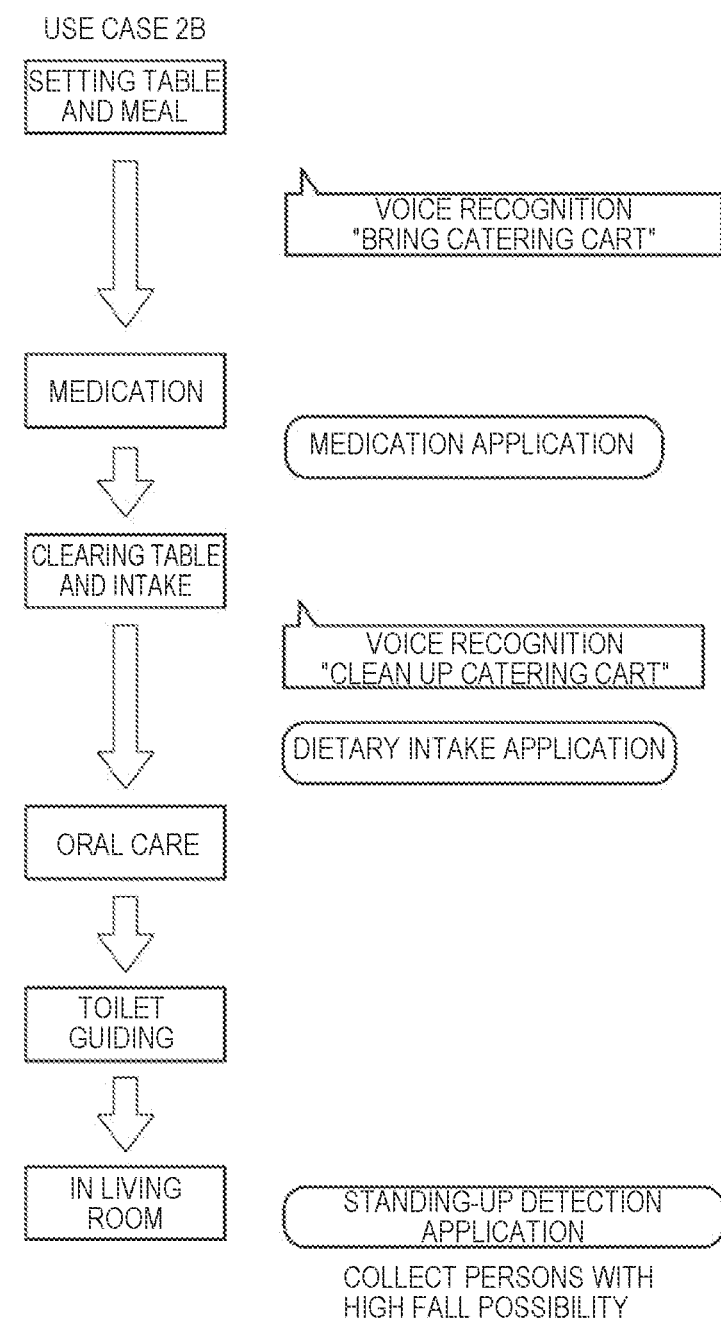
FIG. 16B is a diagram describing a use case of applications and the like in the dining room.

FIGS. 16A and 16B are diagrams of the care flows when the care receiver is in the dining room, and use examples of an application and the like are described. Note that, the care flows when the care receiver is in the dining room are different in accordance with ADL of a care receiver, and thus two examples of a use case 2A (FIG. 16A) and a use case 2B (FIG. 16B) are respectively illustrated herein. Hereinafter, the two use cases are respectively described.

<The Use Case 2A>

The use case 2A illustrated in FIG. 16A is a care flow for a care receiver with relatively low ADL as a target, and it is assumed that the a plurality of cares by the care giver are executed in the order of setting the table, care for the care receiver to eat a meal, medication management, clearing the table, intake management, oral care for the care receiver, care for changing the diaper, and care for the care receiver to get in the bed. Careful care is necessary for the care receiver with low ADL, because the care receiver with low ADL has a possibility of having a high aspiration risk, of showing an improper behavior, and the like. Note that, the care described above is not limited to the care that is executed by one care giver, but may be shared among a plurality of care givers. For example, a first care giver may take charge of setting the table, and a second care giver may take charge of the care for the care receiver to eat a meal and the care after the care receiver had eaten the meal. For example, such an embodiment can be considered that at switching timing of the work shift, while a person in charge of the former shift (for example, in charge of the night shift) takes charge of setting the table, a person in charge of the latter shift (for example, in charge of the day shift) performs care in the room illustrated in FIG. 11, and then takes over the care for the care receiver to eat a meal and the care after the care receiver had eaten the meal in the dining room.

For example, in a scene of setting the table and care for the care receiver to eat the meal, the care giver firstly operates a catering cart capable of automatically driving by itself using the voice recognition. In addition, the swallowing and choking detection application checks a swallowing situation of the care receiver (whether the care receiver is swallowing) and determines an aspiration risk. Moreover, a posture or a position during the care giver is eating the meal is determined using the positioning application and the seat surface sensor application. Note that, herein, based on a captured image and information on the pressure sensors and the like, whether the care receiver has fallen asleep may be determined by the positioning application and the seat surface sensor application. For example, based on these applications, care of causing the care receiver to take a posture that hardly causes the aspiration, and the like may be executed by the care giver. The wheelchair 630 may automatically drive so as to adjust the posture or the position of the care receiver.

Moreover, in a scene of the medication, the medication management is performed using the medication application. In this case, as is described later, whether the care giver had been swallowing a medicine, whether the medicine had been dropping or not, and the like may be determined by the swallowing and choking detection device 460.

Moreover, in a scene of clearing the table, the care giver may clean up the table ware and the like by using the voice recognition to operate a catering cart capable of automatically driving. Moreover, although the illustration is omitted in FIG. 16A, the intake amount of the meal (the intake amount of the main dish, the intake amount of the side dish) and the moisture amount by the care receiver may be determined using the dietary intake application in this case.

Moreover, in a scene of oral care, the swallowing and choking detection application is used to make an image determination of a surrounding portion of a mouth, so that suitable care can be supported.

In addition, in a scene of the care for changing the diaper of the care receiver, the positioning application is used to perform processing of supporting the care for changing the diaper. For example, the positioning application may support a posture suitable for changing the diaper of the care receiver, a position of the diaper, a wearing state of the diaper after the diaper had been changed, and the like. Moreover, after the diaper had been changed, the positioning application is used to perform adjustment of a bed position (position or the posture of the care receiver in the bed) of the care receiver. Note that, using the positioning application in both of the care for changing the diaper of the care receiver and the care for adjusting the bed position is not essential, but either one or both may be omitted.

Moreover, although the illustration is omitted in FIG. 16A, after the care receiver has been in the bed, an application related to a falling and falling down from the bed 610 may be used. The application herein may be the aforementioned standing-up detection application, or may be another application, for example. The sensing device 400 to be used may be the detection device 430, or may be a camera to be disposed in the surrounding of the care receiver.

As in the foregoing, careful care is necessary for a care receiver with low ADL, so that a care giver takes charge of the relatively smaller number of care receivers, and the care giver may take charge of one care receiver, for example. Therefore, in the use case 2A, similar to the use case illustrated in FIG. 11, it is assumed that different cares are continuously executed to a predetermined care receiver as a target. Therefore, the terminal device 200 may perform processing similar to the processing mentioned above using FIG. 13.

For example, in a case where all the applications indicated in the use case 2A are executed in the terminal device 200, a retrieval application is firstly activated (Step S101), and authentication processing of a care receiver is executed in the retrieval application (Step S102, FIG. 14A). The retrieval processing based on the authentication result is executed (Step S103), and a retrieval result is presented (Step S104, FIG. 14B). The care giver successively selects and executes, from the retrieval result, the swallowing and choking detection application, the seat surface sensor application, the positioning application (the care for the care receiver to eat the meal), the medication application, the swallowing and choking detection application, and the positioning application (for changing the diaper) (Step S106). Accordingly, while maintaining the authentication result of the care receiver, various kinds of applications can be executed, so that a burden related to the authentication on the care giver can be reduced.

Note that, an example in which each application is executed in the terminal device 200 has been indicated in the foregoing, but the embodiment is not limited thereto. For example, the swallowing and choking detection application and the medication application in relation to swallowing may be executed in the terminal device 462 of the swallowing and choking detection device 460. The terminal device 200 successively executes, based on the retrieval result by the retrieval application, the seat surface sensor application, the positioning application (for the care for the care receiver to eat the meal), and the positioning application (for changing the diaper). In this case as well, the authentication result can be succeeded in a plurality of applications that operate in the terminal device 200, so that the operation burden of the care giver can be reduced similarly.

Moreover, the terminal device 462 may store the swallowing and choking detection application and the medication application, and may execute processing in accordance with these applications. For example, similar to the terminal device 200 in the embodiment, the terminal device 462 may maintain the authentication result of the care receiver. For example, the terminal device 462 may apply the authentication result used by the swallowing and choking detection application to the medication application when the medication application is executed. Moreover, each application in the terminal device 462 may be automatically activated. For example, in a case where the swallowing and choking detection application has detected that the care receiver had finished eating the meal, the medication application may be automatically activated. Similarly, in a case where the medication application has been detected that the medication had been completed (i.e. the care receiver who takes the medication matches the care receiver who is included in a prescription of the medicine, and the current time is coincident with the medication timing), or in a case where equipment necessary for the oral care has been detected, the swallowing and choking detection application may be automatically reactivated.

Further, the terminal device 462 does not need to execute processing of maintaining the authentication result of a care receiver. For example, in the swallowing and choking detection application and the medication application, the authentication processing of a care receiver may be executed every time when each application is activated.

<Use Case 2B>

The use case 2B illustrated in FIG. 16B is a care flow for a care receiver with relatively high ADL as a target, and a plurality of cares are executed in the order of setting the table, care for the care receiver to eat a meal, medication management, clearing the table, intake management, oral care for the care receiver, care for toilet guiding, and care in the living room. Note that, similar to the use case 2A, the care above is not limited to the care that is executed by one care giver, but may be shared among a plurality of care givers. For example, a first care giver may take charge of setting the table, and a second care giver may take charge of the care for the care receiver to eat a meal and the care after the care receiver had eaten the meal.

The care receiver with high ADL can execute more actions or behaviors without any care, so that the careful care is unnecessary compared with the use case 2A. Moreover, in the care facilities and the like, it can be considered that the number of care receivers with high ADL is relatively large. Therefore, it is assumed that one care giver takes charge of a large number of (for example, several tens of persons) care receivers.

For example, in a scene of setting the table and the care for the care receiver to eat the meal, similar to the use case 2A, the care giver firstly operates a catering cart capable of automatically driving by itself using the voice recognition. A care receiver with high ADL has a low aspiration risk and the like, and the probability that the care receiver can take a posture or a position suitable for eating the meal by himself or herself is high, so that the swallowing and choking detection application and the positioning application do not need to be used.

Moreover, in a scene of the medication, the medication management is performed using the medication application. For example, the care giver checks the medicine using the medication application, but may leave whether the care receiver is swallowing and the like to the care receiver. For example, the care giver checks whether each medicine is adequate for each of several tens of care receivers as targets using the medication application. In this case, since the target care receiver is frequently changed, the processing of maintaining the authentication result mentioned above using FIG. 13 do not need to be used. Therefore, the terminal device 200 may perform processing different from that in FIG. 13.

Figure 17:
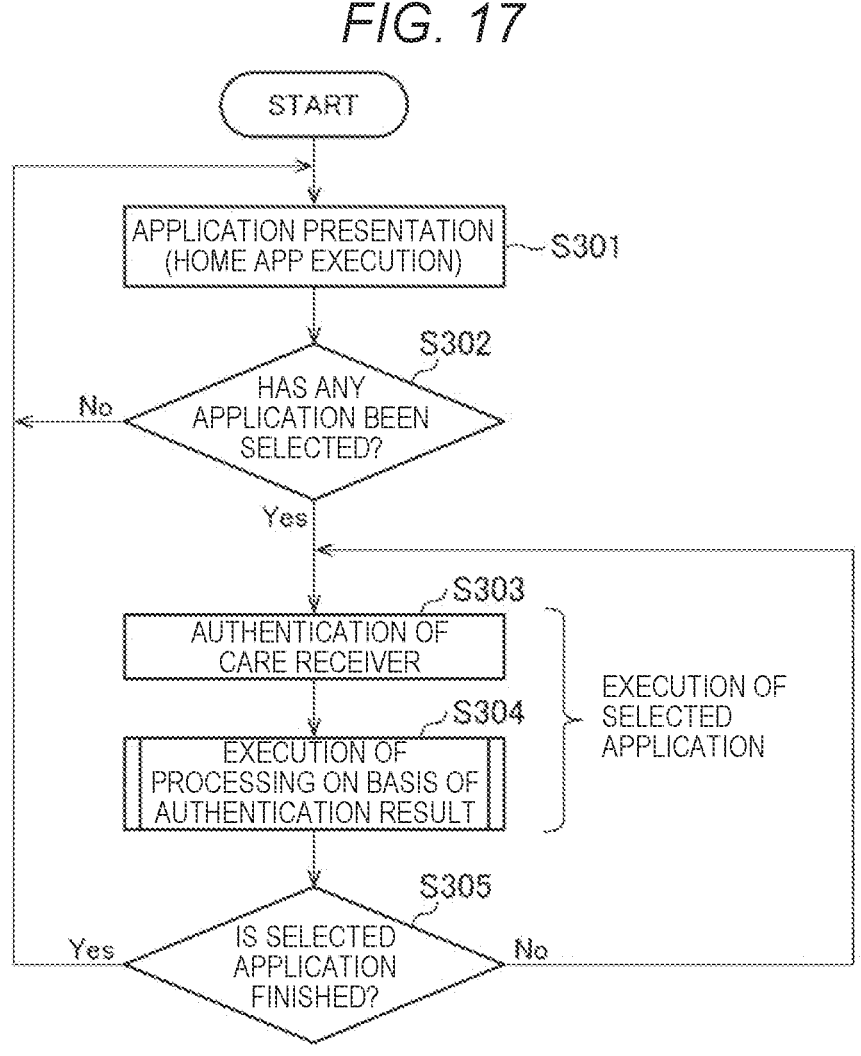
FIG. 17 is a flowchart describing processing in a case where an application is activated from a home screen.

FIG. 17 is a flowchart in which the processing of the terminal device 200 in this case is described. Firstly, at Step S301, the processing unit 210 performs processing of displaying an application list screen on the display 240. The applications herein may be all the applications installed in the terminal device 200, for example. Alternatively, the processing unit 210 may display a home screen of the terminal device 200 at Step S301. In this case, applications disposed in advance on the home screen by the care giver is displayed.

Figure 18A:
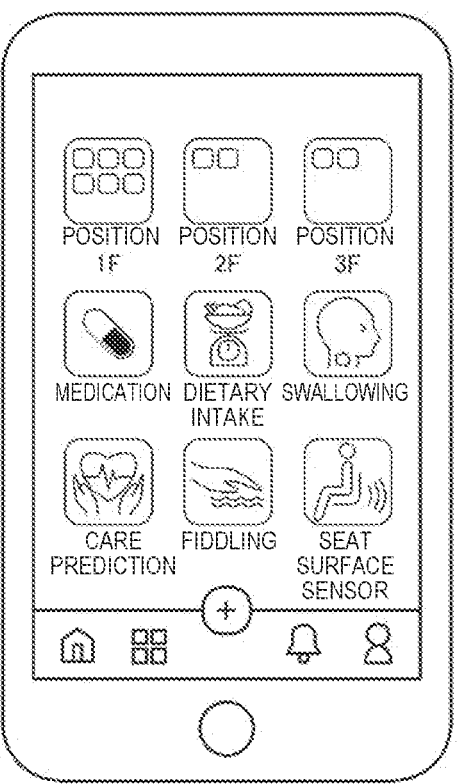
FIG. 18A illustrates a display screen example in the case where the application is activated from the home screen.

FIG. 18A illustrates an example of a screen to be displayed on the display 240 of the terminal device 200 at Step S301 in FIG. 17. As illustrated in FIG. 18A, icons of a plurality of applications may be arranged and displayed on the display 240. Moreover, a plurality of icons may be grouped, and the group may be displayed. In the example in FIG. 18A, a plurality of positioning applications to be created for each care receiver are managed by being divided into three folders of "POSITION 1F", "POSITION 2F", and "POSITION 3F". Moreover, FIG. 18A illustrates an example in which respective icons corresponding to the medication application, the dietary intake application, the swallowing and choking detection application, the end-of-life care application (care prediction application), the fiddling detection application, and the seat surface sensor application are displayed.

At Step S302, the processing unit 210 determines which application has been selected. If none of the applications is selected (Step S302: No), the processing at Step S302 is executed again. In other words, the processing unit 210 waits until any application is selected.

If any application has been selected (Step S302: Yes), the processing unit 210 executes the selected application at Step S303 and at Step S304. Further, in this case, because the authentication processing of a care receiver has not been completed, for example, the processing unit 210 performs the authentication processing of a care receiver as processing of an application selected at Step S303, and executes specific processing based on the authentication result at Step S304.

In the example of the use case 2B illustrated in FIG. 16B, the medication management is firstly performed, so that the medication application is selected at Step S302.

Figure 19:
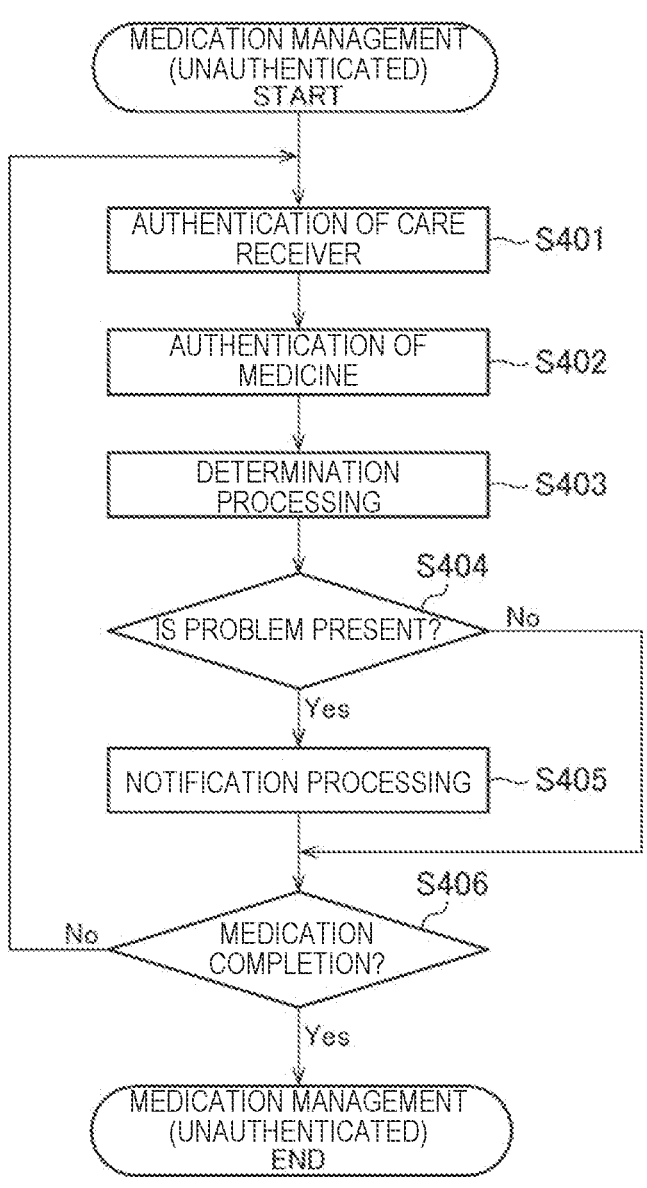
FIG. 19 is a flowchart describing processing of the medication application in a case where the medication application has been activated from the home screen.

FIG. 19 illustrates an example of processing at Steps S303-S304, and is a flowchart in which the processing of the medication application is described. At Step S401, the medication application performs authentication processing of a care receiver to be a target.

Figure 18B:
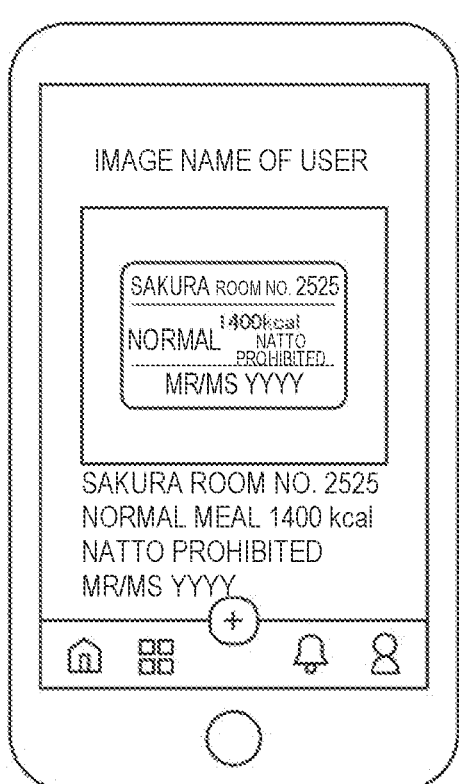
FIG. 18B illustrates a display screen example in the case where the application is activated from the home screen.

FIG. 18B is a diagram in which processing at Step S401 is described. For example, the processing unit 210 may perform the authentication processing based on the OCR processing with respect to a tag on which a name of the care receiver is written. In the example in FIG. 18B, together with a character string related to a room number and the meal content, a name "YYYY" is detected. The processing unit 210 identifies a name of the care receiver from the detected character string, based on the content of the character string (for example, a display position of an honorific title) and the like. Note that, as described above about Step S102 in FIG. 11, the face recognition processing may be used or the QR code may be used, in the recognition processing of the care receiver.

Steps S402-S405 are similar to Steps S201-S204 in FIG. 15. Specifically, the processing unit 210 executes the recognition processing of a medicine at Step S402, and performs the determination processing at Step S403. Note that, a display screen example related to the recognition processing has been indicated in FIG. 18C, which is similar to that in FIG. 14C. Moreover, the processing unit 210 determines whether there is any problem in the determination at Step S404. If it has been determined that there is a problem (Step S404: Yes), processing of notifying the care giver of the fact is performed at Step S405.

If it has been determined that there is no problem (Step S404: No), the processing unit 210 determines whether the medication has been completed at Step S406. For example, if it has been determined that there is no problem, the processing unit 210 may perform processing of displaying a screen illustrated in FIG. 18D. The screen illustrated in FIG. 18D includes, in addition to a character string ("OK") indicating that there is no problem (i.e. the care receiver who takes the medication matches the care receiver who is included in a prescription of the medicine, and the current time is coincident with the medication timing), a first button for continuing the medication management for a different care receiver as a target, and a second button for finishing the medication management. For example, the first button is a display object to which a character string "TO NEXT PERSON" is assigned, and the second button is a display object to which a character string "MEDICATION COMPLETION" is assigned. If the selection operation of the second button has been performed, the processing unit 210 determines the medication has been completed for all care receivers (Step S406: Yes), and finishes the processing of the medication application.

On the other hand, if the selection operation of the first button has been performed, the processing unit 210 determines that the medication has not been completed (Step S406: No), and returns the processing to Step S401 and continues the processing. The processing when returned to Step S401 is similar to the description above, and the recognition of a care receiver, the medicine recognition, and the determination processing are continuously repeated. As described above, in the example of the use case 2B, the care giver needs to repeatedly execute the medication management for several tens of care receivers as targets. Accordingly, repeatedly executing the authentication processing in the medication application can implement the efficient care. For example, the operation burden on the care giver can be reduced, compared with a case where the application is reactivated every time when the medication management for one care receiver is completed.

In this case, the first button may be omitted or next processing would start even if the first button is not selected by the care giver. For example, in a case where there is no problem in the determination content for a first care receiver, the medication application may execute processing of automatically returning to the screen for the authentication processing (corresponding to FIG. 18B) without any the operation by the care giver. In this way, in a case where the medication management is repeated for a large number of care receivers as targets, the operation burden on the care giver can be reduced. For example, in this case, the object corresponding to the second button may be displayed on the screen in FIG. 18B, and the medication completion operation may be executed from the screen in FIG. 18B. Moreover, the screen transition from FIG. 18B to FIG. 18C when the authentication of a care receiver has been completed in the authentication processing, and the screen transition from FIG. 18C to FIG. 18D when the medicine authentication has been completed may be also automated. In other words, in the medication application in the embodiment, as long as there is no problem in the content of the medicine, an input by the care giver can preferably be omitted.

Figure 18C:
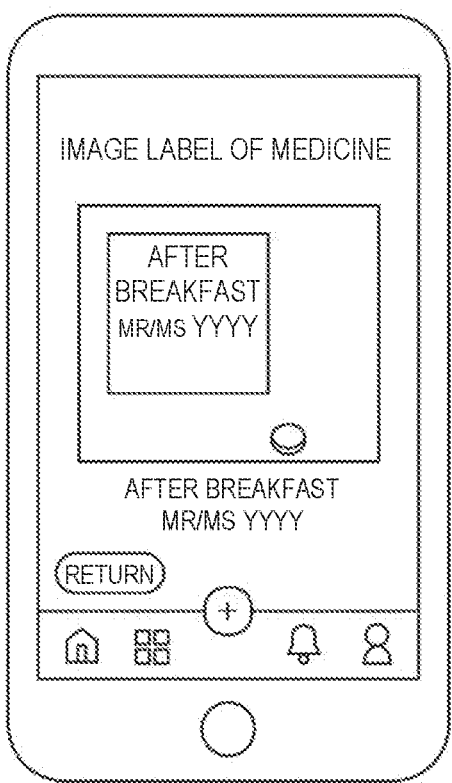
FIG. 18C illustrates a display screen example in the case where the application is activated from the home screen.
Figure 18D:
FIG. 18D illustrates a display screen example in the case where the application is activated from the home screen.

With the processing in the foregoing, the medication management using the medication application is completed. For example, in the flowchart in FIG. 17, if the finish of the medication application has been detected (Step S305: Yes), the processing is returned to Step S301 and is continued. Note that, the case of No at Step S305 is a case where the second button in FIG. 18D is not selected, for example, and corresponds to the processing of returning from Step S406 to Step S401 in the flowchart in FIG. 19.

As illustrated in the use case 2B in FIG. 16, after the medication management, recording of a meal amount using the dietary intake application is performed. For example, the processing unit 210 of the terminal device 200 redisplays the home screen at Step S301, and receives the selection operation of the dietary intake application at Step S302. The dietary intake application determines the dietary intake amount and the intake amount of nutrients. Note that, although the illustration is omitted in FIG. 16, for example, the dietary intake application is also activated in setting the table, and processing of imaging dishes before the care receiver eats a meal in setting the table may be performed. In clearing the table, processing of imaging the dishes after the care giver had eaten the meal, and processing of determining a meal amount which the care receiver had eaten by the comparison of the images before the care receiver eats a meal and after the care giver had eaten the meal may be executed.

Note that, it is assumed that the care giver performs the recording of the meal amount for several tens of care receivers as targets. Therefore, also as for the dietary intake application, similar to the medication application, the authentication processing of a care receiver may be repeatedly performed in the dietary intake application. Moreover, the dietary intake application may operate not in the terminal device 200 but also in the terminal device 462.

Moreover, in a scene of clearing the table, similar to the use case 2A, the care giver may clean up the table ware and the like by using the voice recognition to operate a catering cart capable of automatically driving.

In the use case 2B, the care receiver has high ADL, so that the care using the applications do not need to be performed in the oral care and the care for toilet guiding. After the care giver finishes defecating in the toilet, the care receiver is guided to the living room by the care giver, and takes part in a group activity and gathering in the living room, for example. In this case, by using the standing-up detection application, monitoring of a care receiver with a high falling risk may be performed. The standing-up detection application performs standing-up detection using an image from a camera disposed in the living room, for example.

As illustrated in the use case 2B above, in a case where the first application has been activated without performing the authentication processing, the processing unit 210 may execute the authentication processing of a care receiver by operating in accordance with the first application. For example, the medication application or the dietary intake application executes the authentication processing of a care receiver by using the authentication function of each application. In this way, the improvement in convenience in a case where the same sort of care is repeatedly executed to a plurality of care receivers as targets becomes possible.

Moreover, as is understood from a comparison between the processing of the medication application in the use case 2A (FIG. 15) and the processing of the medication application in the use case 2B (FIG. 19), the processing by the application in the embodiment may be switched in accordance with the use situation. In other words, the processing unit 210 switches the processing in the first application between a case where the first application has been activated by the first activation processing via the retrieval application and a case where the first application has been activated by the second activation processing without using retrieval application.

For example, in the use case 2A in which the retrieval application is firstly activated, the authentication processing is performed in advance, so that the authentication does not need to be performed again in the medication application. Moreover, the necessity for using a plurality of care receivers as targets is low in the use case 2A, so that in a case where there is no problem, it is possible to automatically finish the medication application, and make a transition to the display screen of a retrieval result. On the other hand, in the use case 2B in which no retrieval application is used (an application is activated from the home screen), the authentication processing is executed in the medication application. Moreover, in a case where processing related to a certain care receiver has been completed, by taking the continuous processing for a plurality of care receivers into consideration, the automatic transition to a screen on which the authentication processing is executed may be possible without finishing the medication application.

Note that, although the example of the medication application has been indicated in the foregoing, the activation of applications other than the medication application by individual methods may be possible. Further, in the embodiment, the operation of the application may change in accordance with the activation method. In this way, the operation (function) of each application can be appropriately switched in accordance with the use case, whereby the improvement in convenience becomes possible.

Alternatively, the storing unit 220 may store a fourth application that performs processing related to the same care content as the first application. Further, the processing unit 210 displays the fourth application in the home screen, and does not display the first application. In addition, the processing unit 210 may display the first application, and does not need to display the fourth application, in the retrieval result by the retrieval application. For example, as medication applications, two applications of a first medication application that executes the processing illustrated in FIG. 15 and a second medication application that executes the processing illustrated in FIG. 19 may be installed. In this case, the processing unit 210 switches the application to be displayed in accordance with the activation method.

For example, in the home screen, a scene in which the authentication processing is not completed is assumed, so that the second medication application having the authentication function is displayed. On the other hand, when the first medication application having no authentication function is selectable from the home screen, the authentication of a care receiver is impossible, so that it is difficult to use the individually optimized application so as to correspond to the target care receiver. Accordingly, the second medication application is hidden in the home screen. Meanwhile, when a retrieval result is displayed by the retrieval application, the authentication processing is completed. Accordingly, the authentication becomes unnecessary in the medication application, so that only the first medication application is displayed in the retrieval result, and the second medication application is excluded from the display object. In this manner, a plurality of applications that perform the same sort of care are prepared, whereby the processing in accordance with the use case can also be implemented.

Note that, as is understood from the example above, in a case where applications for same care of the target care receiver are separately used, the first application to be displayed as the retrieval result by the retrieval application does not have a function of performing the authentication processing of a care receiver, and the fourth application to be displayed in the home screen has a function of performing the authentication processing of a care receiver. Accordingly, in accordance with the activation method (the authentication result is shared or not), an application serving as a display object can be appropriately determined.

3.3 Use Case 3 (when the Care Receiver Goes to the Bed)

Figure 20:
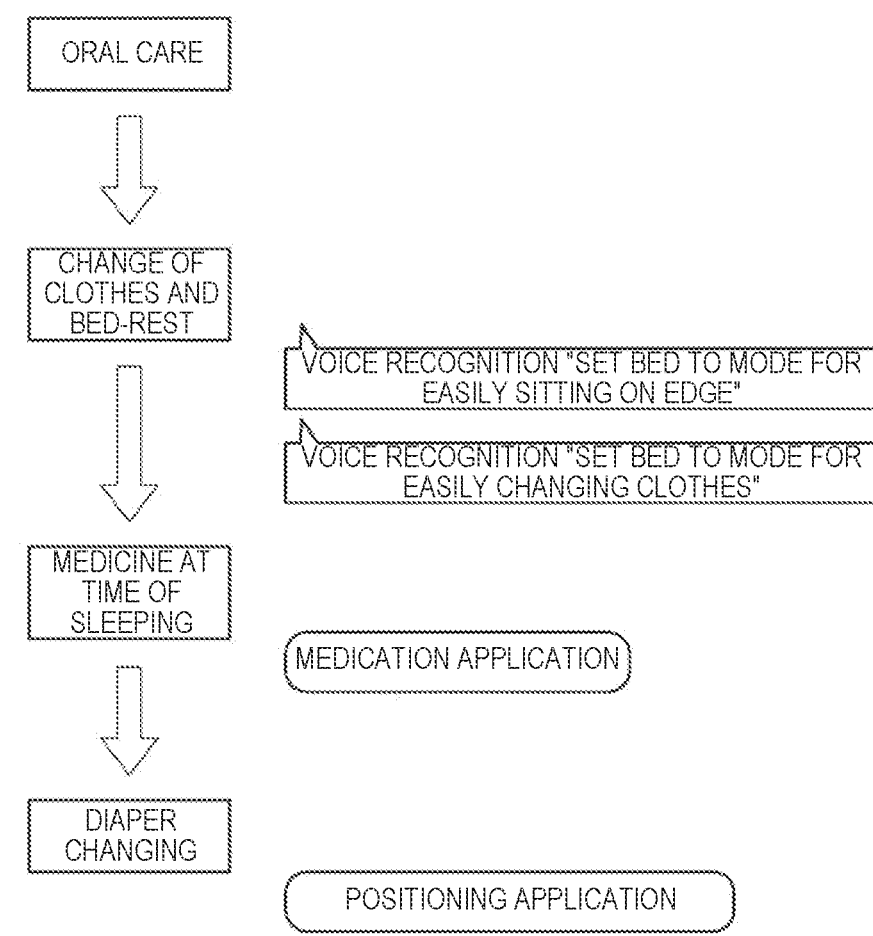
FIG. 20 is a diagram describing a use case of applications and the like at the time of going to bed.

FIG. 20 illustrates a diagram in which a care flow that is executed when a care receiver goes to the bed, and a use example of applications and the like are described. The care when the care receiver goes to bed is performed in a room of the care receiver. Therefore, similar to the care when the care receiver wakes-up, the probability of executing the care when the care receiver goes to bed only to a specific care receiver is high.

As illustrated in FIG. 20, in the care when the care receiver goes to bed, the oral care, the care for changing the clothes of the care receiver, the care for going to the bed, medication management when the care receiver is going to sleep, and the care for changing the diaper of the care receiver are successively performed. Hereinafter, a specific care flow is described.

A care giver firstly performs the oral care. There is a possibility that the swallowing and choking detection device 460 is not disposed in the room, and thus an application is not specially used herein. However, the swallowing and choking detection device 460 may be disposed in the room, and the swallowing and choking detection application may be used in the oral care.

Next, the care for changing clothes of the care receiver and the care for going to the bed are performed. For example, by giving a voice including "SET BED TO MODE FOR EASILY SITTING ON EDGE, "SET BED TO MODE FOR EASILY CHANGING CLOTHES", and the like, the care giver may adjust a height and an angle of the bed 610 by the voice recognition.

Next, the care giver performs the medication management using the medication application. Only a specific care receiver is considered herein as a target, so that the care giver may execute an operation of activating the retrieval application. Similar to the aforementioned example using FIGS. 13-15, the terminal device 200 activates the medication application in the retrieval application, and executes the processing using the prior authentication result. The operation of the medication application is similar to that in the aforementioned example, and thus a detailed description is omitted.

In addition, the care giver performs the care for changing the diaper of the care receiver by using the positioning application. For example, the terminal device 200 presents a positioning application that is used in the care for changing the diaper of a target care receiver, as a retrieval result by the retrieval application. The care giver performs the care for changing the diaper of the care receiver by using the positioning application. Even in a case where a large number of positioning applications are installed, only an application related to the target care receiver is displayed in the retrieval result, so that the care giver can easily select the desired positioning application.

4. Modification Example

Hereinafter, several modification examples are described.

4.1 Modification Example Related to Retrieval Application

As described in Steps S103 and S104 in FIG. 13, the retrieval application performs processing of retrieving an application related to a care receiver, and presenting a retrieval result to a care giver. In this case, as described above, information in which the application is associated with the care receiver may be stored in the storing unit 220. In this case, the retrieval application can identify a related application by performing retrieval processing using the care receiver as a retrieval key. Note that, the retrieval processing in the retrieval application is not limited thereto.

For example, in the retrieval processing by the retrieval application, the processing unit 210 may identify, based on attribute information in which a care receiver is associated with an attribute of the care receiver, an attribute of the authenticated care receiver, and retrieve an application associated with the attribute from the storing unit 220. The attribute information is stored in the storing unit 220, for example. Moreover, the storing unit 220 may store information that associates the application with the attribute of the care receiver.

For example, in the swallowing and choking detection application, desired processing (for example, a threshold for detecting an aspiration risk and the like) varies in accordance with various kinds of attributes including the choking frequency being equal to or more than a predetermined frequency, the swallowing sound being equal to or less than a predetermined sound, the ADL indicator value being equal to or less than a predetermined value, the swallowing time being equal to or less than a predetermined time, and the like. Moreover, the attribute herein may include an attribute that is set by using a given care receiver in the care facility as a reference, as "SAME AS MR/MS AAAA". In this case, the processing content may be switched for each attribute, not for each care receiver, so that the application can be efficiently mounted. For example, in a case where a plurality of applications are created, the reduction in the number of the applications becomes possible. Alternatively, when an algorithm and parameters are switched in one application, the algorithm and the number of the parameters can be reduced.

As described above, in the retrieval processing by the retrieval application, the retrieval processing using the attribute as a retrieval key is performed, whereby after the application is efficiently mounted, an application related to each care receiver can be appropriately retrieved and presented.

Moreover, in the retrieval processing by the retrieval application, the processing unit 210 may perform the processing of retrieving an application from the storing unit 220, based on information on at least one of a use place of the terminal device 200, a time period when the processing is executed, and a care device that is positioned in the surrounding of the terminal device 200.

As indicated in the aforementioned use cases 1 to 3, the care that is performed in the room and the care that is performed in the dining room are different. Moreover, the necessity for feces detection is high in the toilet, and the necessity for standing-up detection (fall prevention) is high in the living room. In this manner, the application with a high use frequency varies depending on the place. For example, the storing unit 220 may store information that associates the application with the use place. The processing unit 210 may detect a position of the terminal device 200 to determine a use place of the terminal device 200, and identify an application with a high use frequency based on the determination result. Note that, the position detection can be determined based on various kinds of information including a connection situation with a communication device such as a router, a reading result by an RFID reader, GPS output, and the like. The processing unit 210 performs processing of preferentially displaying an application identified based on the place, in the presentation of the retrieval result.

Moreover, as indicated in the use case 1 to the use case 3, the care to be assumed varies depending on each time period (for example, at the time when the care receiver wakes-up, at the time when the care receiver eats breakfast, at the time when the care receiver eats lunch, at the time when the care receiver eats dinner, and at the time when the care receiver goes to the bed), so that an application with a high use frequency also varies. Therefore, the storing unit 220 may store information that associates the application with the use period. The processing unit 210 may identify an application with a high use frequency by performing comparison processing between the information and the current time. The processing unit 210 performs processing of preferentially displaying an application identified based on the time period, in the presentation of the retrieval result.

Moreover, as indicated in the use case 2, in the care in the dining room, a catering cart is disposed in the vicinity of the terminal device 200. Therefore, if a distance with the catering cart is equal to or less than a predetermined distance, it can be considered that the care for the care receiver to eat the meal is performed, and the probability of using the dietary intake application and the swallowing and choking detection application is high. Therefore, the storing unit 220 may store information that associates the application with the care device. The processing unit 210 may identify an application with a high use frequency based on the information, and a care device disposed in the surrounding. For example, the care device may have a communication function that uses Wi-Fi, Bluetooth, NFC, and the like. In a case where the processing unit 210 is electrically connected or communicable to a care device using these communication functions, the processing unit 210 may determine that the care device is positioned in equal to or less than a predetermined distance. Alternatively, a QR code may be adhered to a care device. In a case where the processing unit 210 has read the QR code using the imaging unit 260, the processing unit 210 may determine that the care device is positioned in the vicinity of the terminal device 200. The processing unit 210 performs processing of preferentially displaying an application identified based on the care device, in the presentation of the retrieval result.

Alternatively, in the retrieval processing by the retrieval application, the processing unit 210 may display with priority an application having a history of past use in the care for the target care receiver. Moreover, in a case where a use history of a plurality of applications is present, an application with a high use frequency may be displayed with special priority. In this way, the care giver is likely to select a desired application, whereby the operation burden on the care giver can be reduced.

Moreover, from the viewpoint of reducing the operation burden on the care giver, the activation and the operation of the retrieval application may be performed using the voice recognition. For example, the care giver speaks a keyword for activating the retrieval application, a name, an attribute, and the like of the care receiver to activate and operate the retrieval application. In this example, instead of the authentication processing using the image, the authentication processing using the voice recognition is performed, so that the operation burden on the care giver can be reduced.

4.2 Modification Example Related to Medication Application

<Authentication Processing>

As described above, in the authentication processing of a care receiver in the medication application, face authentication based on a captured image of a face may be performed, OCR processing to a label character may be performed, or a QR code may be used. Each authentication processing has a different characteristic as follows, so that the authentication processing may be switchable in accordance with a situation between the face authentication, the OCR authentication, and QR code authentication for example.

The face authentication has such an advantage that even in a case where a care giver does not remember a face of a care receiver, if the care receiver is a person already registered in a database, a name and the like of the person can be accurately identified. For example, even in a case where a person in charge of help who is different from an original care giver performs the medication care, or in a case where a new care giver performs the medication care, it is possible to prevent the care receiver from being misidentified as another person and the medicine from being mixed up or incorrect. Meanwhile, in a case where the face authentication is performed, the face of the care receiver needs to be captured. Accordingly, for example, in a case of a dementia patient as a target, scenes in which the authentication is not easy can be considered, the scenes including the dementia care receiver does not direct his or her face to the camera, and is upset when the camera is directed to the dementia care receiver, for example.

Moreover, in a case where the OCR processing is used, the character string can be recognized without any change, so that there is an advantage that the there is no need to generate a code including a QR code and the like. For example, in the care facility, as illustrated in FIG. 18B, information on the meal content of a care receiver, an ingredient intake of which is prohibited, and the like is managed using cards and the like in some cases. In the OCR processing, these cards can be used to authenticate the care receiver, so that the authentication processing of a care receiver can be easily implemented. Moreover, name tags are attached in advance to the welfare equipment and the like, and the name tags may be used in the OCR processing. In the scene of the care, name tags are widely used to check care receivers by a care giver, so that by applying the name tags to the OCR processing, the processing in the embodiment can be easily implemented in the care facilities or the hospitals.

Moreover, in a case where a QR code is used to authenticate the care receiver, for example, a QR code including information on a care receiver is generated in advance, and processing of reading the QR code is performed. Although the code needs to be generated, image recognition processing is easier than the OCR processing and the like, so that there is an advantage that the time period when a card or the like attached with the QR code is faced in front of the camera may be short, and the work efficiency is high.

Moreover, in a case where a care receiver is automatically recognized by each processing, information on the care receiver serving as a care target needs to be registered in the storing unit 120 of the server system 100, and the like, as a database. Accordingly, in a case where medication management for a care receiver who is unregistered due to some sort of reason becomes necessary, the authentication of the care receiver cannot be performed. Therefore, in the embodiment, manually inputting a name of the care receiver may be possible. In this case, for example, information indicating the manual input may be associated with a result of the medication management. In this way, the content of the manual input may be easily checked later. Moreover, the manually input name of the care receiver can be recognized in the OCR processing, or manual input may be requested next or subsequent time. Moreover, after the manual input result is set to be available in the OCR processing, whether the OCR processing is performed next and subsequent time, or the manual input is again performed may be selectable by the care giver.

Moreover, as for the medicine authentication processing, similarly, the OCR processing may be used or the QR code processing may be used. For example, in the medicine authentication processing, as illustrated in FIGS. 14C and 18C, processing of imaging a label of a bag that is subdivided for each medication timing of a medicine is assumed. Here, work of subdividing and packing medicines, and attaching labels is performed by an expert such as a pharmacist or a nurse. Accordingly, using the label for the determination can prevent the medicines in the care facility from being mixed up or incorrect.

Moreover, in a case where a QR code processing is used, for example, a QR code including information on a care receiver and medication timing of a medicine is generated in advance, and work of adhering the QR code on the bag of the abovementioned subdivided medicines is performed. In this case, although the association between the QR code and the bag of the medicines needs to be performed in the care facility, there is an advantage in that the image recognition processing is easier than the OCR processing and the like.
<Swallowing Determination, Cathartic Notification>

The processing of the medication application is as mentioned above using FIGS. 15 and 19. For example, in a case where the medication application is activated from the home screen, processing for one person is completed through (1) authentication processing of a care receiver, (2) authentication processing of a medicine, and (3) determination processing and recording, and the processing is returned to (1) and the processing for a next care receiver as a target is continued (see FIG. 19).

On the other hand, in a case where the medication application is activated from the retrieval application, the abovementioned (1) authentication processing of a care receiver is omitted, and (2) authentication processing of a medicine and (3) determination processing and recording are performed (see FIG. 15). In this case, the processing of the medication application finishes by the processing (3), and the processing is returned to the retrieval result display screen of the retrieval application.

The above processing corresponds to processing in a case where the medication application is executed in the terminal device 200, for example. Note that, in the embodiment, as described above, the medication application may be executed in the terminal device 462 of the swallowing and choking detection device 460. In this case, the terminal device 462 can acquire sound data related to a swallowing sound from the throat microphone 461, and image a surrounding portion of a mouth of a care receiver. Accordingly, the medication application that operates in the terminal device 462 may make a determination processing based whether the care receiver is swallowing or not.

For example, the terminal device 462 may perform the determination processing based whether the care receiver is swallowing or not after the aforementioned processing (3). For example, the terminal device 462 may determine whether the swallowing of the care receiver is detected within a predetermined time after the care receiver opens his or her mouth to take a medicine. The terminal device 462 determines that the medicine has been appropriately taken if the swallowing of the care receiver has been detected, and notifies the care giver of the problem being present if the swallowing of the care receiver has not been detected. Moreover, the terminal device 462 may determine whether medicine dropping in which the care receiver drops the medicine occurs by performing the object detection in which the medicine is detected from the captured image.

Moreover, the terminal device 462 may perform processing of causing the storing unit of the terminal device 462 or the storing unit 120 of the server system 100 to store an image in which the care receiver is captured. Note that, the operation of the medication application in the terminal device 462 may be the same as the operation in the terminal device 200, except that the swallowing determination processing whether the care receiver is swallowing or not and the video-recording storage can be performed.

Moreover, in at least one of the terminal device 200 and the terminal device 462, processing based on feces information from the feces detection device may be performed. For example, a cathartic is prescribed to a care receiver who does not defecate in some cases. Specifically, when a nurse or the like puts medicines for a care receiver into a medicine bag, a cathartic is added to a care receiver with a tendency toward constipation. Further, a timing lag is generated between timing when the nurse prepares a medicine bag and actual taking timing. Accordingly, it can also be considered that a case where defecation has not occurred for long hours at timing when the nurse prepares the medicine but defecation has occurred before the cathartic is taken. In this case, taking the cathartic is unnecessary, so that work of removing the cathartic in the medication management becomes necessary.

In the related art, although a state where information on the defecation is recorded, and can be shared among the plurality of care givers is assumed in the care facility, cooperation between the medication management (medication application) and the information on the defecation has not been sufficient. For example, in a case where a care giver who has checked the excretion is different from a care giver who performs the medication management, it is not easy to accurately remember the orally transferred massage until the time of medication management. Moreover, even if the excretion record remains in the database, actively browsing the data by the care giver results in a large burden.

Therefore, in the embodiment, the medication application may present whether the cathartic is to be omitted based on information from the feces detection device. For example, in both of the terminal device 200 and the terminal device 462, the medication application acquires information from the feces detection device, and performs processing of making a notification that the cathartic is to be omitted when defecation has occurred. The processing may be performed after the abovementioned authentication processing (2) of the medicine, for example. As described above, the above-mentioned processing (2) is certainly performed, in both of the terminal device 200 and the terminal device 462, and in the both cases where the medication application is activated from the home screen and is activated from the retrieval application. Therefore, by making a notification related to the cathartic after the processing (2), there is such an advantage that the processing order does not need to be switched in accordance with the situation (change in the algorithm can be reduced). Moreover, the notification timing becomes constant, so that the processing flow is easy to understand for the care giver.

<Data Sharing (Omission Notification)>

Note that, in the processing of the medication application described in the foregoing, whether the care receiver and the medication timing are correct can be checked. In addition, in the embodiment, the medication application may determine whether there is the medication omission in the medication. The medication omission herein indicates a situation where the medication management is not performed to at least some of care receivers who should take medicines in the care facility, for example.

The unit for which the medication omission is determined herein may be the entire care facility or may be each floor. Moreover, the timing to determine whether there is the medication omission may be timing when the medication application finishes, or may be deadline timing that is set based on the medication time period, for example.

Figure 21:
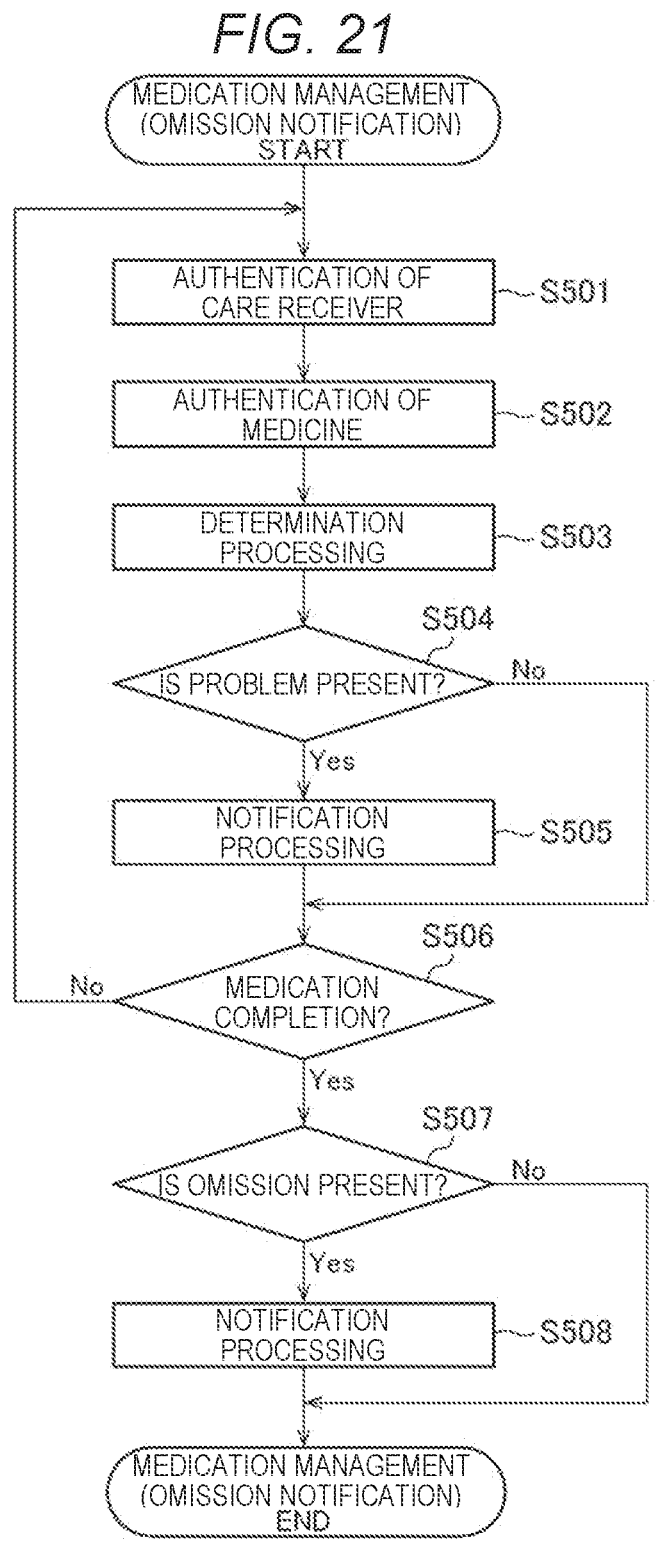

FIG. 21 is a flowchart in which processing of the medication application in a case where notification processing of medication omission is performed at finishing the application is described. The processing is executed in the terminal device 200, for example. Steps S501-S506 are similar to Steps S401-S406 in FIG. 19, and thus a detailed description is omitted. Moreover, instead of the processing at Steps S501-S506, the processing similar to S201-S204 in FIG. 15 may be performed. Moreover, swallowing determination processing whether the care receiver is swallowing or not and video-recording storage may be additionally executed.

If it has been determined that medication management has been completed at Step S506, the processing unit 210 determines whether there is the medication omission at Step S507. For example, the processing unit 210 determines that the care receiver subjected to the processing at Steps S501-S504 (and if necessary, S505) as a medication completed care receiver, and determines whether all the care receivers in the entire care facility or in the target floor complete the medication.

If a care receiver who does not complete the medication remains, the processing unit 210 determines that there is the medication omission (Step S507: Yes), and performs processing of notifying the care giver of the fact at Step S508. If all the care receivers complete the medication, the processing unit 210 determines that there is no medication omission (Step S507: No), and finishes the processing.

Figure 22:
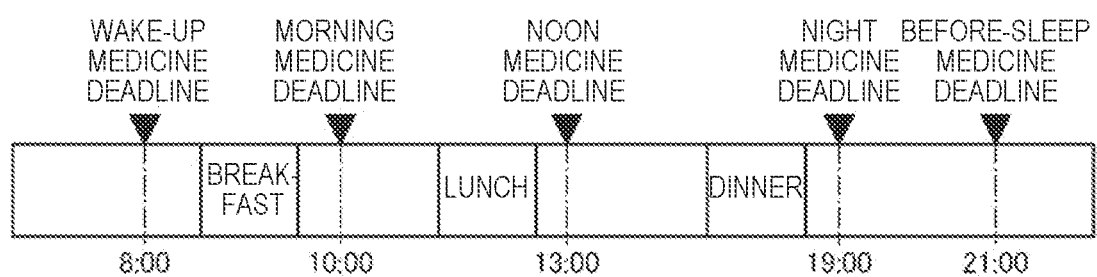

Moreover, FIG. 22 is a diagram illustrating an example of a medication schedule in the care facility. In the example in FIG. 22, the medication is performed at the time when the care receiver wakes-up, when the care receiver eats breakfast, when the care receiver eat lunch, when the care receiver eats dinner, and at the time when the care receiver goes to bed. The specific medication time of each care receiver varies in accordance with the order of the care, the arrangement of the care givers, the occurrence situation of the incident of the care receiver, and the like, and taking these variations into consideration, the timing when the medication management for all the care receivers should be completed is set as deadline timing. In the example in FIG. 22, the deadline timing in the medication management at the time when the care receiver wakes-up is 8: 00. Similarly, the deadline timing in the medication management at the time when the care receiver eats breakfast is 10: 00, the deadline timing in the medication management at the time when the care receiver eats lunch is 13: 00, the deadline timing in the medication management at the time when the care receiver eats dinner is 19: 00, and the deadline timing in the medication management at the time when the care receiver goes to bed is 21: 00.

Figure 23:
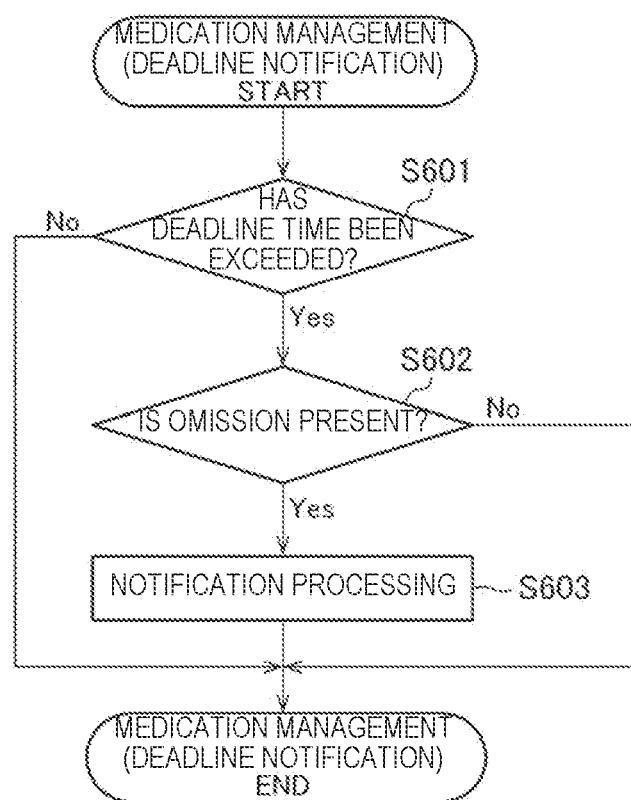
FIG. 23 is a flowchart describing omission notification processing at deadline timing.

FIG. 23 is a flowchart in which determination processing of the medication omission based on the deadline timing is described. The processing illustrated in FIG. 23 may be executed by an application different from the medication application that performs the processing illustrated in FIGS. 15, 19, 21, and the like, or may be executed due to the background operation performed by the medication application, for example.

When the processing is started, firstly at Step S601, the processing unit 210 determines whether the deadline timing is passed. For example, the processing unit 210 stores each time of 8: 00, 10: 00, 13: 00, 19: 00, and 21: 00, and determines that the deadline timing has been passed, at the first timing when the current time has passed by any of these times.

If the deadline timing is passed (Step S601: Yes), the processing unit 210 determines whether there is the medication omission at Step S602. If it has been determined that the current time has passed 8: 00 at Step S601, the processing unit 210 determines whether there is the medication omission at the time when the care receiver wakes-up. Specifically, the processing unit 210 may previously store a list of care receivers who need the medication at the time when the care receiver wakes-up, and may determine whether the medication management for all the care receivers written in the list has been completed. If a care receiver who does not complete the medication remains, the processing unit 210 determines that there is the medication omission (Step S602: Yes), and performs processing of notifying the care giver of the fact at Step S603. If all the care receivers complete the medication, the processing unit 210 determines that there is no medication omission (Step S602: No), and finishes the processing.

The processing unit 210 periodically executes the processing illustrated in FIG. 23 to perform the determination processing of medication omission at the deadline timing.

With the method in the embodiment, in a case where there is the medication omission, the care giver is notified of the fact, so that suitable measures can be urged. In addition, the two processing, having different triggers, of the processing illustrated in FIG. 21 when an application is executed and the processing illustrated in FIG. 23 based on the deadline timing, is used together, so that medication omission can be prevented, compared with a case where either one processing is used. A notification destination of when the medication omission occurs may be a care giver who takes charge of a care receiver to which the medication management is not performed, or may include the other care givers as the targets. For example, the notification may be made to all the care givers who take charge of the floor in which the target care receiver lives, or the notification may be made to all the care givers who work in the same time period. In this way, for example, even in a case where a care giver originally in charge deals with an incident of the care receiver and the like, and thus is unavailable, another care giver can help.

Further, it is assumed that the medication management in the embodiment is executed in a distributed manner in a plurality of terminal devices. For example, as described above, the medication application may operate in the terminal device 200 and the terminal device 462. In a case where the terminal device 462 in the swallowing and choking detection device 460 is used, the swallowing determination processing and video-recording storage can be performed as described above, so that the terminal devices to be used in the medication management may vary in accordance with ADL of a care receiver, for example.

Alternatively, it can be considered that a large number of care receivers occupy the care facility, and performing the medication management for all the care receivers by one care giver is not practical in some cases. In this case, a plurality of care givers execute the medication management by using different terminal devices, respectively.

In such a case where the medication management is performed using a plurality of terminal devices, information from each terminal needs to be aggregated at least before executing the determination processing whether there is the medication omission at the deadline timing illustrated in FIG. 23. Otherwise, information indicating which care receiver completes the medication may differ for each terminal device, so that the determination processing whether there is the medication omission cannot be executed in a unit of the entire care facility or each floor in the care facility.

For example, in a case where all the terminal devices 200 and the terminal devices 462 can communicate with the server system 100 all the time, each terminal device transmits information stored in each terminal device to the server system 100 at the timing when the medication application is finished and other timing. In this way, the server system 100 can generate master data in which all the information on the medication management of all care receivers in the target care facility is collected. The terminal device 200 of each care giver acquires the master data from the server system 100 to execute the determination processing whether there is the medication omission.

Further, it can be considered that some care facilities have such circumstances that a place to which radio waves for communication are difficult to reach is present in the facility, or are resources necessary for another communication, so that it is difficult to allocate the communication resources to share the medication result, and the like.

Therefore, for example, processing of reading data accumulated in the terminal device 462 may be performed by the terminal device 200. For example, each of the terminal device 200 and the terminal device 462 uses a timer unit to perform comparison processing between the current time and the deadline timing. Further, at the timing near the deadline timing, the terminal device 200 may output an alarm, and the terminal device 462 may display a QR code including the medication information indicating which the care receivers have completed the medication. The medication information herein includes information, such as a care receiver to which the medication management has been completed in the target terminal device 462, and the medication timing. The care giver who has recognized the alarm moves to the installation place of the terminal device 462, and performs processing of reading the QR code using the terminal device 200. The terminal device 200 cancels the alarm in a case where the terminal device 200 has acquired the medication information in the terminal device 462 based on the QR code. In this way, the information of the terminal device 462 can be aggregated in the terminal device 200, so that the determination processing whether there is the medication omission can be appropriately executed.

Figure 24:
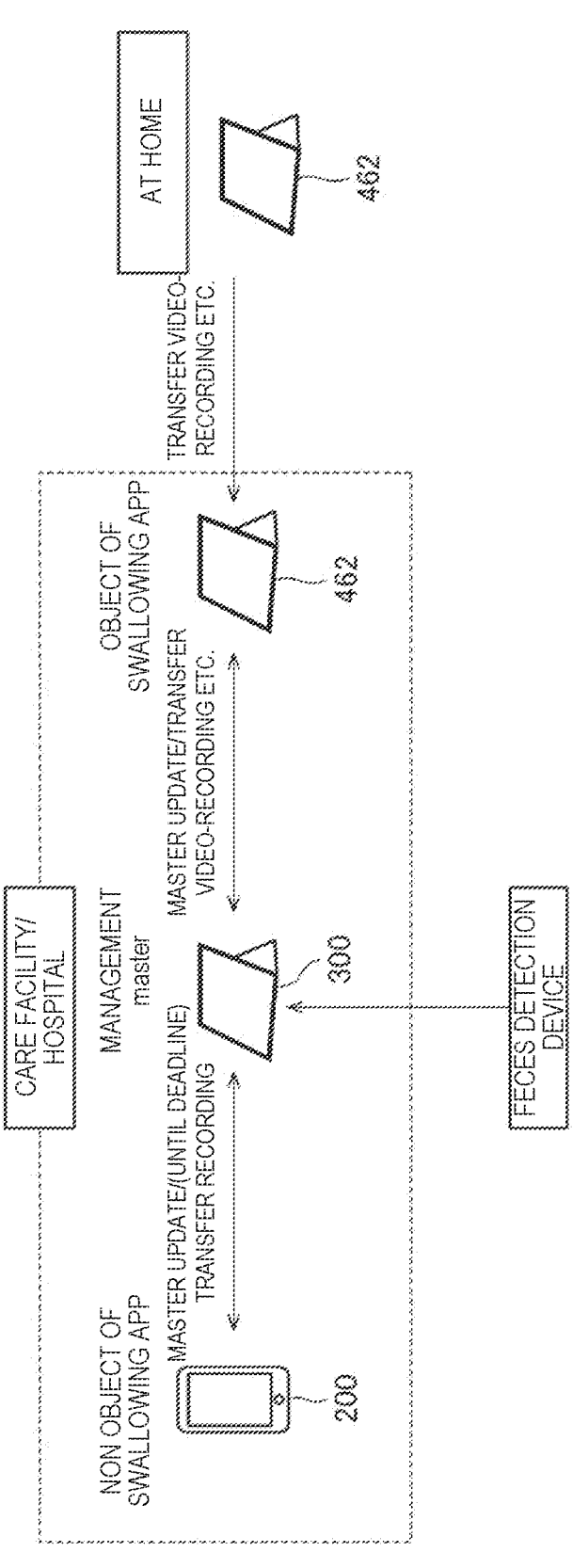
FIG. 24 illustrates a system configuration example in a case where a plurality of devices share a result of medication management.

Alternatively, a master device 300 may be disposed in the care facility, and a result of the medication management executed in each terminal device may be transmitted to the master device 300. FIG. 24 is a diagram illustrating a system configuration example in this case. For example, the master device 300 is disposed at a predetermined position in the care facility or the like, and the terminal device 200 and the terminal devices 462 are electrically connected or communicatable to the master device 300 via the network in the facility. The master device 300 may be any of the terminal devices 462, or may be a device different from the terminal device 462. In this case, the master device 300 may collect a result of medication management, video-recording storage, and the like at home of a care receiver who uses day care and the like. In this way, the medication situation outside the care facility can also be appropriately managed by the care giver.

Moreover, as illustrated in FIG. 24, the master device 300 may collect information related to a defecation situation of each care receiver based on the information from the feces detection device. Further, the terminal device 200 or the terminal device 462 may determine whether the aforementioned cathartic is to be omitted by acquiring the information from the master device 300.

Figure 25:
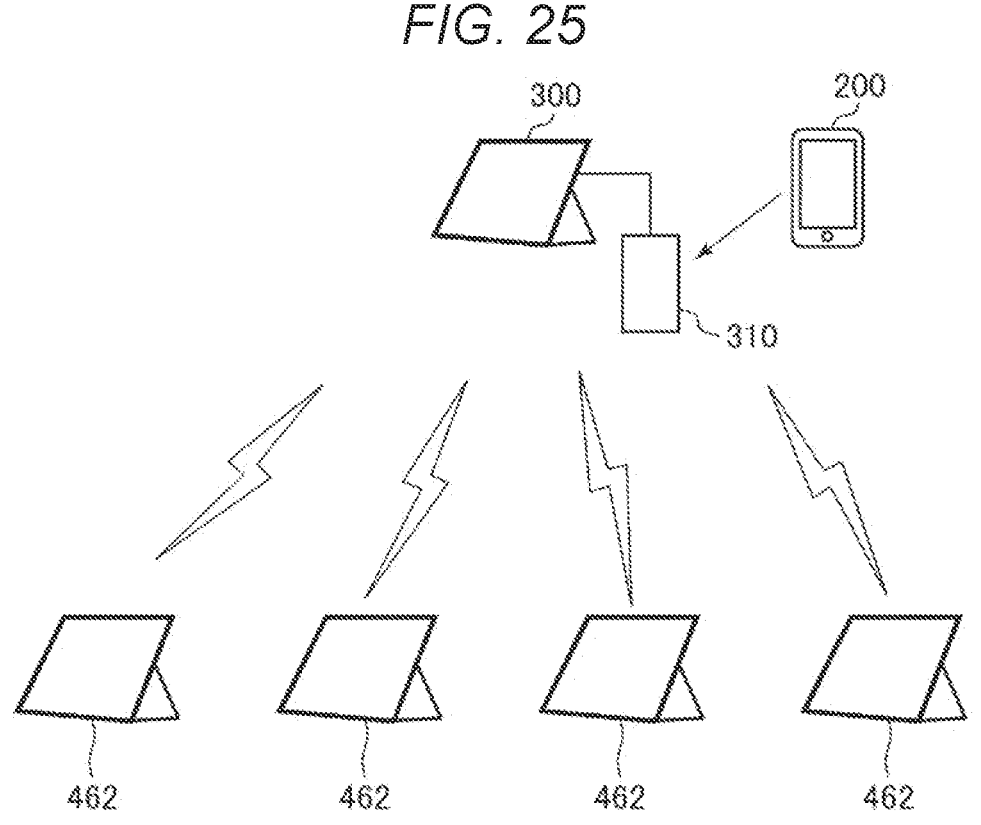
FIG. 25 illustrates a system configuration example in a case where a plurality of devices share a result of medication management.

Moreover, the master device 300 is not limited to one that performs the medication management of the entire care facility, but may be used for the management of information in a part of the care facility. For example, as illustrated in FIG. 25, a case where a plurality of terminal devices 462 are disposed in a certain floor, and a plurality of care givers who take charge of the floor share one terminal device 200 is considered. In this case, information from each device in the floor is collected to allow the medication management including the determination processing whether there is the medication omission in the floor to be appropriately executed.

For example, the master device 300 and the terminal devices 462 herein may perform the communication using near field communication (for example, Bluetooth and the like) having a communication distance to the extent that covers the floor. A result of medication management by each terminal device 462 is successively collected by the master device 300. Moreover, the terminal device 200 may output an alarm for requesting communication with the master device 300 at timing near the deadline timing, for example. The care giver may electrically connect the terminal device 200 to the master device 300 to share information between the terminal device 200 and the master device 300. Specifically, the terminal device 200 can appropriately execute the determination processing of the medication omission at the deadline timing by acquiring a result of medication management in each terminal device 462 from the master device 300. Note that, FIG. 25 illustrates an example in which the master device 300 is provided with a dock 310, and the terminal device 200 is electrically connected or communicable to the dock 310 (placed on the dock 310, in a case of the none-directly-contact connection, for example) to execute the communication between the master device 300 and the terminal device 200. Further, the master device 300 the terminal device 200 may perform wireless communication, and various kinds of modifications can be made to the specific communication mode. Moreover, a part of the terminal devices 462 can preferably directly transmit data to the terminal device 200, without using the master device 300.

4.3 Fiddling Detection Application

As described above using FIGS. 9A to 9C, by using the communication tag 470, fiddling by a care receiver can be detected. Further, when the first tag portion 471 is exposed by a predetermined length or more to the outside of the second tag portion 472, the communication tag 470 becomes readable by a reader and fiddling detection is determined. Accordingly, in a situation with low necessity, for example, a slight touch to the clothing by a care receiver may be read by the reader, and it can also be considered that the notification is generated in such a case to disturb the care of the care giver.

Accordingly, the notification based on the reading result of the communication tag 470 may be generated in a case where a predetermined condition has been satisfied. FIGS. 26 and 27 are diagrams in which a relation example among applications and devices when the notification of fiddling is appropriately controlled is described. The reader herein is disposed in a position at which the target care receiver performs fiddling with high probability, for example, a room of the target care receiver and the like. Further, the reader may be a device in which switching ON or OFF (including an active state or a sleep state) can be controlled based on a control signal from the outside. For example, switching ON or OFF of the reader that is electrically connected or communicable to a network such as LAN may be controlled based on communication from another device via the network. Alternatively, the reader may be electrically connected or communicable to an IoT device (a smart plug in the narrow sense) capable of controlling switching ON or OFF of power supply to the connected device. In this case, the IoT device controls the power supply to the reader based on communication from another device via the network, whereby switching ON or OFF of the reader may be controlled. In the usual state, the power supply of the reader is set to OFF. Accordingly, the communication tag 470 is primarily not read in a situation with low necessity, so that making a notification related to fiddling can be prevented.

FIG. 26 is a diagram in which a relation example of applications and a device in a case where a care receiver wears a diaper is described. In this case, the communication tag 470 may be attached to the diaper or may be attached to the trousers. A device that detects an excretion state in a diaper is described, for example, in Japanese Patent Application No. 2021-553004 "INTERNET OF THINGS (IOT) SOLUTION FOR MANAGEMENT OF URINARY INCONTINENCE" filed on 4 Mar. 2020, or in Japanese Patent Application No. 2021-573724 "DETECTING DEVICE FOR DETECTING STATE OF DIAPER AND DIAPER ACCOMMODATING DETECTING DEVICE" filed on 12 Jun. 2020. These patent applications are fully incorporated in the specification of the present application by reference. Note that, although the abovementioned patent applications disclose a method using RFID, or a method of detecting a resistance value and a conductivity, the feces detection device according to the embodiment may be a device that uses another method such as an odor sensor.

Further, for example, in a case where feces and urine can be classified by the feces detection device, the feces detection device application associates the feces detection device with a care receiver, and information on the feces and information on the urine of the care receiver are accumulated in the server system 100. For example, in a case where the defecation caused by the care receiver has been detected by the feces detection device, as illustrated in FIG. 26, the server system 100 firstly performs processing of outputting information for instructing the terminal device 200 of a care giver who takes charge of the care receiver to provide the care for changing the diaper of the care receiver. Note that, a notification object is not limited to one care giver, but may include another care giver (for example, a care giver who takes charge of the same floor) or the like who supports the care giver.

In a case where the care giver was able to execute the care for changing the diaper of the care receiver in response to the notification, the state of the care receiver is shifted to a state in which there is no feces in the diaper by the care for changing the diaper of the care receiver. In this case, even if the care receiver puts his or her hand into the diaper, feces are not fiddled, so that the necessity for the notification of fiddling is low. Accordingly, the power supply of the reader is maintained in the OFF state.

Meanwhile, in a case where a care giver in charge cannot instantly change a diaper of the care receiver due to another care, in a case where a care receiver is sleeping and it is determined that the sleeping is interrupted due to careless diaper changing, or other cases, a state in which changing the diaper of the care receiver is not performed may continue. In this case, as illustrated in FIG. 26, the server system 100 may perform control to turn the power supply of the reader from an OFF state to an ON state. Accordingly, the reader is shifted in a state where the reader can execute the communication with the communication tag 470. Accordingly, in a case where the antenna of the communication tag 470 is not shielded because the care receiver puts his or her hand into the clothing, the reader performs reading of the communication tag 470. For example, the server system 100 acquires a reading result by the reader, and detects fiddling by the care receiver associated with the communication tag 470 based on the reading result. The server system 100 performs processing of notifying the terminal device 200 of a care giver who takes charge of the care receiver, for example, of the fiddling. In this way, while notification of fiddling is turned OFF in the usual state, the notification can be turned ON in a necessary scene.

Moreover, as illustrated in FIG. 26, in a case where the feces detection device has detected urination by a care receiver, the power supply of the reader may be set to the ON state. Even in a case where urination has been detected, if the amount of the urine is within the assumption, a large portion of the urine can be absorbed by an absorbent in the diaper of the care receiver, and the degree of seriousness of the situation is lower than that of the defecation. Accordingly, there may be a case where changing the diaper of the care receiver is not positively performed (for example, the state without any change is maintained until the diaper changing time set as a routine). However, it is insanitary that the care receiver puts his or her hand into the diaper of the care receiver and touches the absorbent, and the urination has occurred, which is considered to be a situation where the diaper needs to be gazed closely compared with the usual state. In that regard, as illustrated in FIG. 26, the power supply of the reader is set to the ON state based on detecting the urination as a trigger, so that the detection and the notification of fiddling can be performed at the suitable timing.

Note that, the degree of priority of the notification when fiddling is detected may differ between a case where the power supply of the reader is turned ON using the defecation detection as a trigger and a case where the power supply of the reader is turned ON using the urination detection as a trigger. Specifically, the degree of priority of the notification is set higher in the case of the defecation detection than in the case of the urination detection. In this way, in a case where there is a possibility that a care receiver puts in his or her hand into the clothing to cause a more serious state (the care receiver touches feces, throws the feces left on the hand, and the like), the notification with a high degree of priority can be generated. As a result, it is possible to urge the care giver who has received the notification to perform suitable measures.

Moreover, as illustrated in FIG. 26, after the processing of the positioning application has completed, the power supply of the reader may be turned ON in a predetermined period. The positioning application herein may specifically determine whether the position or the posture of the care receiver is appropriate or not in a bed position, and may more specifically determine whether positions of a care receiver, a care giver, and a diaper are appropriate in changing the diaper of the care receiver, and the like. In a case where a diaper has been changed, depending on the wearing state (for example, the put state of the diaper), there is a possibility that the care receiver feels a sense of discomfort and is likely to put his or her hand into the clothing. In that regard, the reader is turned ON after changing the diaper based on the cooperation with the positioning application, so that it is possible to appropriately detect such a motion (whether the care receiver puts his or her hand into the clothing) by the care receiver, and make a notification.

Moreover, depending on the sensor configuration of the feces detection device and the processing algorithm, it can be considered that the defecation and the urination are not classified. In this case, as illustrated in FIG. 26, in a case where the feces detection device has detected excretion by a care receiver, the power supply of the reader may be set to the ON state. In this case, it is difficult to divide the situation into details compared with the case where defecation and urination are classified, there is also a similar advantage in that the detection and the notification of the fiddling are possible in a scene with high necessity.

Moreover, as described above in relation to the medication application, in a case where a cathartic is prescribed to a care receiver, whether the care receiver is caused to take the cathartic as prescribed or the care receiver is not caused to take the cathartic to omit the cathartic may be switchable. For example, as illustrated in FIG. 26, in a case where defecation has been detected based on the output from the feces detection device, in addition to the notification of changing the diaper, the cooperation processing with the medication application may be executed. Hereinafter, although the cooperation between the applications via the server system 100 is exemplified, the feces detection device and the terminal device 200 in which the medication application operates may perform direct communication, and various kinds of modifications can be made to the cooperation method.

For example, the processing unit 110 of the server system 100 performs the defecation detection on each care receiver, based on information from the feces detection device, and information on a care receiver from the feces detection device application. Further, in a case where defecation by a care receiver to which a cathartic was prescribed has been detected, the processing unit 110 executes processing of removing the cathartic of the care receiver (processing to present the information not to take the cathartic of the care receiver). For example, as described above in relation to the determination processing of the medication omission, the storing unit 120 may store the master data that is used for the medication management for each care receiver. Further, the processing unit 110 performs processing of adding information indicating that the cathartic of the target care receiver is excluded to the master data.

In the processing of the medication application, as illustrated in Step S202 in FIG. 15 and Step S403 in FIG. 19, whether a care receiver and a medicine are correct is determined. In this case, by referring to the master data, the medication application may determine whether information indicating that a cathartic is excluded is added, as for a target care receiver. Further, if the information indicating that the cathartic is excluded is added, the medication application notifies a care giver of information indicating that the cathartic is omitted and should not be taken. FIG. 28 illustrates a screen example in which a notification that a cathartic is to be omitted is made. For example, the medication application associates a care receiver with a care receiver to which a medicine has been prescribed, and performs, in a case where there is no problem in the association between the current time and the medication timing, processing of displaying a character string "OK" that indicates there is no problem. The processing is similar to those in FIG. 14D and FIG. 18D. In FIG. 28, in addition to the character string "OK", display processing of text "PLEASE OMIT CATHARTIC" is also performed. In this way, in a case where the defecation has already occurred, the cathartic with low necessity can be prevented from being taken by the care receiver. Further, the notification that the cathartic is to be omitted is not limited to the characters. For example, the terminal device 200 may output a voice "PLEASE OMIT CATHARTIC" using the speaker. In this way, a care giver does not need to gaze the display 240 of the terminal device 200, so that a burden on the care giver can be reduced.

FIG. 27 is a diagram in which a relation example of applications and a device in a case where a care receiver can excrete in a toilet is described. In this case, the communication tag 470 may be attached to the underwear or may be attached to the trousers. Note that, for example, the device disclosed in international patent publication 2021/192475 above may be used or another device may be used for the defecation and the urination in the toilet.

In this case, even when defecation or urination has been detected in the toilet, it is difficult to consider that feces or urine remains in the clothing. Accordingly, the detection of excretion does not directly indicate that a risk of fiddling is high, so that the power supply of the reader is not set to the ON state. For example, in a case where defecation or urination has been detected by a device (a microphone, a camera, or the like) disposed in the toilet, the server system 100 stores information indicating the content, the time, and the like of the excretion in the storing unit 120. Moreover, similar to the aforementioned example described using FIG. 26, in a case where the defecation has been detected, cooperation processing with the medication application may be executed.

Moreover, the processing unit 110 of the server system 100 may perform excretion prediction for each care receiver based on information on the defecation and the urination from the feces detection device disposed in the toilet. The excretion prediction herein may be, for example, processing of obtaining an interval of urination, an interval of defecation, and the like, or may be processing of predicting how many minutes later next defecation and urination occur. The processing may be performed by statistical processing based on actual excretion records, or may be executed by machine learning using the excretion records as the correct data.

Further, the processing unit 110 may perform control to set the power supply of the reader to the ON state in a predetermined period including the excretion predicted timing. In this way, fiddling can be detected at timing with high probability of the occurrence of excretion. For example, in a case where a care receiver cannot go to the toilet and brings incontinence in the room, and puts his or her hand into the clothing thereafter, the probability of the occurrence of fiddling is high and the degree of seriousness is also high. Moreover, also in a case where a care receiver does not go to the toilet, and for example, removes the clothes and intentionally excretes (urinates or defecates) on the bed in the room, the degree of seriousness is also high. In that regard, with the embodiment, fiddling can be detected in a time period when the probability of the occurrence of the excretion is high, so that it is possible to appropriately detect a situation where the degree of the seriousness is high, and make a notification to a care giver. The notification in this case may be a notification with a high degree of priority. Meanwhile, in a case where a care receiver goes to the toilet as usual and excretes, the care receiver performs a motion of lowering trousers and an underwear, and it is assumed that the toilet in which the motion is performed is apart from a room in which a reader is disposed. Accordingly, even if the trousers are lowered in a state where the power supply of the reader in the room is set to the ON state as mentioned above, the reader does not read the communication tag 470, so that unnecessary fiddling can be prevented from being notified. Moreover, the power supply of the reader is set to the OFF state in a time period with a low probability of the occurrence of excretion, so that a notification with low necessity can be prevented also in this period.

Note that, in the foregoing, the example in which defecation and urination are recorded based on the output from the feces detection device such as a microphone and a camera, disposed in the toilet, and an excretion prediction is generated based on the record has been described, but the embodiment is not limited thereto. For example, with the feces detection device or instead of the feces detection device, another device for excretion prediction may be used. For example, there is a device that measures swelling of a bladder based on an ultrasonic sensor, and predicts excretion timing based on a measurement result. In the embodiment, the excretion prediction may be executed based on these devices.

Moreover, in the foregoing, the example in which the reader that reads the communication tag 470 is disposed in the room of the care receiver has been described. In this manner, the reader is set at a position with a high probability that the care receiver stays, whereby fiddling in the normal life that the care receiver performs can be appropriately detected. Further, in accordance with the situation of the care receiver, there is also a possibility that fiddling with a high degree of seriousness occurs in a place other than the room. For example, a care receiver who is a dementia patient misidentifies a given place other than a toilet as the toilet, and thus habitually excretes in the given place in some cases. In this case, by detecting that the care receiver puts his or her hand into the clothing in the given place, it is possible to notify a care giver of a possibility of the excretion in the place other than the toilet.

Accordingly, in the embodiment, a first reader that is disposed in a room of a care receiver and a second reader that is disposed in a given position other than the room of the care receiver may be used. The place where the second reader is disposed is a place where the target care receiver misidentifies as the toilet as described above, and thus the place the reader is disposed is different depending on each care receiver. The power supply of the second reader is set to the ON state all the time, for example. Note that, similar to the aforementioned example, a power supply of the second reader may be set to the ON state if some sort of condition is satisfied, and the power supply may be set to the OFF state in another period. By using the first reader and the second reader, it is possible to make a suitable notification in accordance with the type of the reader that has read the communication tag 470 to a care giver.

Moreover, a possibility that some care receivers misidentify a room of another care receiver as the toilet can be considered. For example, a care receiver A misidentifies a room of a care receiver B as the toilet. In this case, a reader that is provided in a room of the care receiver B and detects fiddling and the like in the room of the care receiver B may function as a second reader for the care receiver A. For example, the reader is a second reader for the care receiver A, and the power supply thereof is thus set to the ON state all the time. In this case, the reader may read the information for identifying the communication tag 470 (for example, an ID and a registration number). For example, the server system 100 acquires, as a reading result of the reader, information including the read registration number of the communication tag 470. Further, the server system 100 may switch the processing depending on whether the registration number corresponds to the care receiver A or corresponds to the care receiver B.

For example, in a case where the registration number corresponds to the care receiver A, a situation where the care receiver A misidentifies the room of the care receiver B as the toilet and enters the room, and puts his or her hand into the clothing is estimated. Therefore, the processing unit 110 may make a notification with a high degree of priority to a care giver who takes charge of the care receiver A.

Meanwhile, in a case where the registration number corresponds to the care receiver B, the care receiver B is in a situation where the care receiver B puts his or her hand into the clothing in the room of himself or herself. In other words, as described above, in accordance with the situation, there is a case where the notification is necessary because the degree of seriousness is high, and there is a case where the necessity of the notification is low. Therefore, in a case where the communication tag 470 of the care receiver B has been read, the processing unit 110 may determine whether a notification to the terminal device 200 should be generated based on information from another device or application. For example, as illustrated in FIG. 26, in a case where at least one is satisfied among a case where defecation has been detected but the care for changing the diaper of the care receiver is not performed, a case where urination has been detected, a case where excretion has been detected when defecation and urination are not classified, and a case of during a predetermined period from the timing of completing the positioning application, the processing unit 110 makes a notification to the terminal device 200. Alternatively, as illustrated in FIG. 27, within a predetermined period including timing with a high probability that excretion occurs, the processing unit 110 may make a notification to the terminal device 200.

Moreover, the condition that the power supply of the reader is set to the ON state is not limited to the abovementioned example. For example, the power supply of the reader may be set to the ON state in a case where the detection device 430 has determined that the body movement is equal to or more than a threshold. It is assumed that the body movement becomes larger in a case where fiddling is performed than that in a normal time. Accordingly, if the body movement is less than the threshold, the probability that the fiddling is not performed is high, so that an unnecessary notification can be prevented with the abovementioned condition.

Moreover, the reader may be set to the ON state in a case where it has been determined that the improper score is equal to or more than a threshold. The improper score may be obtained, for example, based on biological information (the respiration, heartbeat, the amount of activity, and the like) from the detection device 430. In a case where the improper score is high, the probability that a care receiver suffers from dementia, and there is a possibility that the care receiver performs fiddling, that is an unclean behavior. Accordingly, by using the improper score, a notification can be generated in a situation with high necessity.

Moreover, information such as the feces detection, the body movement, and the improper score is not limited to those that are used for switching the ON state or the OFF state of the fiddling detection. For example, while the ON state in the fiddling detection is maintained, processing of associating information such as the feces detection, the body movement, and the improper score, as additional information, with a fiddling detection result may be performed. In this way, the care giver can easily understand the cause why the care receiver performs fiddling and why the notification is activated. For example, in a case where the feces detection has been notified together with the fiddling notification, it becomes easy for the care givers to consider how to deal with the situation for example, the care for changing the diaper of the care receiver can prevent the fiddling of the care receiver.

Moreover, based on the determination result related to the fiddling, evaluation processing related to ADL of the care receiver and whether the end-of-life care should be started may be performed. In this case, for example, when all data for one day is collected, the evaluation processing may be automatically executed.

Moreover, when the fiddling detection is notified, a proposal whether the care giver should intervene to the care receiver and timing to intervene to the care receiver may be performed. For example, an example of a flow of the excretion detection, the fiddling detection, the intervention to the care receiver, and the care receiver falling asleep is considered in a time-series manner. In this case, it can be considered that the care receiver who has been in a sleep state is in an interrupting arousal at least at a stage after the intervention by the care giver. In this case, it is desired for the care receiver to immediately shift to the sleep state from the arousal state again, and to sleep until the wake up time next morning. However, there is a possibility that the timing to intervene to the care receiver that brings easy falling asleep is different depending on a specific situation. It can be considered that the specific situation includes the fiddling detection time, the content of additional information (the feces detection, the body movement, and the improper score), the attribute of the care receiver, and the like. For example, the processing unit 110 may evaluate the extent of falling asleep after the intervention by the care giver based on a detection result of fiddling and a content of the additional information. For example, the processing unit 110 may perform processing of proposing the intervention by the care giver in a case where the evaluation value is equal to or more than a predetermined value, and not proposing the intervention by the care giver in a case where the evaluation value is less than the predetermined value. Alternatively, the processing unit 110 may estimate preferable timing to intervene to the care receiver based on the evaluation result, and notify the terminal device 200 of the care giver of the estimation result.

Moreover, the terminal device 200 can receive an input of measures (intervention) performed by a care giver who has been notified of the fiddling. The processing may be implemented such that the processing unit 210 operates in accordance with the fiddling detection application, or may be implemented by using another application, for example. The intervention herein can include various kinds of measures including correcting how to put a diaper, toilet guiding, calling-out, applying Vaseline, and the like.

For example, the processing unit 110 may obtain, based on a content of the intervention, and information related to a sleep state acquired by using the detection device 430 and the like after the intervention, a correspondence relationship between the intervention content and a sleep score after the intervention. The sleep score is an indicator value indicating the quality of sleep, and is determined based on the sleep time, the sleep depth, the frequency and the continuous time of interrupting arousal, time from getting in a bed to shifting to a sleep state, and the like. For example, the processing unit 110 may determine, based on a relation between an intervention content related to the care receiver and a sleep score, an intervention content that brings easy falling sleep after the intervention, and notify the terminal device 200 of the intervention content. Moreover, the processing unit 110 may make a notification of whether care should be performed, or make a notification about an attention point and the like when the intervention is performed.

4.4 Positioning Application

Next, an example of a detailed screen interface of the positioning application is described. As described above, the positioning application may operate in a setting mode of performing setting and in a use mode of supporting the adjustment of the actual position or posture of the care receiver in accordance with the setting.

Figure 29A:
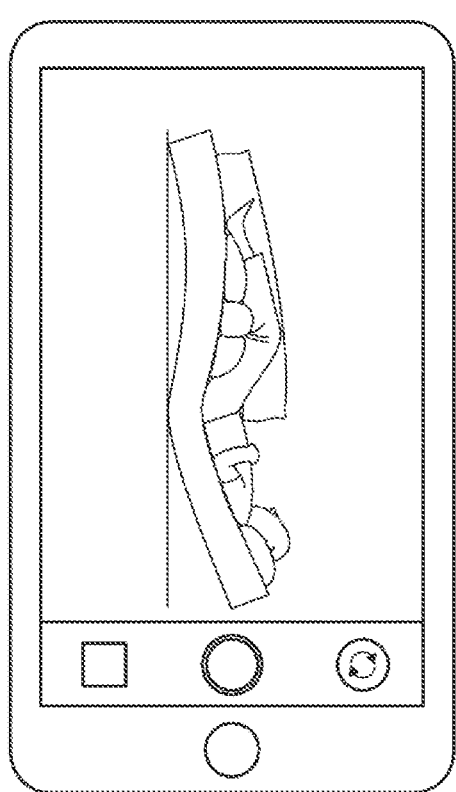
FIG. 29A illustrates a screen example when a captured image that is correct data (that could be trained data) of the positioning application is acquired.

FIGS. 29A to 29D illustrate examples of screens that are used when a skilled care giver inputs the correct data in the setting mode, for example. For example, as illustrated in FIG. 29A, the care giver captures image of a state in which the position and the posture of the care receiver for example can be considered to be correct using the imaging unit 260 of the terminal device 200. In FIG. 29A, an image in which a care receiver who takes a correct lying posture and a state where a plurality of cushions are disposed to desired positions has been captured is acquired as the correct data.

Figure 29B:
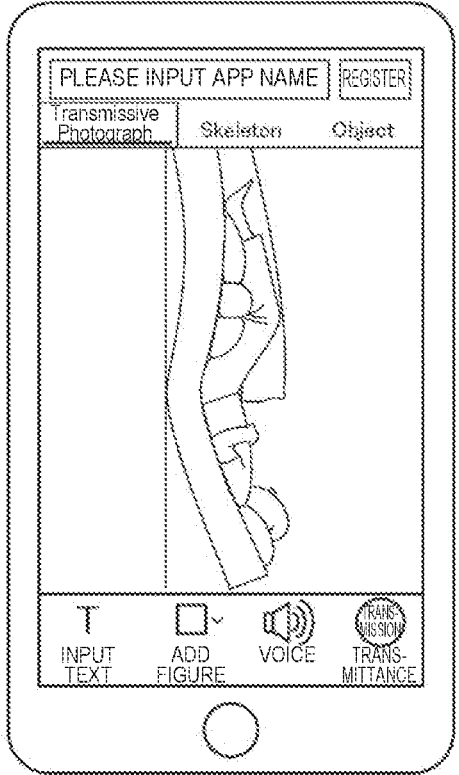
FIG. 29B illustrates an input screen example of additional information in the positioning application.
Figure 29C:
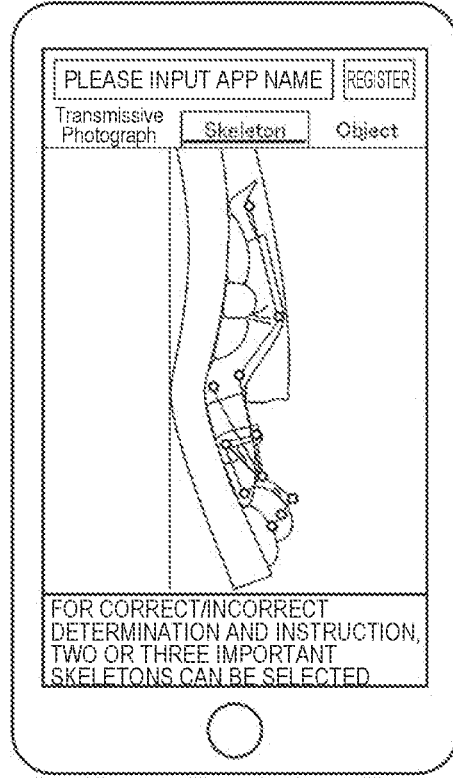
FIG. 29C illustrates an input screen example of additional information in the positioning application.
Figure 29D:
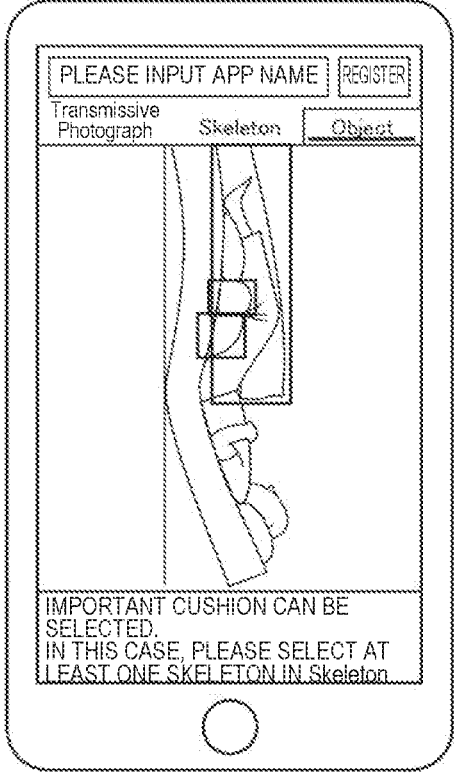
FIG. 29D illustrates an input screen example of additional information in the positioning application.

FIGS. 29B to 29D illustrate the screen examples that are used when additional information is added to the captured image. For example, the positioning application may display, in the setting mode, a screen in which text or a figure is added (FIG. 29B), a screen in which information related to a result of the skeleton tracking is added (FIG. 29C), and a screen in which information related to a result of the object detection processing is added (FIG. 29D).

In a case where a captured image has been acquired in the screen illustrated in FIG. 29A, for example, the positioning application may make a transition to the screen illustrated in FIG. 29B. Further, in a case where an operation of swiping the screen to the left in the screen illustrated in FIG. 29B has been performed, the positioning application performs processing of making a transition to the screen illustrated in FIG. 29C. Similarity, in a case where an operation of swiping the screen to the left in the screen illustrated in FIG. 29C has been performed, the positioning application performs processing of making a transition to the screen illustrated in FIG. 29D. Moreover, in a case where an operation of swiping the screen to the right has been performed, the screen transition may be performed in this order listed from FIG. 29D, FIG. 29C, to FIG. 29B. Moreover, based on the selection operation of each of tabs "TRANSMISSIVE PHOTOGRAPH", "SKELTON", and "OBJECT" that are provided in an upper portion of the screen, the positioning application may execute the transition between the screens illustrated in FIG. 29B to FIG. 29D. In this way, it is possible to cause a care giver to input various kinds of additional information using an easy-to-understand interface. Hereinafter, an input screen of each additional information is described.

Figure 30A:
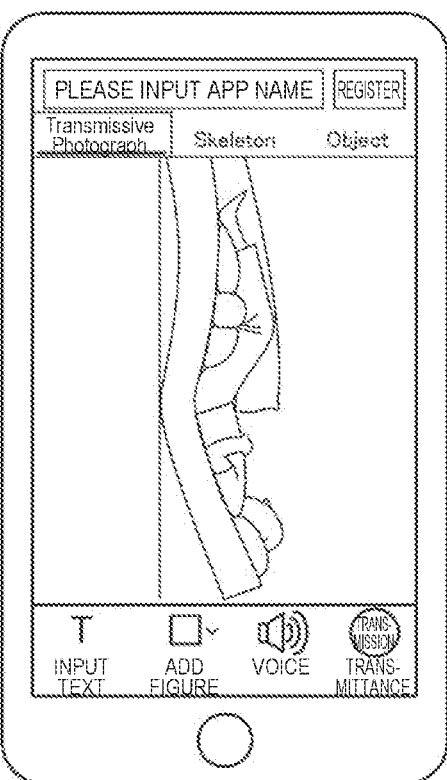
FIG. 30A illustrates an input screen example of additional information that is text or a figure.

FIGS. 30A to 30D illustrate examples of screens in which text or an image is added. FIG. 30A is a screen similar to that in FIG. 29B, and is a basic screen that is used for addition of a text or the like, for example. As illustrated in FIG. 30A, in accordance with information to be an object to be added, icons and character strings indicating respective items of "TEXT INPUT", "FIGURE ADDITION", and "VOICE" may be displayed on the screen. Moreover, the screen illustrated in FIG. 30A may include an icon for setting the transmittance when the correct data is superimposed.

Figure 30B:
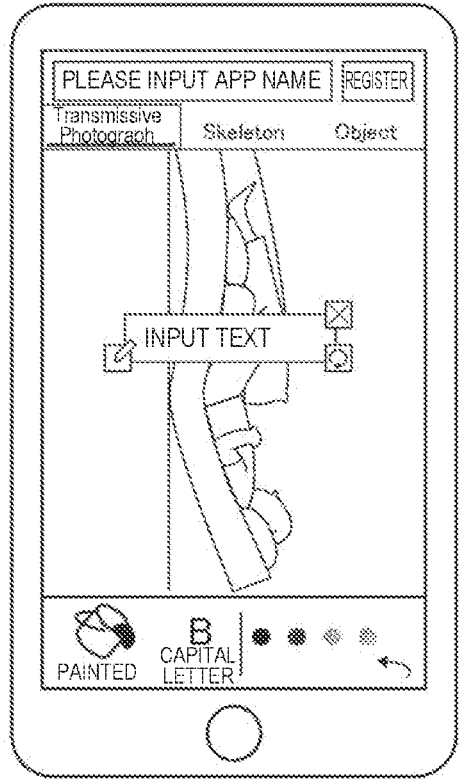
FIG. 30B illustrates an input screen example of additional information that is text.
Figure 30C:
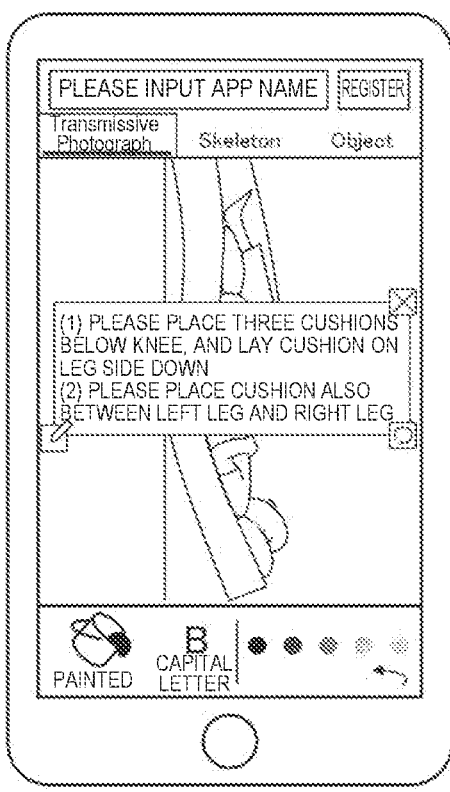
FIG. 30C illustrates an input screen example of additional information that is text.

FIG. 30B illustrates an example of a text input screen that is displayed in a case where an icon corresponding to "TEXT INPUT" has been selected in the screen illustrated in FIG. 30A. In the text input screen, for example, as illustrated in FIG. 30B, a text box in which a text is input is displayed. In a case where a selection operation of the text box has been performed, the positioning application displays an interface for text input such as a software keyboard, which is not illustrated, and receives text input by a care giver. FIG. 30C illustrates a screen example after the text input by the care giver. In the example in FIG. 30C, explanatory text related to the arrangement of cushions "PLEASE PLACE THREE CUSHIONS BELOW KNEE, AND LAY CUSHION ON LEG SIDE DOWN" and "PLEASE PLACE CUSHION ALSO BETWEEN LEFT LEG AND RIGHT LEG" is input. Note that, as illustrated in FIGS. 30B and 30C, the background color of the text box, the thickness of a font, the color of the font, and the like may be changeable. Moreover, the orientation of the text box and the position thereof on the screen may be changeable.

Figure 30D:
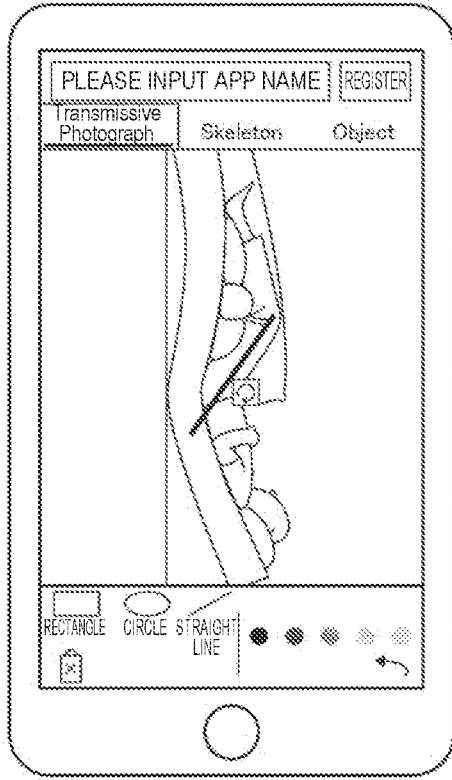
FIG. 30D illustrates an input screen example of additional information that is a figure.

FIG. 30D illustrates an example of a figure addition screen that is displayed in the screen illustrated in FIG. 30A in a case where an icon corresponding to "FIGURE ADDITION" has been selected. In the figure addition screen, for example, as illustrated in FIG. 30D, types of figures such as a rectangle, a circle, and a straight line, and icons for selecting the color of the figure are displayed. FIG. 30D illustrates an example in which the straight line has been selected. For example, the care giver rotates and deforms a figure that is displayed by being superimposed on the captured image to allow various kinds of figures to be added on arbitrary positions in the captured image. For example, as illustrated in FIG. 30D, a straight line for specifying an angle when the care receiver raises his or her knee may be added. Alternatively, in order to identify a position and a size of the cushion, some sort of a figure may be added so as to be overlapped with the cushion as a target.

Figure 31A:
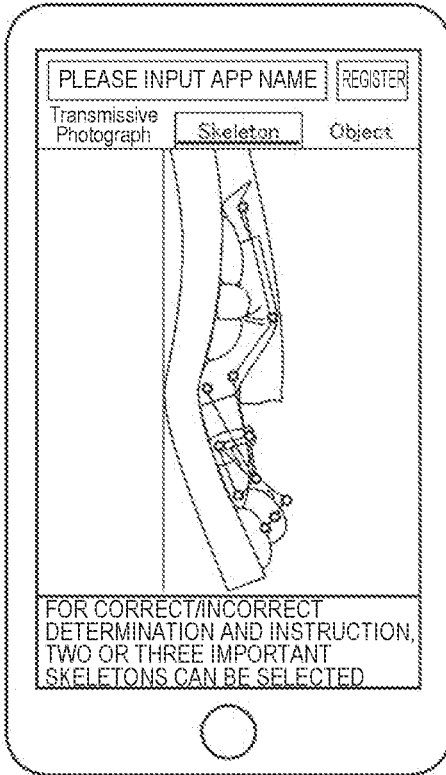
FIG. 31A illustrates an input screen example of additional information related to skeleton tracking.
Figure 31B:
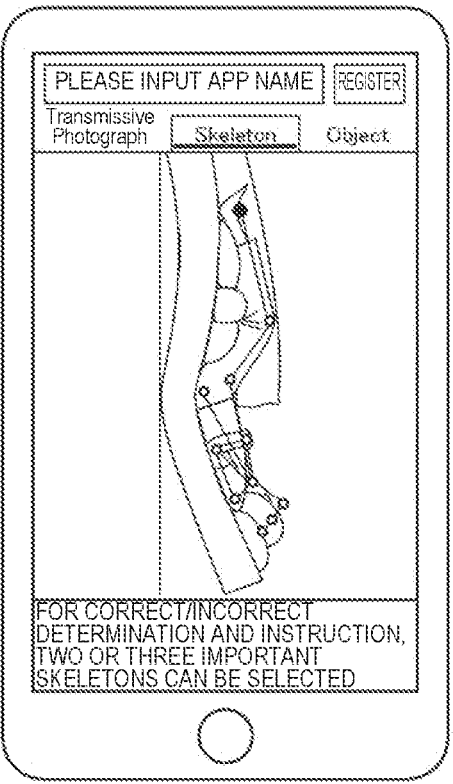
FIG. 31B illustrates an input screen example of additional information related to skeleton tracking.

FIGS. 31A and 31B illustrate examples of screens in which information related to a skeleton tracking result is added. FIG. 31A illustrates a screen similar to that in FIG. 29C, and is a screen in which a skeleton tracking result is superimposed on a captured image and displayed, for example. As illustrated in FIG. 31A, the skeleton tracking result may include a predetermined number of joint-points indicating positions of shoulders, elbows, wrists, a hip, a hip joint, knees, ankles, and the like of a care receiver (or care giver), and line segments that connect the respective joint-points. The screen may include text that urges selection of joint-points considered to be important in the detected joint-points. In the example in FIG. 31A, in the predetermined number (for example, 17 points) of joint-points included in the skeleton tracking result, text that urges selection of two joint-points or three joint-points is displayed. The selected joint-points are used in a specific instruction in the whether the captured image is correct or not in determination processing (OK or NG) and when the care is executed.

FIG. 31B illustrates a screen example in a state where some joint-points in the skeleton tracking result have been selected. In the example in FIG. 31B, a joint-point corresponding to the ankle has been selected, so that the color of the joint-point is changed to a color different from that of the other joint-points. Further, the selected joint-point only needs to be distinguishable, and various kinds of modifications can be made to a specific display mode.

Figure 32A:
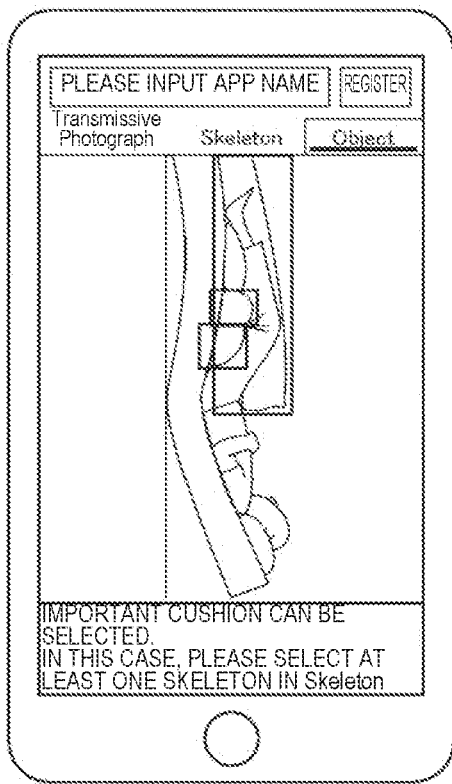
FIG. 32A illustrates an input screen example of additional information related to object detection.
Figure 32B:
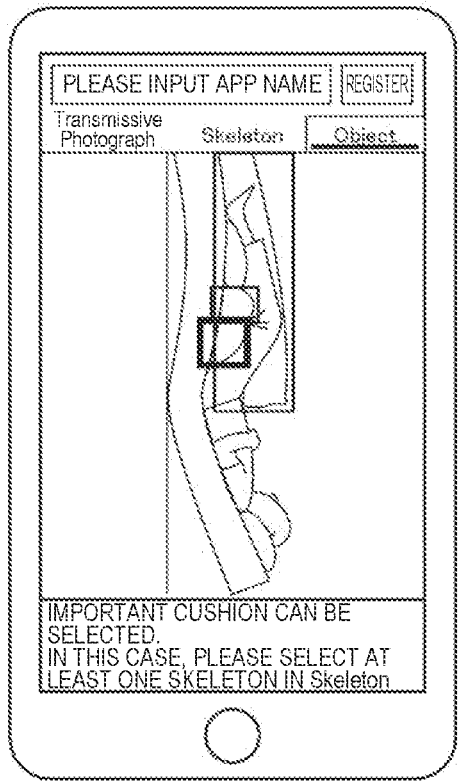
FIG. 32B illustrates an input screen example of additional information related to object detection.

FIGS. 32A and 32B illustrates examples of screens in which information related to an object detection result is added. FIG. 32A illustrates a screen similar to that in FIG. 29D, and is a screen in which object detection processing for a cushion as an object is performed to a captured image, and a rectangular region including a detected cushion is displayed, for example. Note that, the object of the object detection is not limited to the cushion. The screen may include text that urges selection of an object considered to be especially important. In the example in FIG. 32A, text that urges selection of an important cushion is displayed. Moreover, in order to make a determination processing whether the position or the posture of the care receiver is correct or not with higher accuracy and an easy to understand instruction in the care, the skeleton tracking result may be tied to the selection input for the object detection. For example, in FIG. 32A, with the text that urges selection of an object, text that urges selection of a joint-point in the skeleton tracking result is displayed.

FIG. 32B illustrates a screen example in a state where any object in the object detection result has been selected. In the example in FIG. 32B, one of the compact cushions that are disposed below the knees has been selected, and a rectangle that surrounds the cushion is changed in the color or the thickness different from another rectangle. Further, the selected object only needs to be distinguishable, and various kinds of modifications can be made to a specific display mode.

The screens illustrated in FIGS. 29A to 32B are used to allow various kinds of additional information to be added to the captured image. In particular, different screens are used for text or a figure (FIGS. 30A to 30D), the skeleton tracking (FIG. 31A, FIG. 31B), and the object detection (FIG. 32A, FIG. 32B) to allow the transition between the respective screens by a swipe operation or the like, whereby the input operation can be easy to understand. For example, even in a case where a care giver has little knowledge about a computer and software, it is possible to cause the care giver to appropriately input additional information.

Note that, the positioning application may transmit a result of setting performed by using the screens illustrated in FIGS. 29A to 32B to the server system 100. For example, after the several settings have been made, a registration button is pressed to collectively register the settings made from FIG. 29A to FIG. 32B. Moreover, in a case where an operation of pressing the registration button has been performed, the positioning application may output a questionnaire using pop-up. The questionnaire includes a purpose of using the position app, a purpose of the desired position or posture, a skeleton site that should be careful or notable, an attribute of a user, and the like. The position application transmits a result of the questionnaire, together with the setting information, to the server system 100. In this way, in addition to the detailed setting content, an intention of the care giver who has made the setting, information on the care receiver, and the like can be collected.

For example, the server system 100 may categorize the setting information collected by the position application in terms of the similar purpose, the similar skeleton site, and the similar user attribute. The server system 100 learns the setting information in terms of the similar purpose, the similar skeleton site, and the similar user attribute, for example. In this way, setting information that is estimated to be preferable can be determined in terms of the similar purpose, the similar skeleton site, and the similar user attribute. As a result, a care giver does not specifically set the setting information but only selects the similar purpose, the similar skeleton site, and the similar user attribute, whereby an application that makes an instruction of a determination processing whether the posture or the position is correct, an instruction of how to change a posture of the care receiver, and an instruction of an arrangement of cushions can be generated. For example, independent of the degree of proficiency of the care giver, a positioning application in which the suitable setting has been made can be generated.

Figure 33A:
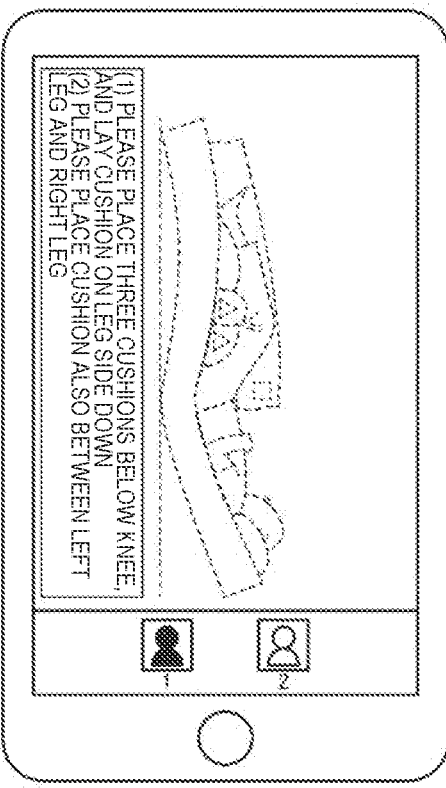
FIG. 33A illustrates a display screen example of correct data.
Figure 33B:
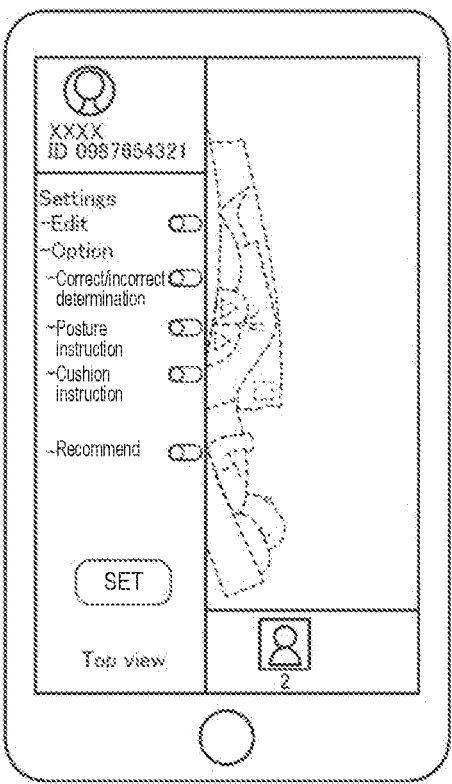
FIG. 33B illustrates a screen example for setting ON/OFF of functions of the positioning application.
Figure 33C:
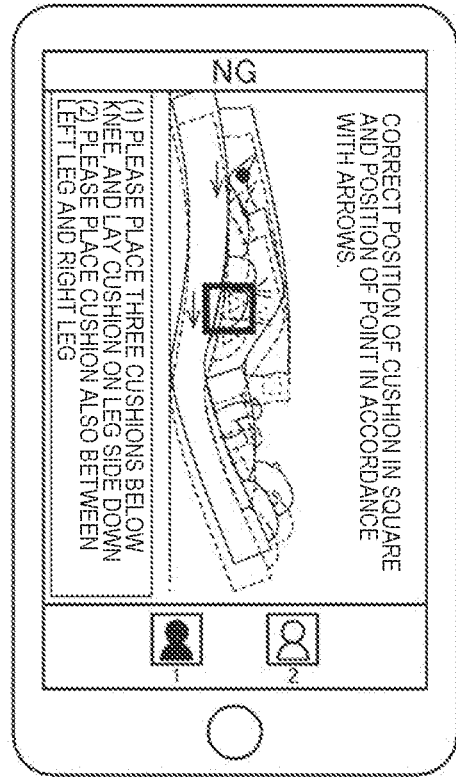
FIG. 33C illustrates a screen example that is displayed by using the respective functions of the positioning application.

FIGS. 33A to 33C are diagrams exemplifying a display screen of the correct data including additional information input by using the abovementioned screen. For example, the correct data subjected to the transparency processing is superimposed on a real-time captured image and displayed, but for convenience of viewing the drawings, the real-time captured image is omitted in FIGS. 33A and 33B. Note that, the screens illustrated in FIGS. 33A to 33C may be displayed in a use mode that is executed after the completion of the setting mode, or may be displayed in the setting mode as a preview for checking the correct data.

In the example in FIG. 33A, the captured image that is captured in the setting, the text input using the screens illustrated in FIGS. 30B and 30C, and the figure input using the screen illustrated in FIG. 30D are displayed as the correct data. A care giver who uses the positioning application performs care such that the care receiver becomes closer to the correct data while referring to the text, the figure, and the like, whereby the care giver can appropriately adjust a posture of the care receiver. Note that, in a case where a plurality of the correct data is present, the correct data may be switchable by using icons illustrated in the lower part of the screen. FIG. 33A illustrates a state where two correct data is already registered, and the first correct data is displayed. Note that, the plurality of correct data herein may be for the same care receiver as a target, or may be for different care receivers as targets.

Note that, the positioning application has not only a function of performing the transparency processing of the correct data, but may have a function of performing the determination processing whether the posture or the position is correct, a function of presenting information for making an instruction of a posture or a position, a function of presenting information for making an arrangement instruction of cushions, a function of recommending a care tool such as a cushion, and the like. Each of these functions may be switchable between the ON state and the OFF state.

For example, although a care giver who has some experience in the care facility or the like does not have tacit knowledge as a skilled care giver has, it can be considered that he or she can perform position adjustment in accordance with a displayed image or the like, which has been subjected to the transparency processing. In this case, presenting an instruction for a posture and the like causes the care giver to feel cumbersome instead in some cases, and there is a possibility that the care giver fails to think by himself or herself (improve a skill) because he or she concentrates on following the instruction. Therefore, in a case where such a care giver is a target, each of the abovementioned functions may be set to the OFF state by the skilled care giver for example.

Meanwhile, in a case of a new care giver in the care facility and a case where a family of a care receiver performs at-home care, simply presenting only an image to be the correct data cannot bring understanding of important points, and there is a possibility that desired adjustment cannot be executed. Therefore, for such care givers, each of the abovementioned functions may be set to the ON state.

Switching the ON state or the OFF state of each function may be switchable individually, as a setting item of the positioning application, for example. FIG. 33B illustrates a setting screen example in which switching the ON state or the OFF state of the function can be executed by the care giver. The screen in FIG. 33B is displayed, for example, in a case where selection operation of a setting button, which is not illustrated in FIG. 33A, has been performed, and in a case where an operation of swiping a screen left portion to the right has been performed. Further, the screen illustrated in FIG. 33B may be displayed by another operation. In the example in FIG. 33B, the selection or the slide operation of a button corresponding to each function is executed to switch the ON state or the OFF state of the function.

FIG. 33C illustrates a display screen example of the positioning application in a case where each function is used. In FIG. 33C, the correct data subjected to the transparency processing is illustrated by a dashed line similar to FIG. 33A, and a care receiver and cushions captured in real time are displayed by solid lines. For example, in a case where the determination function whether the posture or the position of the care receiver is correct or not is turned ON, the positioning application may determine whether a position and a posture of an object (a care receiver in the example in FIG. 33C) are adequate based on the correct data, and display a determination result as "OK" or "NG" on the upper portion of the screen. As the determination function based on the skeleton tracking, for example, an interior angle obtained by connecting three joint-points in the order of selection among joint-points detected in the setting mode may be used as a reference, and in the use mode, the three joint-points selected in the setting mode may be detected from the real-time captured image, and a determination processing may be executed as to whether the interior angle from the real-time captured image is within a predetermined range set in the setting mode. Moreover, the positioning application may perform the determination processing whether the position of the object is correct or not using the object detection result. For example, the positioning application sets a positional relationship between at least one joint-point among the joint-points detected in the setting mode and the selected object, as a reference. The one joint-point herein is any one of the joint-points detected in the skeleton tracking result, for example, but another point may be used. Further, the positioning application detects one joint-point selected in the setting mode and the object from the real-time captured image in the use mode, and determines whether an object coincident with the reference is present. The positioning application may determine an incorrect answer (NG) if the object is present in a place that is not coincident with the reference.

Moreover, in a case where the posture instruction function is turned ON, the positioning application presents specific information for appropriately adjusting a posture of an object. In the example in FIG. 33C, the skeleton tracking processing to the real-time captured image is performed, and the important joint-point (herein, ankle) selected on the screen illustrated in FIG. 31B is displayed. The positioning application compares the joint-point detected from the real-time captured image with the joint-point in the correct data, and presents a direction to which a position of the joint-point should be moved by an arrow and text, for example, as illustrated in FIG. 33C. Accordingly, it is possible to present the joint-point that the care giver should correct in an easy-to-understand manner. Alternatively, the positioning application may detect three joint-points selected in the setting mode from the real-time captured image in the use mode, similar to the example of the determination whether the posture or the position of the care receiver is correct or not. Further, the positioning application provides, such that a value of an interior angle of three joint-points detected in real time becomes closer to the interior angle in the correct data, an instruction of adjustment of at least one site among the three joint-points.

Moreover, in a case where the cushion instruction function is turned ON, the positioning application presents detailed information for appropriately arranging cushions. In the example in FIG. 33C, the object detection processing to a real-time captured image is performed, and a rectangular region indicating the object (for example, a cushion below the knee) selected on the screen illustrated in FIG. 32B is displayed. The positioning application compares the position and the posture of the object detected from the real-time captured image with those of the object in the correct data, and presents a direction to which a position of the cushion should be moved by an arrow and text, for example, as illustrated in FIG. 33C. Accordingly, it is possible to present the joint-point that the care giver should correct in an easy-to-understand manner. Moreover, as described above, the positioning application may detect one joint-point selected in the setting mode and the object from the real-time captured image, and may provide, in a case where an object coincident with the reference is not present, an instruction of adding or moving the object as an object to the reference position.

Although the present embodiment has been described in detail as described above, it will be readily understood by those skilled in the art that many modifications can be made without departing from the novel matters and effects of the present embodiment. Therefore, all the such modifications are intended to be included in the scope of the present disclosure. For example, a term described at least once together with a different term having a broader meaning or the same meaning in the specification or the drawings can be replaced with the different term in any part of the specification or the drawings. Moreover, all the combinations of the present embodiments and the modifications fall within the scope of the present disclosure. Further, the configuration and operation of the information processing system, the server system, the terminal device, the sensing device, and the like are not limited to those described in the present embodiment, and various modifications can be made.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A terminal device comprising:
a memory configured to be capable of storing a first application and a second application to assist care for a care receiver, the first application and the second application being independent programs executed as different processes on an operating system, a first authentication processing is required to the first application, a second authentication processing is required to the second application, the first authentication processing being different from the second authentication processing independently; and
a processor configured to execute the first application or the second application, wherein
the memory is configured to be capable of further storing a third application, and
the processor is configured to:
execute the first application, if the first application is activated after the first authentication processing has been executed, using an authentication result of the care receiver,
execute the second application, if the second application is activated after the first application has finished, in a state where the second authentication processing is automatically passed by succeeding the authentication result of the care receiver acquired through the first application,
execute the third application to execute authentication processing, to execute a retrieval processing to retrieve an application related to the authenticated care receiver among a plurality of applications including the first application and the second application, and to present a retrieval result corresponding to the retrieved application, and
switch processing in the first application between a case where the first application has been activated by first activation processing via the third application and a case where the first application has been activated by second activation processing without using the third application.

2. The terminal device according to claim 1, wherein the processor is configured:
to identify, based on attribute information in which the care receiver is associated with an attribute of the care receiver, the attribute of the authenticated care receiver, in the retrieval processing, and
to retrieve a fourth application associated with the attribute from the plurality of applications.

3. The terminal device according to claim 2, wherein the processor is configured to execute, if the first application has been activated without performing the authentication processing, the authentication processing by the first application.

4. The terminal device according to claim 2, wherein the memory is configured to be capable of storing a fourth application configured to perform processing related to a same care content as the first application, and the processor is configured:

to display the fourth application, and not to display the first application in a home screen, and to display the first application, and not to display the third application, in the retrieval result by the third application.

5. The terminal device according to claim 4, wherein the first application does not have a function of performing the authentication processing, and the fourth application has a function of performing the authentication processing.

6. The terminal device according to claim 1, wherein the processor is configured to perform the retrieval processing to retrieve a fourth application from the plurality of applications in the retrieval processing, based on information on at least one of a place where the terminal device is used, a time period when the retrieval processing is executed, and a care device positioned in a surrounding of the terminal device.

7. The terminal device according to claim 6, wherein the processor is configured to execute, if the first application has been activated without performing the authentication processing, the authentication processing by the first application.

8. The terminal device according to claim 6, wherein the memory is configured to be capable of storing a fourth application configured to perform processing related to a same care content as the first application, and the processor is configured:

to display the fourth application, and not to display the first application in a home screen, and to display the first application, and not to display the third application, in the retrieval result by the third application.

9. The terminal device according to claim 8, wherein the first application does not have a function of performing the authentication processing, and the fourth application has a function of performing the authentication processing.

10. The terminal device according to claim 1, wherein the processor is configured to execute, if the first application has been activated without performing the authentication processing, the authentication processing by the first application.

11. The terminal device according to claim 1, wherein the memory is configured to be capable of storing a fourth application configured to perform processing related to a same care content as the first application, and the processor is configured:

to display the fourth application, and not to display the first application in a home screen, and to display the first application, and not to display the third application, in the retrieval result by the third application.

12. The terminal device according to claim 11, wherein the first application does not have a function of performing the authentication processing, and the fourth application has a function of performing the authentication processing.

13. The terminal device according to claim 1, wherein the memory is configured to be capable of storing a plurality of applications including a positioning application configured to perform processing related to a position of at least one of a person and an object, a first detection application configured to communicate with a seat sensor, a second detection application configured to detect that a care receiver stands up, a third detection application configured to detect a swallowing state or presence of choking of the care receiver, a fourth detection application configured to determine an amount of food or fluid intake of the care receiver, a medication application configured to manage medication taken by the care receiver, a fifth detection application configured to detect that the care receiver attempts to touch the skin or inside of clothing, a sixth detection application configured to communicate with a sensing device for feces detection, and a seventh detection application configured to determine a timing to start terminal care, and the first application and the second application are respectively any one selected from the plurality of applications, the first application and the second application being different from each other.

14. A control method of a terminal device, the terminal device being configured to be capable of storing a first application, a second application and a third application to assist care for a care receiver, the first application and the second application being independent programs executed as different processes on an operating system, a first authentication processing is required to the first application, a second authentication processing is required to the second application, the first authentication processing being different from the second authentication processing independently, the control method comprising:

executing the first application, in a first operation in which the first application is activated after the first authentication processing has been executed, using an authentication result of the care receiver, and executing the second application, in a second operation in which the second application is activated after the first application has finished, in a state where the second authentication processing is automatically passed by succeeding the authentication result of the care receiver acquired through the first application, wherein the control method further comprises:

executing the third application to execute authentication processing, to execute a retrieval processing to retrieve an application related to the authenticated care receiver among a plurality of applications including the first application and the second application, and presenting a retrieval result corresponding to the retrieved application, and switching processing in the first application between a case where the first application has been activated by first activation processing via the third application and a case where the first application has been activated by second activation processing without using the third application.

15. The control method according to claim 14, wherein the terminal device stores a plurality of applications including a positioning application configured to perform processing related to a position of at least one of a person and an object, a first detection application configured to communicate with a seat sensor, a second detection application configured to detect that a care receiver stands up, a third detection application configured to detect a swallowing state or presence of choking of the care receiver, a fourth detection application configured to determine an amount of food or fluid intake of the care receiver, a medication application configured to manage medication taken by the care receiver, a fifth detection application configured to detect that the care receiver attempts to touch the skin or inside of clothing, a sixth detection application configured to communicate with a sensing device for feces detection, and a seventh detection application configured to determine a timing to start terminal care, and wherein the executing of the first application and the executing of the second application respectively correspond to any one selected from the plurality of applications, the first application and the second application being different from each other.

\* \* \* \* \*